(12) United States Patent
Selitsky et al.

(10) Patent No.: US 11,656,744 B1
(45) Date of Patent: May 23, 2023

(54) INTERACTIVE TOOL FOR EFFICIENTLY DEVELOPING TASK FLOWS

(71) Applicant: Wolters Kluwer Technology BV, Alphen a/d Rijn (NL)

(72) Inventors: Andrey Selitsky, Leiden (NL); Sergey Kireykov, Leiden (NL); Siarhei Astapovich, Mundelein, IL (US); Siarhei Aksiuchenka, Round Lake Beach, IL (US); Yauheni Padaliak, Hawthorn Woods, IL (US)

(73) Assignee: Wolters Kluwer Technology BV, Alphen a/d Rijn (NL)

( * ) Notice: Subject to any disclaimer, the term of this patent is extended or adjusted under 35 U.S.C. 154(b) by 0 days.

(21) Appl. No.: 17/694,634

(22) Filed: Mar. 14, 2022

(51) Int. Cl.
*G06F 3/0484* (2022.01)
*G06F 9/451* (2018.01)
*G06F 3/04817* (2022.01)
*G06F 3/0482* (2013.01)

(52) U.S. Cl.
CPC .......... *G06F 3/0484* (2013.01); *G06F 3/0482* (2013.01); *G06F 3/04817* (2013.01); *G06F 9/451* (2018.02)

(58) Field of Classification Search
CPC ........ G06F 8/34; G06F 9/451; G06F 3/04817; G06F 3/0482; G06F 3/0484
See application file for complete search history.

(56) References Cited

U.S. PATENT DOCUMENTS

| | | | |
|---|---|---|---|
| 10,951,540 B1* | 3/2021 | De Kadt | H04L 47/787 |
| 2006/0074735 A1* | 4/2006 | Shukla | G06Q 50/188 |
| | | | 705/80 |
| 2006/0129443 A1* | 6/2006 | Chen | G06F 8/34 |
| | | | 715/771 |
| 2012/0221998 A1* | 8/2012 | Rowley | G06F 8/34 |
| | | | 717/105 |
| 2017/0212732 A1* | 7/2017 | Kaduwela | G06F 8/34 |
| 2018/0321830 A1* | 11/2018 | Calhoun | G06F 8/38 |

(Continued)

OTHER PUBLICATIONS

Wikipedia, "Low-code development platform." Retrieved from the Internet at:<URL:https://en.wikipedia.org/wiki/Low-code_development_platform> (2021).

(Continued)

*Primary Examiner* — Mong-Shune Chung
(74) *Attorney, Agent, or Firm* — Marshall, Gerstein & Borun LLP

(57) ABSTRACT

A low-code/no-code task flow authoring computer system includes one or more processors; and a memory storing computer-readable instructions that, when executed by the one or more processors, cause the computing system to cause an interactive graphical user interface to be displayed, generate an output; and replace a portion of a primary interactive content object with the output. A computer-implemented method includes causing an interactive graphical user interface to be displayed; generating an output; and replacing a portion of a primary interactive content object with the output. A non-transitory computer readable medium containing program instructions that when executed, cause a computer to cause an interactive graphical user interface to be displayed, generate an output; and replace a portion of a primary interactive content object with the output.

20 Claims, 53 Drawing Sheets

(56) References Cited

U.S. PATENT DOCUMENTS

| | | | |
|---|---|---|---|
| 2021/0240449 A1* | 8/2021 | Oara | G06F 8/22 |
| 2022/0100554 A1* | 3/2022 | Vityaz | G06Q 10/06316 |
| 2022/0113951 A1* | 4/2022 | Casaregola | G06F 8/433 |
| 2022/0244708 A1* | 8/2022 | Gemignani | B25J 9/1602 |
| 2022/0343901 A1* | 10/2022 | Koneru | G06F 8/34 |

OTHER PUBLICATIONS

Bryter, "The no-code enterprise platform." Retrieved from the Internet at:<URL:http://Bryter.IO> (2021).

Wolters Kluwer, "Empowering non-coders to create visual programming." Retrieved from the Internet at:<URL:https://www.wolterskluwer.com/en/expert-insights/empowering-non-coders-to-create-visual-programming> (Jan. 21, 2020).

* cited by examiner

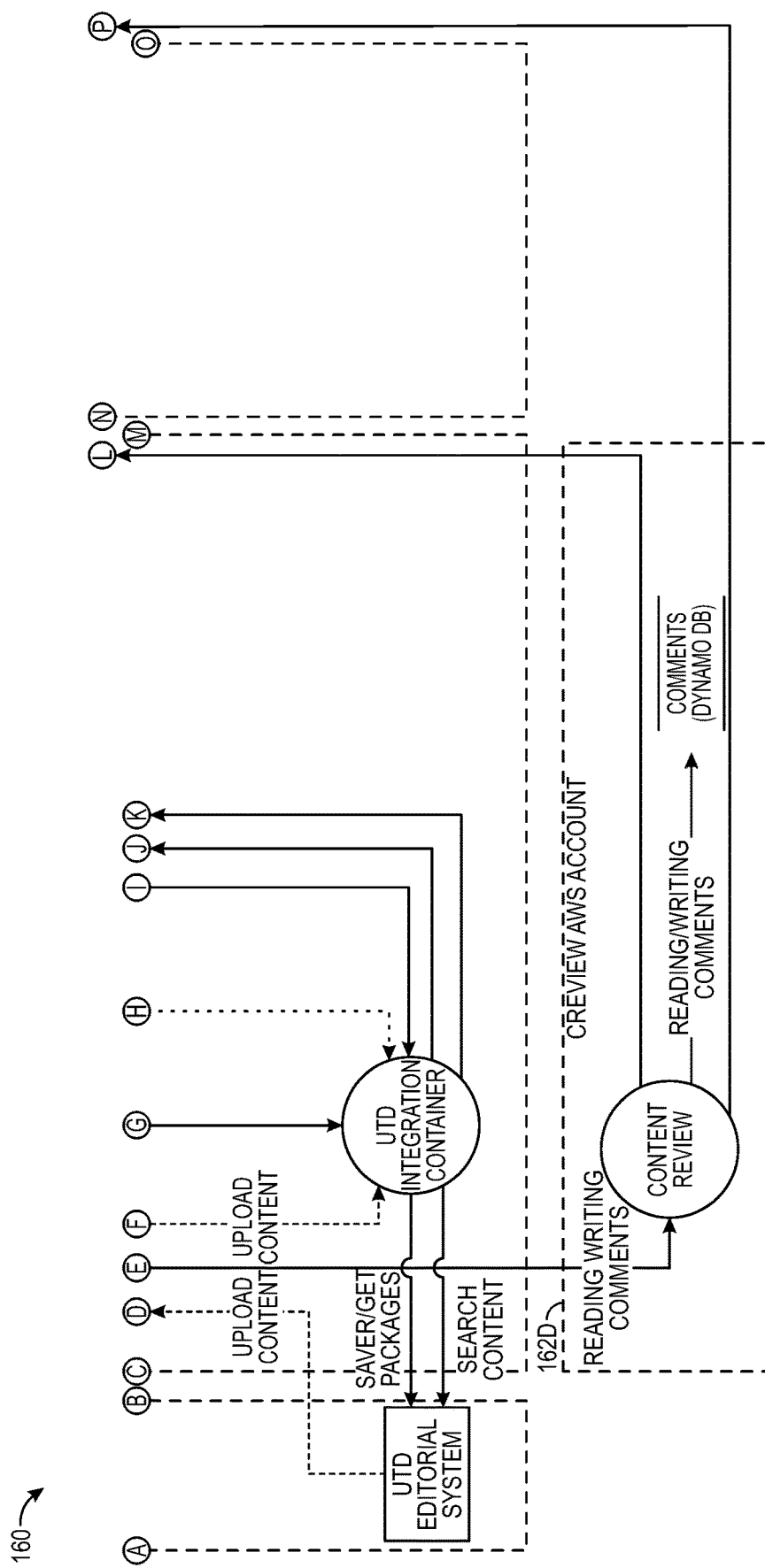

1010

Screening for risk factors that increase the risk of opioid misuse prior to prescription is important.

Factors that increase the risk of harm or misuse include:

- History of substance use disorder or overdose
- Illicit drug use or use of prescription drugs for nonmedical reasons
- Mental health conditions (eg, depression, posttraumatic stress disorder)
- Family history of substance use disorder None of these factors are strict contraindications to opioid prescriptions. However, reviewing these risks can help inform your decision on dosing, scheduling follow-up, and providing other support (eg, counseling) when needed.

Screening tools, such as Opioid Risk Tool, Revised Screener and Opioid Assessment for Patients with Pain (SOAPP-R), SOAPP-R), or the Screener and Opioid Assessment for Patients with Pain (SOAPP) (scoring instructions), can be used to help assess risk.

SCREENING FOR RISK FACTORS ~~FOR~~ THAT INCREASE THE RISK OF OPIOID MISUSE ~~OR ABUSE~~ PRIOR TO PRESCRIPTION IS IMPORTANT.

FACTORS THAT INCREASE THE RISK OF HARM OR MISUSE INCLUDE:

- HISTORY OF SUBSTANCE ~~AB~~USE DISORDER OR OVERDOSE
- ILLICIT DRUG USE OR USE OF PRESCRIPTION DRUGS FOR NONMEDICAL REASONS
- MENTAL HEALTH CONDITIONS (EG, DEPRESSION, ~~ANXIETY~~)
- FAMILY HISTORY OF SUBSTANCE ~~AB~~USE DISORDER

NONE OF THESE FACTORS ARE STRICT CONTRAINDICATIONS TO OPIOID PRESCRIPTIONS. HOWEVER, REVIEWING THESE CAN HELP INFORM YOUR DECISION ON DOSING, SCHEDULING FOLLOW-UP, AND PROVIDING OTHER SUPPORT (ED, COUNSELING) WHEN NEEDED.

~~VALIDATED S~~CREENING TOOLS, SUCH ~~SOAPP, SOAPP-R~~ SOAPP-R OR THE ~~OPIOID RISK TOOL~~, CAN BE USED TO HELP ASSESS RISK.

~~EXCLUSIONS~~

~~THIS UPTODATE PATHWAY IS NOT APPROPRIATE FOR PATIENTS WITH ANY OF THE FOLLOWING EXCLUSIONS~~

- ~~AGE <18 YEARS~~
- ~~PREGNANCY~~
- ~~CHRONIC PAIN~~
- ~~ACTIVE OPIOID USE~~
- ~~OPIOID USE WITHIN THE PAST 30~~
- ~~CANCER-RELATED PAIN~~
- ~~NEED FOR PALLIATIVE OR HOSP~~ICE CARE

Select one or more options for pain control.

■ Non-opioid analgesic
☐ Other nonpharmacologic approach for pain management (e.g. heat, ice, massage)
☐ Approach other than the options provided The drug doses given generally represent the doses that are suggested for patients who do not require dose adjustments due to factors such as comorbid illnesses, organ dysfunction, drug interactions, or other reasons. Consult a clinical drug reference, appropriate UpToDate topic reviews, and/or other resources to confirm the appropriate dosing for a given patient.

Select a non-opioid analgesic. Acetaminophen and NSAIDs are the most commonly used options. These drugs can be used alone or in combination. When prescribing an NSAID (eg, ibuprofen, naproxen, celecoxib), only one NSAID should be selected.

○ Acetaminophen 650 mg orally every 4 to 6 hours as needed (maximum 3250 mg daily)
○ Acetaminophen plus NSAID
○ NSAID only
○ Approach other than the options provided

1062A — Based on your assessment, what is the appropriate duration of therapy?
○ A 3 day course or less (preferred)
○ A 4 to 7 day course
○ Approach other than the options provided 1062C — Required Tests
The following test results may be required to answer the questions that will follow:
- Partial thromboplastin time (PTT)
- Platelet count
- Prothrombin time (PT) and international normalized ratio (INR)
- Serum albumin
- Serum total bilirubin
- Serum creatinine with estimated creatinine clearance In addition, if the patient has previously undergone laboratory testing for heparin-induced thrombocytopenia (HIT), the result of that testing should be obtained.

1062B — ^^^Just small calculagggg^^^gggggg
○ Option 1
○ Option 2
description my
[Input a value]
Select all of the features that apply.

INTERACTIVE TOOL FOR EFFICIENTLY DEVELOPING TASK FLOWS

FIELD OF THE DISCLOSURE

The following disclosure generally relates to methods and systems for efficient low-code/no-code task flow authoring, and more particularly, for modifying task flow objects in an interactive graphical user interface provided to a user via a visual programming application that electronically accesses a task flow interactive content object model.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Conventional techniques for working with task flows (e.g., constructing, developing, modifying, etc.) are known to be inefficient. In particular, these conventional techniques do not address specific repeatable use cases in the information services industry, and the task flow authoring user experience does not facilitate ease-of-use and productivity. Further, publication and deployment of task flow documents using conventional techniques to cloud native target platforms is not supported. Still further, these techniques cause inconsistency issues.

Generating code using diagramming software is generally known (e.g., via Unified Modeling Language (UML)). However, generating deployable cloud native end-user applications that include task flow documents that themselves may contain nested objects requires traditional software development expertise that not only carries significant time, effort and cost penalties, but also artificially limits the user base to experienced software developers.

Thus, improved task flow techniques are needed, that improve efficiency and ease-of-use of the user authoring experience and cloud native deployment functionality for all users of the information services industry, regardless of user experience levels.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

In one aspect, a low-code/no-code task flow authoring computer system includes one or more processors; and a memory storing computer-readable instructions that, when executed by the one or more processors, cause the computing system to: (1) cause an interactive graphical user interface (GUI) to be displayed, the GUI comprising at least one pane, the pane comprising one or more selectable auto-expandable nodes each representing a respective action in a primary interactive content object; an interface for selecting and interconnecting the one or more auto-expandable nodes; and one or more controls for linking one or more sub-interactive content objects to the primary interactive content object; (2) generate, by inputting a portion of the primary interactive content object into an interactive content object model, an interactive content object output corresponding to the portion of the primary interactive content object; and (3) replace the portion of the primary interactive content object with the interactive content object output.

In another aspect, a computer-implemented method for low-code/no-code task flow authoring includes (1) causing an interactive graphical user interface (GUI) to be displayed, the GUI comprising (i) at least one pane, the pane comprising one or more selectable auto-expandable nodes each representing a respective action in a primary interactive content object; (ii) an interface for selecting and interconnecting the one or more auto-expandable nodes; and (iii) one or more controls for linking one or more sub-interactive content objects to the primary interactive content object; (2) generating, by inputting a portion of the primary interactive content object into an interactive content object model, an interactive content object output corresponding to the portion of the primary interactive content object; and (3) replacing the portion of the primary interactive content object with the interactive content object output.

In yet another aspect, a non-transitory computer readable medium includes program instructions that when executed, cause a computer to: (1) cause an interactive graphical user interface (GUI) to be displayed, the GUI comprising at least one pane, the pane comprising one or more selectable auto-expandable nodes each representing a respective action in a primary interactive content object; an interface for selecting and interconnecting the one or more auto-expandable nodes; and one or more controls for linking one or more sub-interactive content objects to the primary interactive content object; (2) generate, by inputting a portion of the primary interactive content object into an interactive content object model, an interactive content object output corresponding to the portion of the primary interactive content object; and (3) replace the portion of the primary interactive content object with the interactive content object output.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein:

FIG. 10B depicts a side-by-side difference showing text added to a node, according to some aspects;

FIG. 10C depicts a side-by-side difference showing text deleted from to a node, according to some aspects;

FIG. 10E depicts a side-by-side difference showing text deleted from a deleted, according to some aspects;

FIG. 10F depicts a difference showing text added to an added node, according to some aspects;

FIG. 10G depicts a difference showing a deleted node, according to some aspects.

DETAILED DESCRIPTION

Overview

The present disclosure generally relates to methods and systems for efficient low-code/no-code task flow authoring, and more particularly, for modifying task flow objects in an interactive graphical user interface provided to a user via a visual programming application that electronically accesses a task flow decision tree model.

In aspects, the present techniques support efficient task flow authoring using interactive tools. The present techniques may be implemented in a cloud-native environment (e.g., Amazon Web Services, Microsoft Azure, Google Cloud Platform, etc.), enabling the present techniques to be flexibly scaled, and adding security. The present techniques may be applicable to customers and partners of many different companies, including a global information services company, and are flexible and customizable to enable delivery of expert interactive content to address many use cases.

The present techniques advantageously support the direct codification of expert knowledge into expert decision and automation solutions in a user-friendly and efficient manner. Aspects of the present invention may be implemented as a software-as-a-service (SaaS) platform for low-code/no-code authoring and/or rendering of expert interactive applications. For example, the expert interactive applications may relate to processes (e.g., legal or tax process steps), decision trees, electronic forms, interactive voice conversations, etc. Specifically, the present techniques may support drag-and-drop interfaces enabling users to visually build applications that comprise various interactive content types, including decision trees, interactive forms, condition nodes, content nodes, calculator nodes, interactive voice flows, question/answer flows, hybrid-workflow steps, and more. In some aspects, the present techniques provide a low-code, no-code application development platform that supports multiple content types building on top of one or more decision trees.

For example, in one example aspect, a user may define one or more decision trees including respective interactive forms and respective calculators for medical diagnosis. In a further example aspect, the present techniques enable a user to author a voice flow for patient after-care voice calls, optionally integrating with/driving other software and/or application programming interfaces (APIs) (e.g., Emmi Prevent, Emmi Transitions, etc.). In yet another example aspect, the present techniques enable integrated decision trees to determine answers to complex questions embedded in information products (e.g., CCH® AnswerConnect). The integration with external tools may enable data gathering for tax audit purposes driven by workflow steps.

Exemplary Computing Environment and Modular Architectures

Figure 1A:
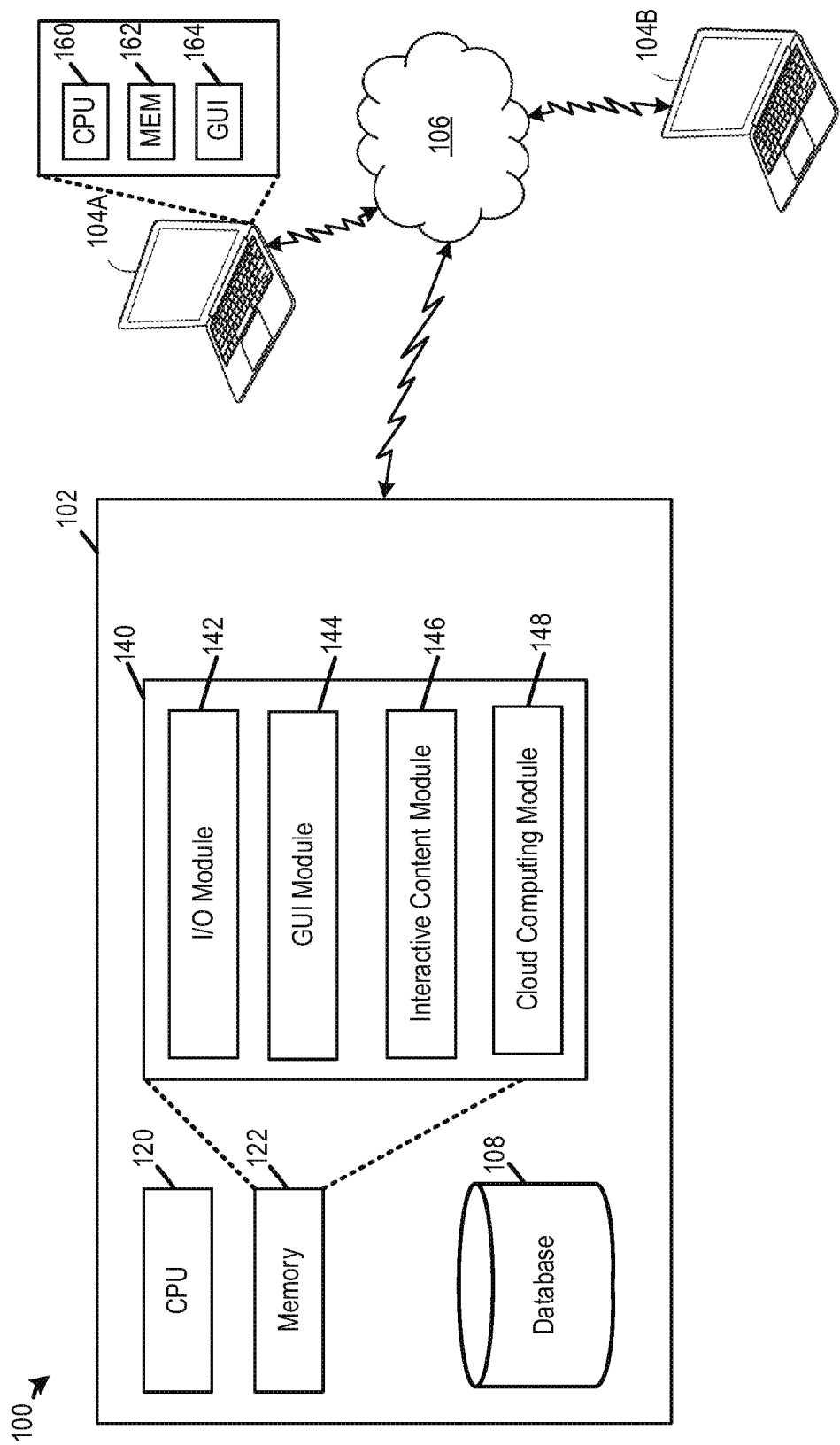
FIG. 1A depicts a block diagram of an exemplary computing environment in which efficient low-code/no-code task flow authoring may be implemented, according to some aspects.

FIG. 1A depicts a block diagram of an exemplary computing environment 100 in which efficient low-code/no-code task flow authoring may be implemented, according to some aspects. The computing environment 100 can include a server system 102 which various computing devices, such as client devices 104A and 1048, can access via a communication network 106 (e.g., the Internet). The server 102 can be communicatively coupled to a database 108 storing training data, which can include task flow data, decision tree models, etc.

The server system 102 includes one or more processors 120, which can include CPUs, GPUs, etc., and a non-transitory memory 122 readable by the one or more processors 120. The memory 122 can store one or more computing modules 140. The one or more modules 140 may include such components as an input/output (I/O) module 142, a graphical user interface (GUI) module 144, an interactive content module 146, and a cloud computing module 148.

The processors 120 may include one or more suitable processors (e.g., central processing units (CPUs) and/or graphics processing units (GPUs)). The processor 120 may be connected to the memory 122 via a computer bus (not depicted) responsible for transmitting electronic data, data packets, or otherwise electronic signals to and from the processor 120 and memory 122 in order to implement or perform the machine readable instructions, methods, processes, elements or limitations, as illustrated, depicted, or described for the various flowcharts, illustrations, diagrams, figures, and/or other disclosure herein. The processor 120 may interface with the memory 122 via a computer bus to execute an operating system (OS) and/or computing instructions contained therein, and/or to access other services/aspects. For example, the processor 120 may interface with the memory 122 via the computer bus to create, read, update, delete, or otherwise access or interact with the data stored in memory 122 and/or the database 108.

The memory 122 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memory 122 may store an operating system (OS) (e.g., Microsoft Windows, Linux, UNIX, etc.) capable of facilitating the functionalities, apps, methods, or other software as discussed herein. The memory 122 may store a plurality of computing modules 140, implemented as respective sets of computer-executable instructions (e.g., one or more source code libraries, interactive content modules, decision tree modules, task flow object modification instructions, etc.) as described herein. In some aspects, the combination of one or more modules 140 may be referred to as a visual programming backend application.

The I/O module 142 may include a set of computer-executable instructions implementing communication functions. For example, the I/O module 142 may include a communication component configured to communicate (e.g., send and receive) data via one or more external/network port(s) to one or more networks or local terminals, such as the network 106 and/or the client devices 104A and 1048 as described herein. In some aspects, the server 102 may include a client-server platform technology such as ASP.NET, Java J2EE, Ruby on Rails, Node.js, a web service or online API, responsive for receiving and responding to electronic requests. The I/O module 142 may further include or implement an operator interface configured to present information to an administrator or operator and/or receive inputs from the administrator and/or operator (e.g., via the client computing device 104). An operator interface may provide a display screen. The I/O module 142 may facilitate I/O components (e.g., ports, capacitive or resistive touch sensitive input panels, keys, buttons, lights, LEDs), which may be directly accessible via, or attached to, servers 102 or may be indirectly accessible via or attached to the client device 104A. According to some aspects, an administrator or operator may access the server 102 via the client device 104 to review information, make changes, modify task flow objects, generate interactive content objects (e.g., objects representing decision trees or other interactive content types) models, etc.

The GUI module 144 may include computer-executable instructions for generating, displaying and/or modifying GUIs. For example, the GUI module 144 may include a software library for rendering graphical elements (e.g., execution blocks, decision blocks, connections, etc.), nodes, etc. within a task flow document. The GUI may generate one or more panes including one or more auto-expandable interactive content nodes. Herein, interactive content objects may be referred to as interactive content nodes in a GUI context. The interactive content nodes may have a recursive or nested structure comprising one more nodes (e.g., one or more interactive content objects), and one or more sub-nodes (e.g., one or more interactive content objects, one or more decision trees, etc.). The GUI module may cause each of the nodes to include an indicator (e.g., a color or other visual indication) depicting whether each node is selectable. The GUI module 144 may display a toolbar or other graphical user interface controls including controls for linking and delinking nodes within the interactive content(s). For example, the GUI module 144 may display controls for adding, deleting and/or modifying existing nodes or blocks within the interactive content.

The interactive content module 146 may include computer-executable instructions for generating and operating one or more interactive content models (sometimes referred to herein simply as "models"). The one more interactive content models may include software instructions that, when executed, cause the model to analyze interactive content using one or more interactive content optimization algorithm, that may be based on or include a known tree traversal such as a breadth-first search (BFS), a depth-first search (DFS). The models may generate interactive content outputs that are modified forms of the interactive content inputs. For example, in some aspects, the interactive content module 146 may operate a DFS-based algorithm to analyze a sub-tree of an interactive content input to de-duplicate the sub-tree. The input interactive content may be represented as a task flow object, in some aspects, which may be a JSON document. The interactive content module 146 may be configured to prune duplicated nodes from one or more sub-tree of the input task flow object.

The interactive content module 146 may receive one or more root node identifiers specifying where a tree modification is to begin. For example, the interactive content module 146 may apply the modification to all nodes within the interactive content beneath the node specified as a root node. Task flow objects may include one or more interactive contents, and associations between one or more non-interactive content objects and nodes of the respective interactive contents. Thus, the interactive content module 146 may, in some aspects, include instructions for unpacking the interactive content objects from task flow objects received, for example, from the GUI application 164 of the client device 104A. The interactive content module 146 may optimize interactive content objects within the task flow object and add or delete other associated content within the task flow object (e.g., a document associated with a node of the interactive content).

The cloud computing module 148 may include instructions for deploying and executing one or more task flow objects authored by the user. The cloud computing module may include software libraries for accessing APIs of one or more cloud computing infrastructure components. For example, the cloud computing module 148 may include a first software library for accessing Amazon Web Services components such as S3, EC2, etc. The cloud computing module 148 may include a second software library for accessing Microsoft Azure components, such as a runnable web function. The cloud computing module may include instructions for converting a task flow interactive content object into a document, such as a dynamic HTML document, a PDF presentation, etc. including hyperlinks that enable a user to navigate the converted document to navigate within the interactive content. Thus, the present techniques advantageously enable users, whether skilled programmers or non-technical users, to use visual programming techniques to generate a task flow that can be easily deployed to a cloud computing environment.

The modules 140 may include more or fewer modules, in some aspects. The memory 122 may also include instructions for loading and/or storing the one or more task flow interactive content models in the database 108. When servicing multiple organizations and/or business units, the server system 102 can store multiple interactive content models in the memory 122 or an external database.

Each of the client devices 104A and 1048 can include one or more processors 160, a memory 162 readable by the one or more processors 160 and a GUI application 164 which can include any suitable input and output devices. Via the GUI application 164, a user can access one or more of the modules 140. The GUI application 164 can be accessed via a web browser, for example, or a special-purpose software application (e.g., an Android application or iPhone application when the client device 104A or the client device 1048 is implemented as a mobile computing device such as a smart phone, tablet, wearable device, etc.).

The client devices 104A and 1048 can access respective local databases (not depicted) that store data records such as local copies of task flow documents along the associated data (e.g., document object models, for example). For example, the organization with which the workstation 104A is associated can receive stored document objects (e.g., an entire HTML document, a JavaScript Object Notation (JSON) document representing an entire task flow document or a portion thereof, etc.) from multiple users such as tax preparation users, legal services providers, etc. A representative of the organization may wish to use the functionality of the modules 140 without uploading task flow document to the server system 102. Accordingly, he or she can request that the modules 140 operate on the task flow document(s) stored locally in the database of the client devices 104A or 1048 when developing the task flow object.

In some implementations, at least some of the functionality of the modules 140 can be accessible via an application programming interface (API). Rather than requesting data from the server system 102, the GUI application 164 can invoke the API to apply the functionality of one or more of modules 140 to data stored locally in the database of the client computing device 104A, for example. More generally, the functionality of the modules 140, the one or more interactive content models generated by the interactive content module 146, and the output data can be distributed among network nodes in any suitable manner.

The network 106 may comprise any suitable network or networks, including a local area network (LAN), wide area network (WAN), Internet, or combination thereof. For example, the network 106 may include a wireless cellular service (e.g., 4G). Generally, the network 106 enables bidirectional communication between the client device 102 and the servers 104; the servers 104 and the current computing environment; the servers 104 and the future computing environment; a first client device 102 and a second client device 102; etc. As shown in FIG. 1, servers 104 are communicatively connected, via computer network 106 to the one or more client computing devices 102 via network 106. In some aspects, network 106 may comprise a cellular base station, such as cell tower(s), communicating to the one or more components of the environment 100 via wired/wireless communications based on any one or more of various mobile phone standards, including NMT, GSM, CDMA, UMMTS, LTE, 5G, or the like. Additionally or alternatively, network 106 may comprise one or more routers, wireless switches, or other such wireless connection points communicating to the components of the environment 100 via wireless communications based on any one or more of various wireless standards, including by non-limiting example, IEEE 802.11a/b/c/g (WIFI), the BLUETOOTH standard, or the like.

The database 108 can be implemented as multiple separate database or as part of a single database operating on one or multiple devices, using any suitable techniques (e.g., using a set of tables interconnected by indices to define a relational database). The database 108 may be a relational database, such as Oracle, DB2, MySQL, a NoSQL based database, such as MongoDB, or another suitable database. The database 108 may store data used to train and/or operate one or more interactive content models. The database 108 may store runtime data (e.g., a task flow document received via the network 106, etc.). The servers 102 may implement client-server platform technology that may interact, via a computer bus of the servers 102 (not depicted), with the memory(s) 122 (including the applications(s), component(s), API(s), data, etc. stored therein) and/or database 108 to implement or perform the machine readable instructions, methods, processes, elements or limitations, as illustrated, depicted, or described for the various flowcharts, illustrations, diagrams, figures, and/or other disclosure herein.

Figure 3A:
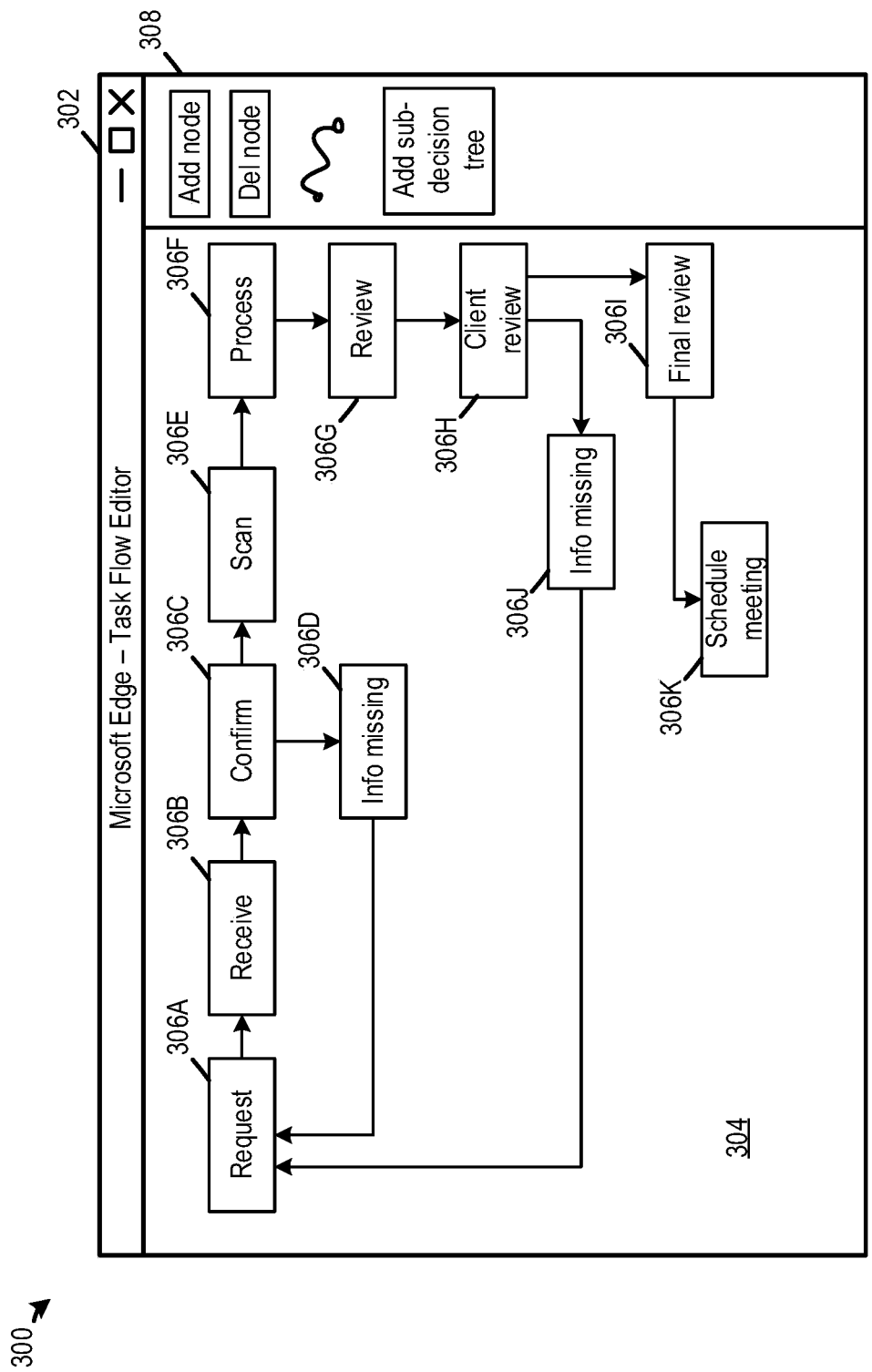
FIG. 3A illustrates an example visual programming GUI, according to some aspects.

In operation of the system illustrated in FIG. 1, the visual programming application 140 can present a user interface via which an operator can load an existing task flow object (e.g., via the database 108) and/or create a new task flow object. An exemplary graphical user interface is depicted in FIG. 3A. In the GUI, which may be displayed in a display device of the client device 104A, the user may select one or more auto-expandable nodes, add new auto-expandable nodes, interconnect the one or more auto-expandable nodes, etc. within one or more interactive content nodes. The user may add a new interactive content node, delete an interactive content node, and move nodes from one interactive content node to another interactive content node. In response to the user's interaction with the GUI, the visual programming application 140 may analyze a portion of one or more of the interactive content nodes using an interactive content model. Analyzing the portion of the one or more interactive contents may destructively modify the existing interactive content nodes, and/or generate a corresponding optimized interactive content nodes. After the interactive content module 146 optimizes the portion of the one or more interactive content nodes, the visual programming application 140 may cause the optimized portion to be displayed in the output device of the GUI application (e.g., via the GUI application 164).

Figure 1B:
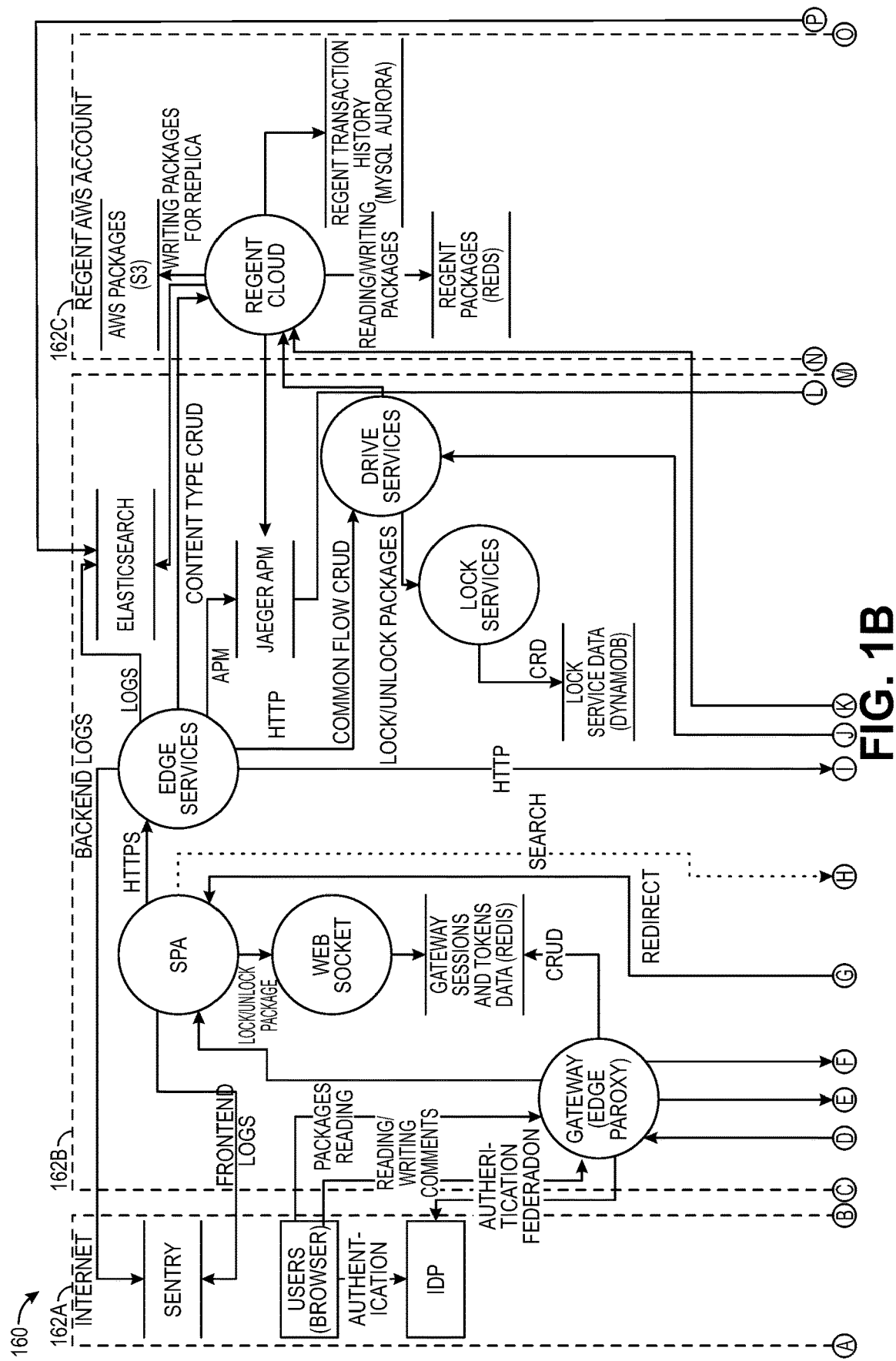
FIG. 1B depicts an application data flow diagram schematically illustrating data flow within an application environment, according to some aspects.

FIG. 1B depicts an application data flow diagram schematically illustrating data flow within an application environment 160, according to some aspects. In some aspects the environment 160 may correspond to the environment 100 of FIG. 1A. For example, the application environment 160 may include an Internet layer (block 162A), wherein users access packages and read and write data to/from the system 102 as described herein. The environment 160 may include a task flow edge cloud layer (block 162B) and a task flow backend cloud layer (block 162C). Each of the Internet layer, task flow edge cloud layer 162B, and task flow backend cloud layer maybe communicatively accessible to one another, and to/from a task flow cloud account layer (block 162D). The various components may communicate via HTTP, HTTPS, or other application-layer sockets. The edge cloud layer 162B may implement web application components including single page applications (SPAs), web socket instances, gateway services, edge proxies, federation, unified threat defense services, edge services, drive services, locking services, search services. The block 162A and block 162B may be implemented using one or more virtual server and/or cloud service. The block 162C may include a database backend and other application-specific components (e.g., a private cloud). The block 162D may include identity and comment services respectively associated with one or more users, and a comments database.

Figure 1C:
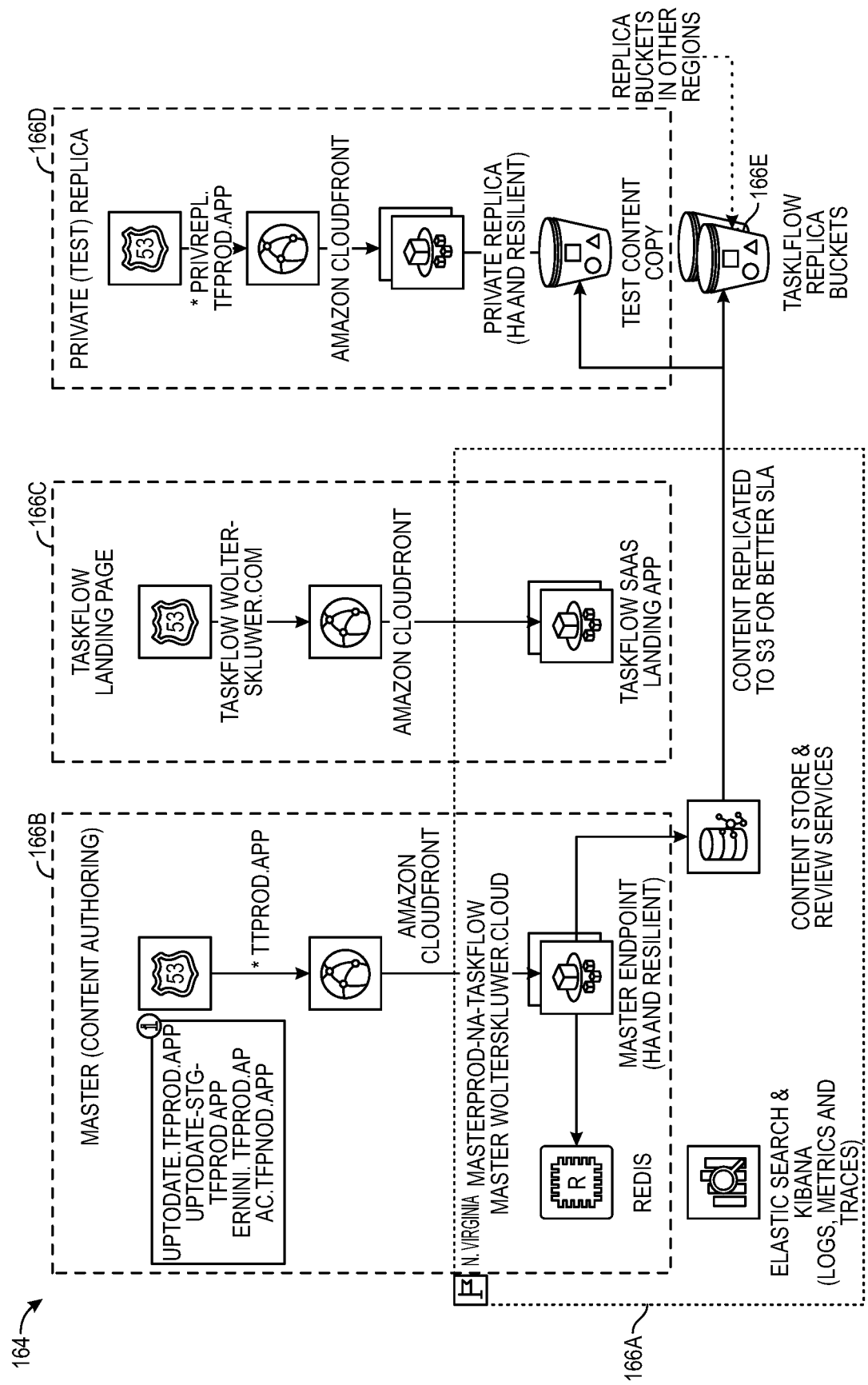
FIG. 1C depicts an exemplary production cloud computing environment, according to some aspects of the present techniques.

FIG. 1C depicts an exemplary production cloud computing environment 164, according to some aspects of the present techniques. The production cloud computing environment 164 may include a cloud computing environment 166A, a logical content authoring layer 166B and a landing page layer 166C, each comprising multiple cloud-based services used to carry out the features and functionalities discussed herein. Together, the production cloud computing environment 166A and the logical content authoring layer 166B may support, respectively, a runtime for users and an authoring platform. The environment 166A may be communicatively coupled (e.g., via the network 106) to a private test environment 166D also comprising multiple cloud-based services and components. Each of the cloud computing environment 166A and the private test environment 166D may electronically access one or more replica buckets 166E. The replica buckets 166E enable the present techniques to distribute objects (e.g., task flow objects) among different geographical nodes, improving performance and reducing network latency via a content delivery network (CDN) pattern.

Figure 1D:
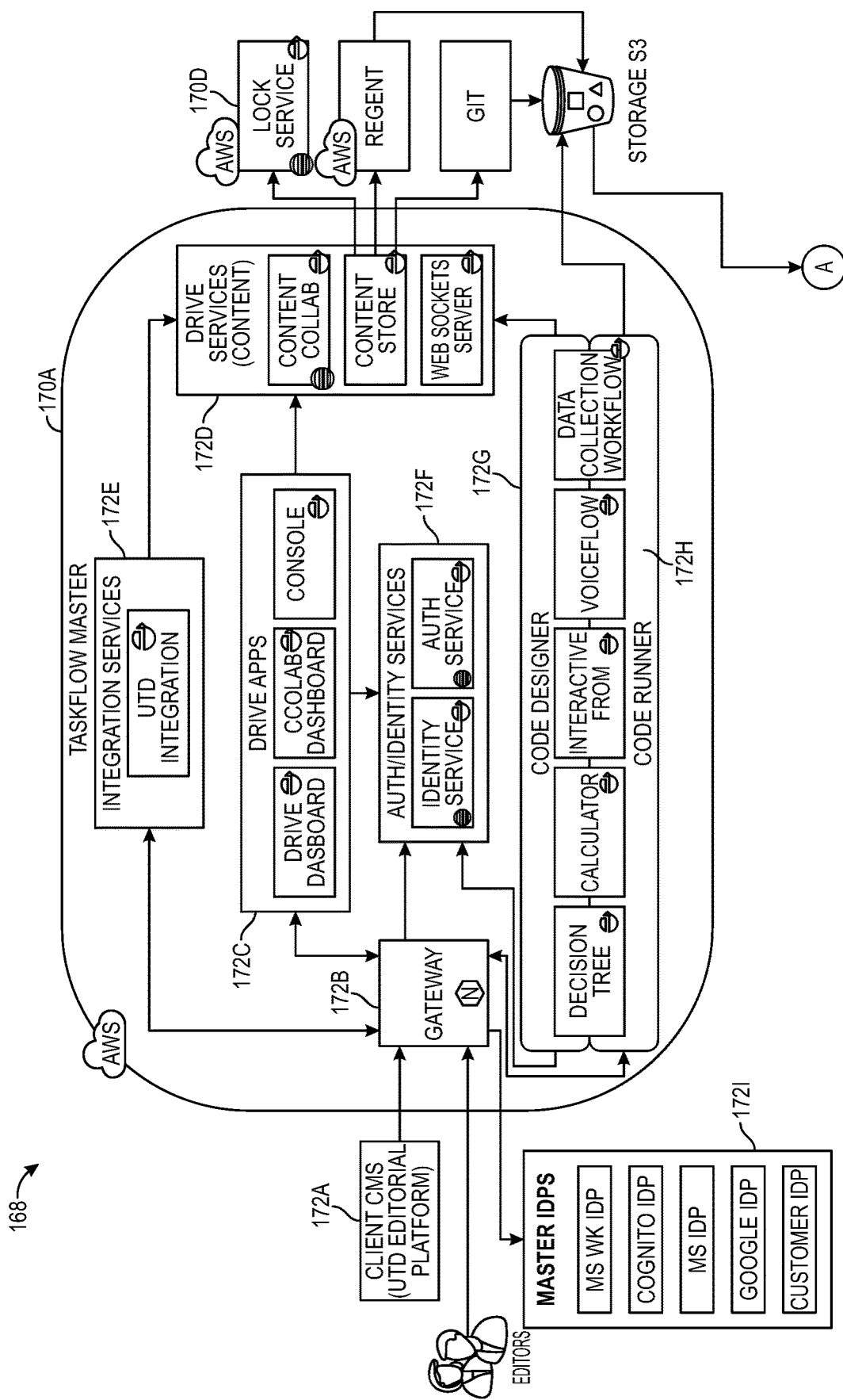
FIG. 1D depicts an exemplary computing architecture that may implement the production cloud computing environment of FIG. 1A, in some aspects.
Figure 1D:
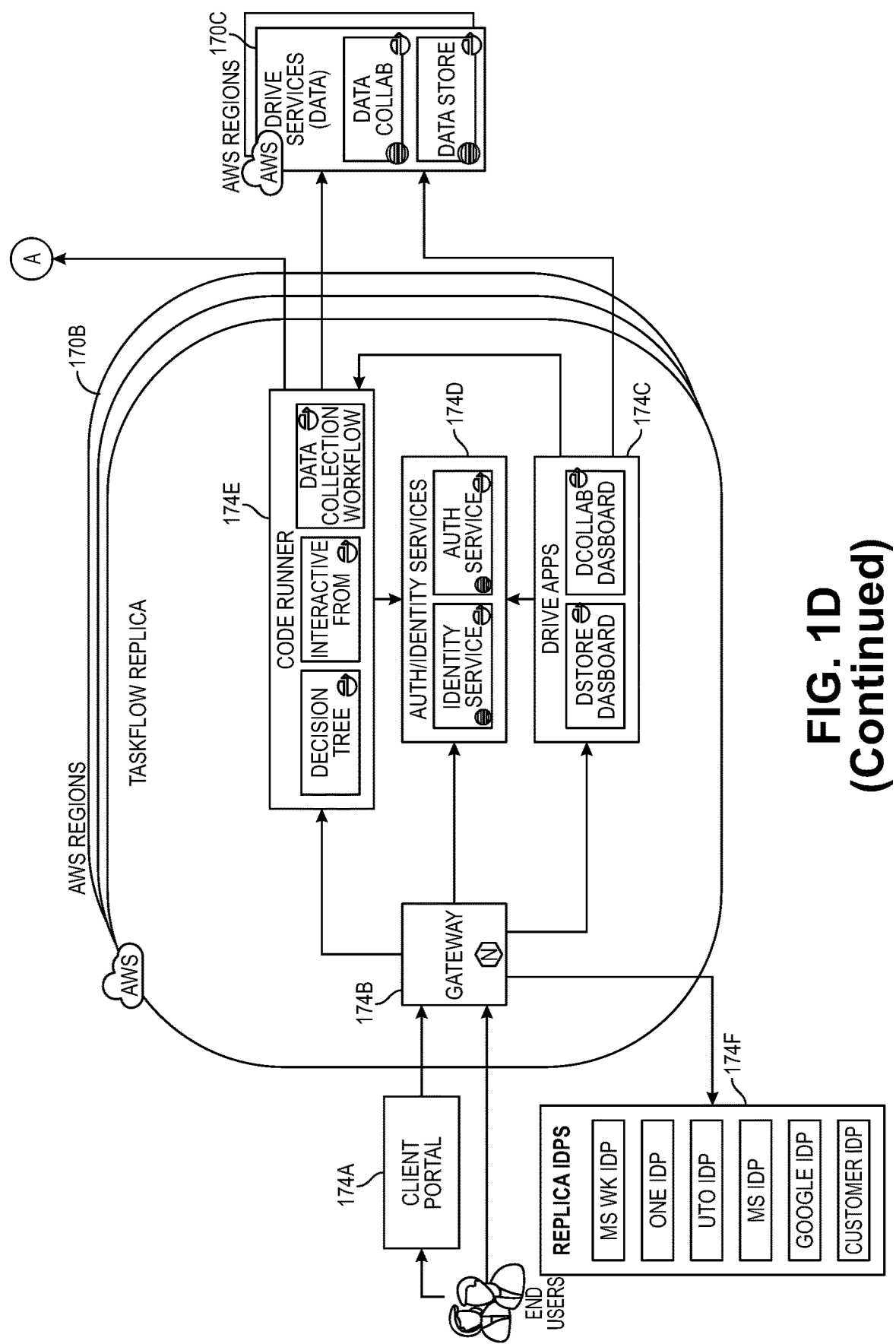

FIG. 1D depicts an exemplary computing architecture 168 that may implement the environment 100 of FIG. 1A, in some aspects. The architecture 168 includes a task flow master instance 170A and a task flow replica instance 170B. In some aspects, multiple instances of the task flow replica instance 170B may be run in multiple geographic locations in the world. Doing so enables routing of users to the nearest instance, thereby advantageously increasing availability and network performance. For example, an end user in Europe will likely reach a European replica instance 170B, thus reducing latency, and increasing application performance. Too much latency in highly interactive techniques such as the present techniques can negatively affect the user experience. Thus, the replica instance(s) 170B, being geographically closer to the user reduces latency and improves the user experience.

In some aspects, the task flow master instance 170 is used for content authoring, and the task flow replica instance 170B is used to serve created interactive content for end user clients. The replica instance 170B may include additional performance optimizations to serve content and/or additional levels of monitoring and testing. The computing architecture 168 may further include one or more drive data services 170C within cloud regions, and/or one or more services 170D such as discrete cloud resources, version control services, storage services, etc.

The task flow master instance 170A may enable users to access a client content management system (CMS) 172A that accesses one or more drive apps 172C via a gateway 172B. The CMS 172A may be used to access a drive dashboard app to manage interactive content and the creation process, a content collaboration dashboard application that provides capabilities to manage the content review process, and/or a console application that manages user access. The task flow master instance 170A may include drive services 172D that include APIs for content storage, user input storage and collaboration flow. The content services in the drive services 172D may include a group of services that provide APIs for content storage and content collaboration flow, such as a content store that provides capabilities to store, retrieve and manipulate data used to build interactive content; a content collaboration service that is used for collaboration between editors and reviewers and a web socket micro-service that is used to avoid parallel editing of content. The content collaboration service advantageously improves speed and quick feedback for created content and adjusting content according to comments.

The task flow master instance 170A may include a code designer 172G that includes a plurality of task flow applications that provide capabilities to create different interactive content modules (e.g., decision trees, interactive forms, data collection flows, etc.). These modules are illustrated further below, e.g., with respect to FIG. 2A-FIG. 5A. The task flow master instance 170A may further include a code runner 172H that runs/plays task flow modules/objects. The task flow master instance 170 may further include integration services 172E that provide integration of API/communication with customers' CMS systems.

The task flow replica instance 1708 may enable users to access a client portal 174A that accesses one or more drive apps 174C via a gateway 174B. The client portal 174A may be used to access a data store dashboard application that shows a list of filled/in progress interactive modules (e.g., decision trees, interactive forms, etc.) of the users, and/or a data collaboration dashboard that provides capabilities to manage the data review process. The task flow replica instance 1708 may include data drive services 174C that provide APIs for content storage, user input storage and collaboration flow. In particular, the data services 174C may include services that provide APIs for user input storage and collaboration flow over user input. The data services 174C may include a data collaboration service that is used for collaboration between business users and their clients, e.g., to discuss and collaborate. The data collaboration service allows end users to fill data and answer specific questions from interactive modules (e.g., decision trees, interactive forms, etc.) The data services 174C may include a data store service that provides capabilities to store user input data. The task flow replica instance 1708 may further include a code runner 174EH that runs/plays task flow modules/objects, and an auth/identity service 174D that is responsible for authentication/authorization and storing required user identify information. The identity service may be used to store personally-identifiable information (PII) data and content from the user. The auth service may be responsible for storing and managing authentication/authorization for task flow users.

Figure 1E:
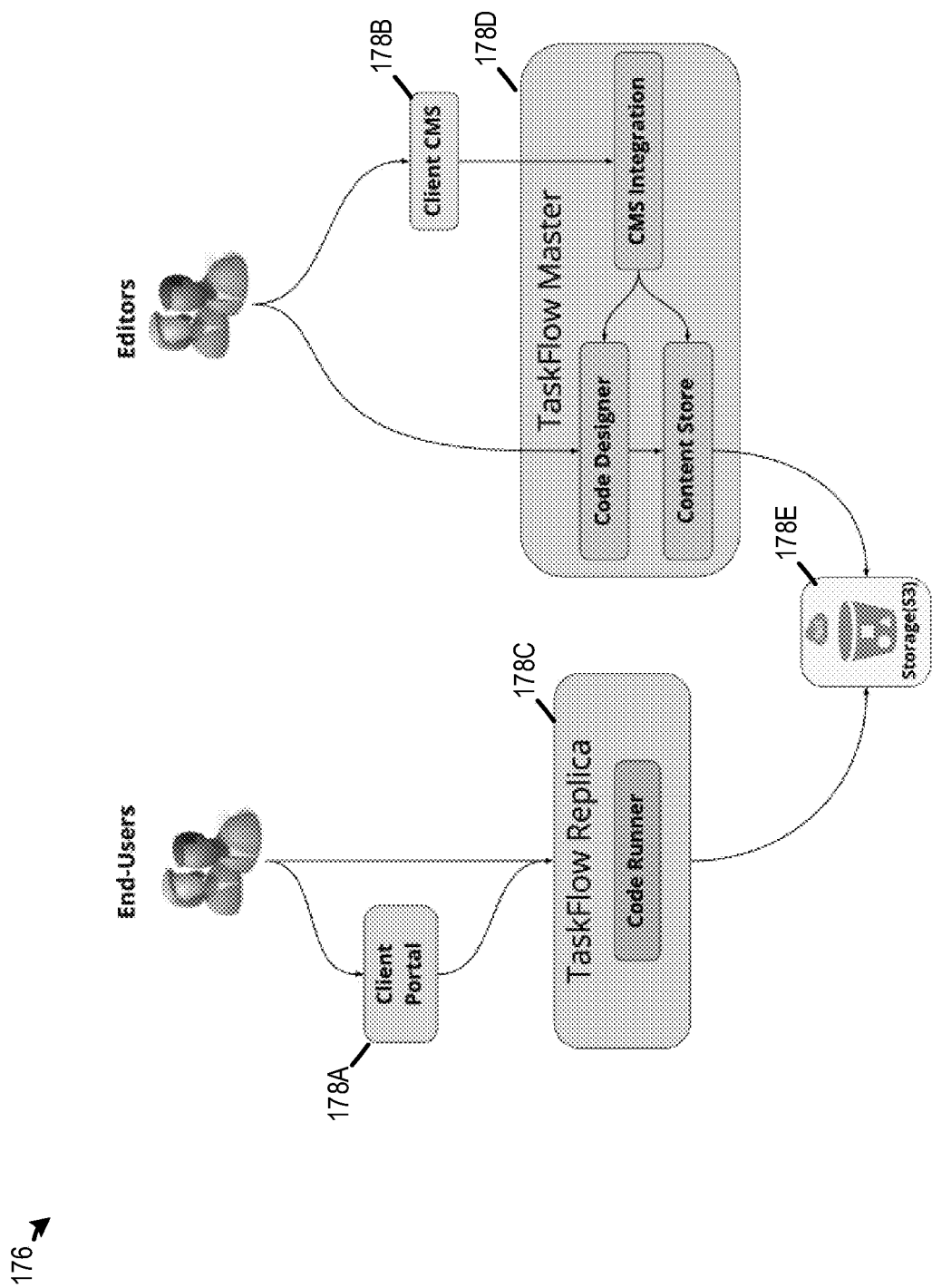
FIG. 1E depicts an exemplary task flow interactive content usage flow diagram, according to an aspect.

FIG. 1E depicts an exemplary task flow interactive content usage flow diagram 176, according to an aspect. The flow diagram 176 may include end users that provide inputs to a task flow replica instance 178C via a client portal 178A, and editors 178B that access a task flow master instance 178D via a client CMS 178B. For example, the editor may create modules (e.g., interactive content) via code designer, and the task flow diagram 176 can be used as a standalone CMS or integrated with a client CMS. The task flow replica 178C may correspond to the task flow replica instance 1708 of FIG. 1D, and the task flow master instance 178D may correspond to the task flow master instance 170A of FIG. 1D, in some aspects.

Figure 1F:
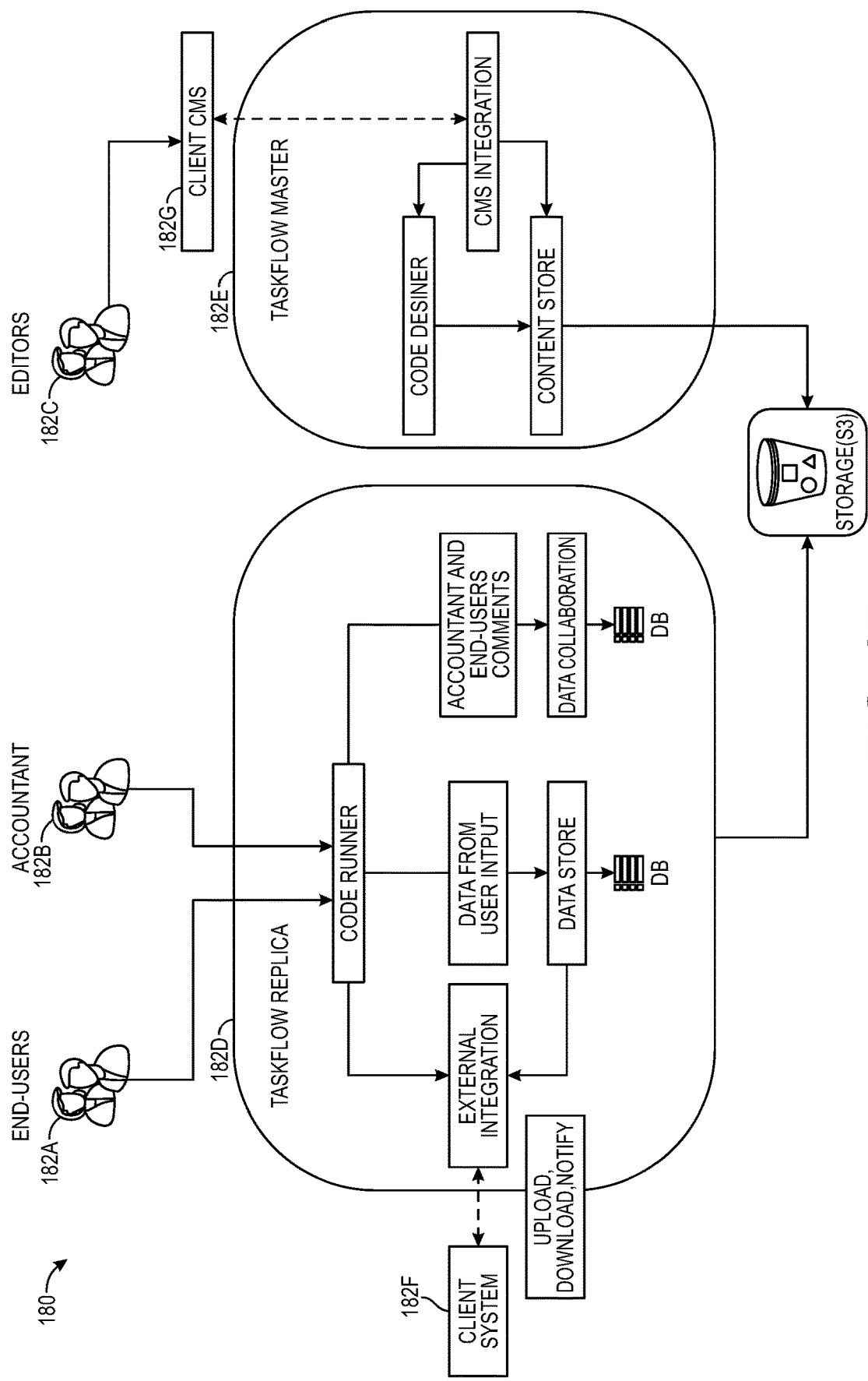
FIG. 1F depicts an exemplary advanced task flow interactive content usage flow diagram 180, according to an aspect.

FIG. 1F depicts an exemplary advanced task flow interactive content usage flow diagram 180, according to an aspect. An editor 182C or other business user creates a data collection (e.g., a work stream, case, etc.) that allows users to fill data. The diagram 180 includes end users 182A and professional users 182B (e.g., accountants, lawyers, etc.) who fill required data into a data collection flow (e.g., different forms and document uploads). The results of the data collection flow can be imported/exported from the client systems via the API.

Figure 1G:
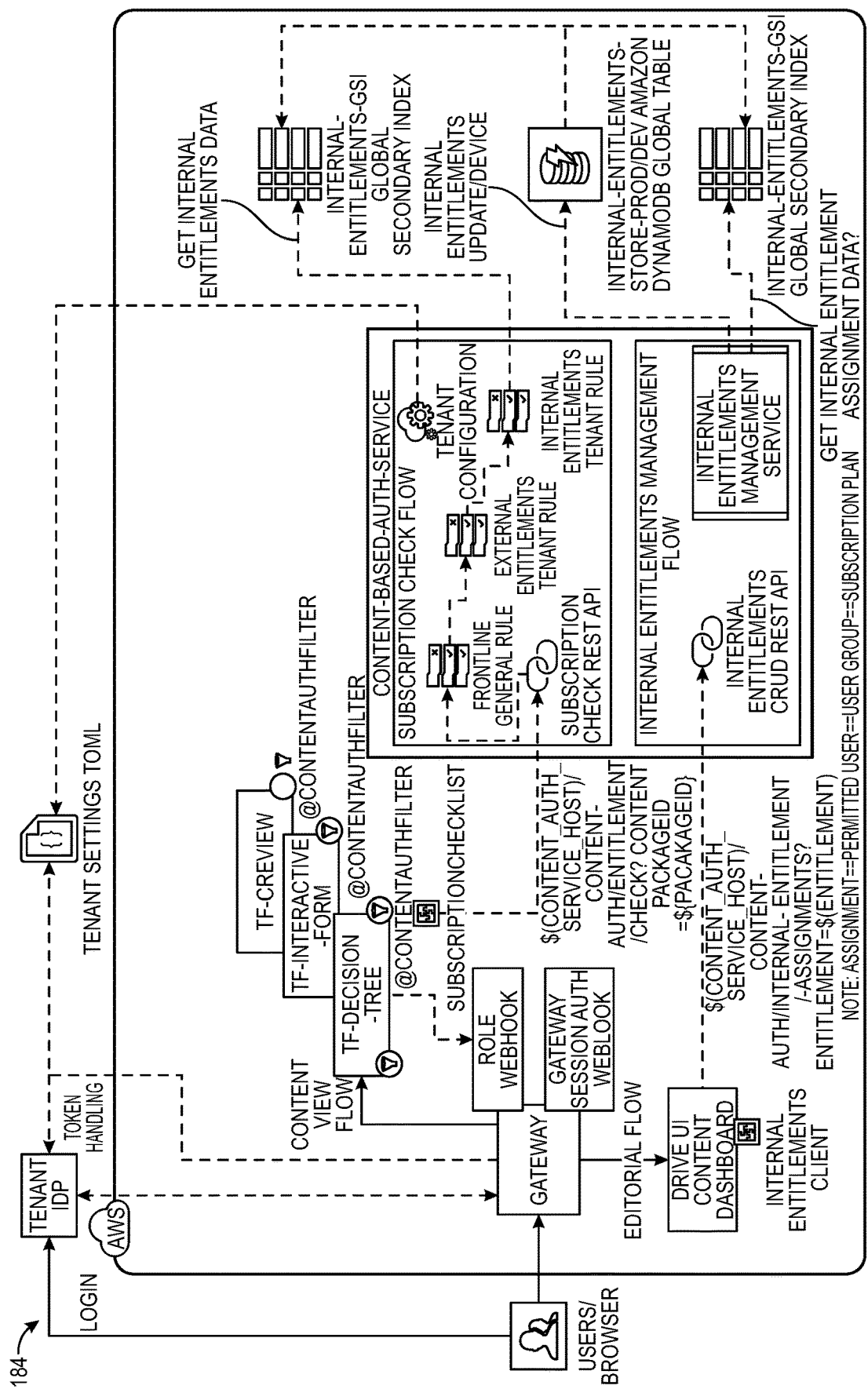
FIG. 1G depicts an exemplary content authorization diagram, according to one aspect.

FIG. 1G depicts an exemplary content authorization diagram 184, according to one aspect. Components of the diagram 184 may correspond to those of earlier Figures, such as the gateway, the drive UI content dashboard, etc. In general, the content authorization diagram enables content to be granularly permissioned and access control provided to certain users.

Exemplary Computer-Implemented Methods

Figure 2A:
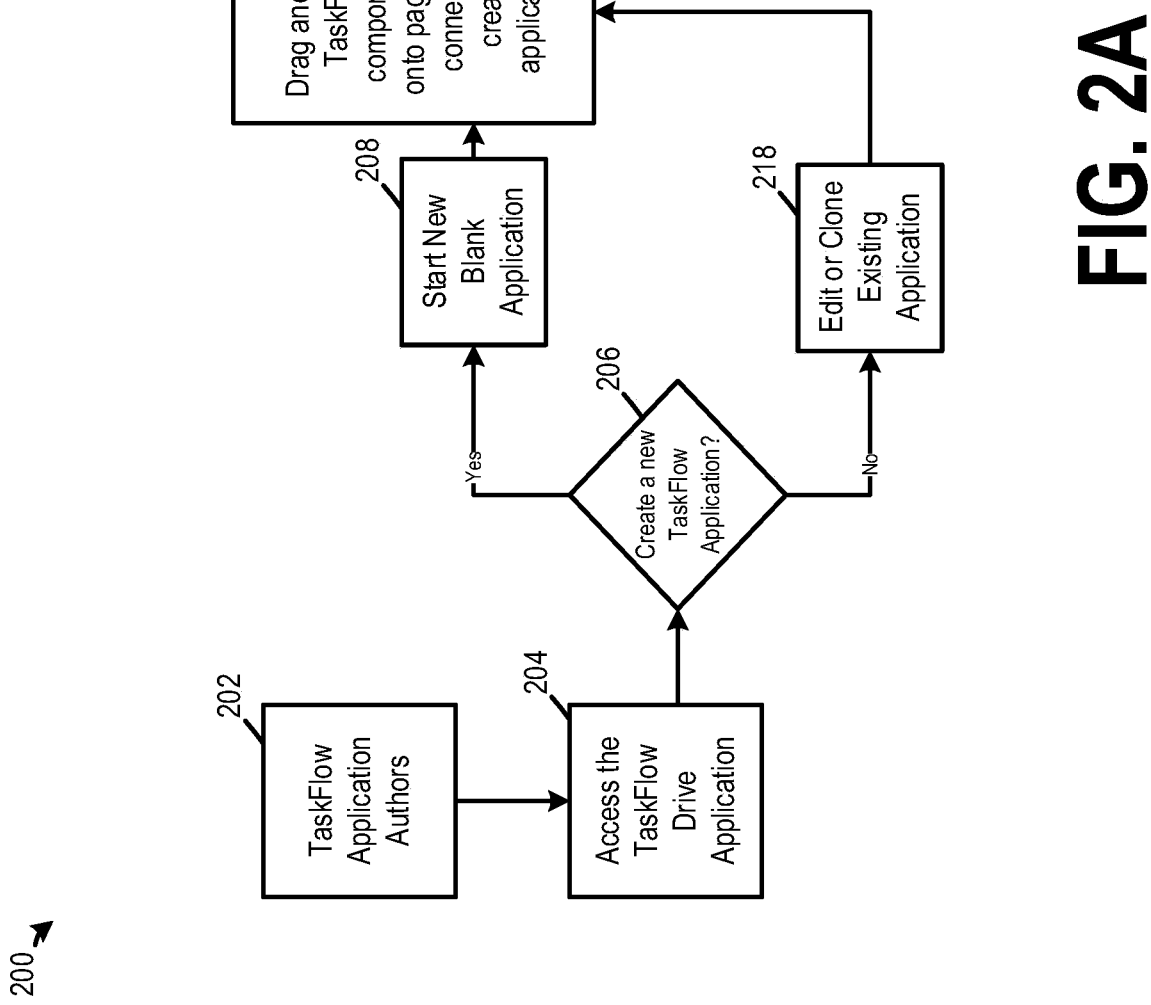
FIG. 2A depicts an exemplary method for authoring task flow objects, according to some aspects.

FIG. 2A depicts an exemplary method 200 for authoring task flow objects, according to some aspects. The method 200 may include receiving a request from one or more task flow authors (block 202). For example, the request may be an HTTP authentication request from one or more users logging in to the GUI application 164 of the client device 104A and the client device 104B. The method 200 may include displaying a GUI application in the client device (block 204). For example, with reference to FIG. 1, the user may access the visual programming application 140 via a web browser, or use a native application via the GUI application 164.

The method 200 may include prompting the user to create a new task flow object (block 206). When the user chooses to create the new task flow object, the method 200 may include starting a new task flow object (block 208). The new task flow object may include initialization code and/or default values. The method 200 may include initializing one or more task flow objects within a pane of a GUI application. The method 200 may include executing a feedback loop (e.g., a while loop) enabling the user to drag and drop task flow components (e.g., auto-expandable nodes) within the GUI pane, to connect the task flow components using the GUI controls, and to create/delete additional nodes (block 210) and to edit text associated with the nodes, arrange the nodes within a linear work flow and/or an interactive content node, add associated content to the task flow application (e.g., a calculator, a document, an image, a video, etc.) (block 212). The while loop may be conditioned upon the user not selecting a "complete" or "publish" GUI control.

Once the user selects the publish control, the while loop may terminate, and the task flow objects may be published to one or more cloud computing targets (block 214). The method 200 may include receiving one or more user selections indicating cloud computing deployment targets. The method 200 may include generating a unique URL corresponding to each of the cloud computing deployment targets (block 216). The method 200 may display the unique URLs on the display of the user, to enable the user (whether technical or non-technical) to share the URL with other users. At block 206, when the user does not want to create a new task flow object (i.e., the user wants to access an existing task flow object) the method 200 may include receiving a selection of the user corresponding to editing or cloning an existing task flow object (block 218). The method may then proceed at block 210 as described.

Figure 2B:
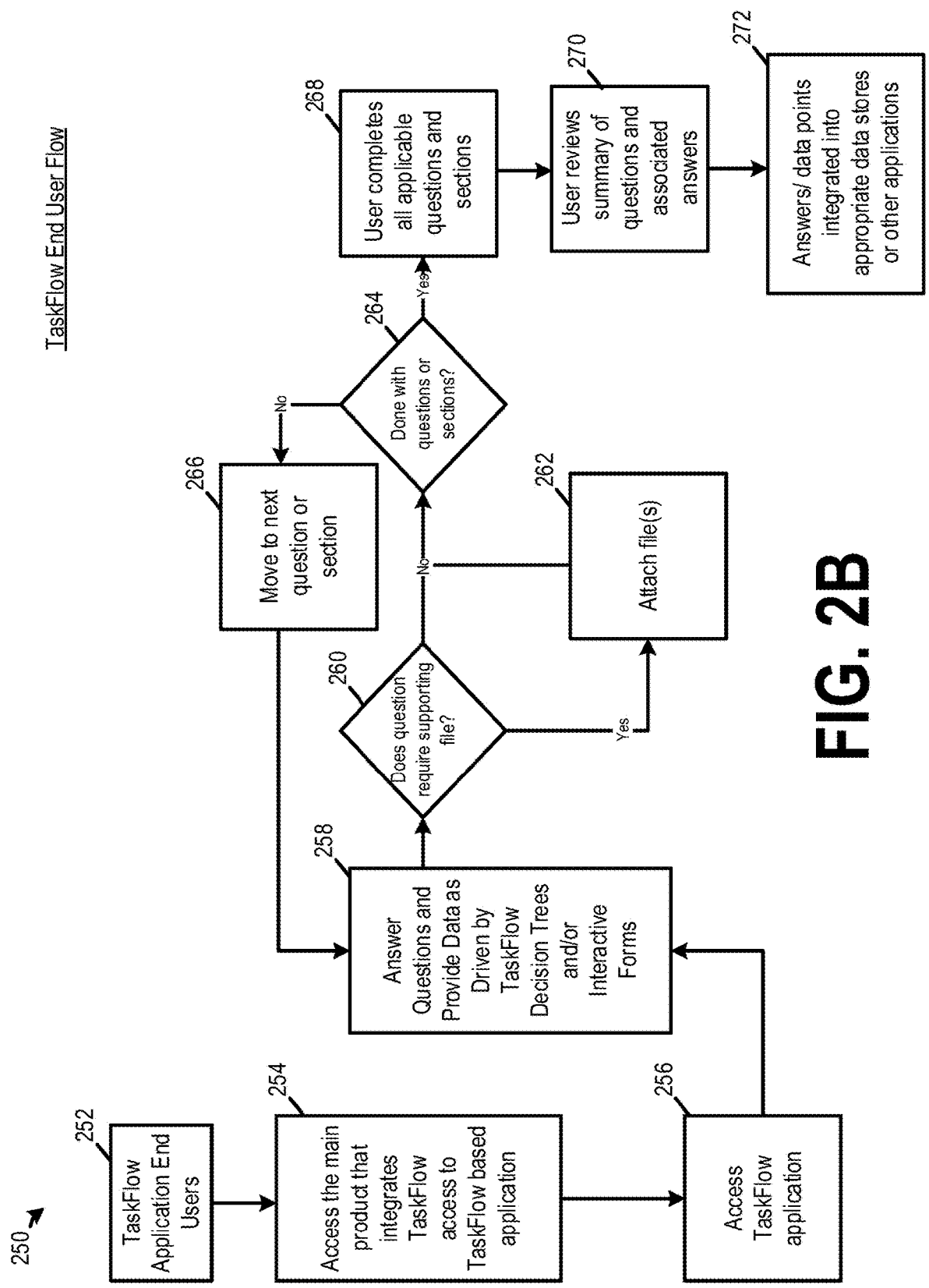
FIG. 2B depicts an exemplary method for accessing and executing task flow objects, according to some aspects.

FIG. 2B depicts an exemplary method 250 for accessing and executing task flow objects, according to some aspects. In some aspects, the method 250 may be performed by a user of the method 200 (e.g., as a preview). The method 250 may include receiving a request to access the task flow object (block 252). The request may include one or more identifiers (e.g., one or more universally unique identifiers (UUIDs)) identifying one or more task flow objects. The method 250 may include accessing the main product that integrates the task flow, and accessing the task flow object via search or by selection (e.g., via a dropdown list) (block 254). For example, the user may select the task flow object by searching for a name via an input control, and the UUID may be passed as a hidden parameter of the input control. The visual programming application 140 may select the one or more task flow objects from the database 108.

The method 250 may include accessing the task flow object and displaying it via the GUI 164 (block 256). Accessing the task flow object may differ, depending on whether the task flow includes interactive content, an interactive form, a calculator, a decision tree, a hybrid task flow object including multiple elements, or another interactive content object type. The method 250 may include executing the task flow object by displaying one or more questions corresponding to a first node of the task flow object, and receiving one or more respective user answers (block 258).

The method 250 may include analyzing the one or more answers. The method 250 may include checking whether the node requires access to one or more supporting files (block 260). When files are required, the method 250 may include attaching the required one or more files to the task flow object and enabling the user to select and view the files (block 262). The method 250 may include repeatedly executing the task flow object, by processing the nodes as in blocks 256-262 and checking whether the questions are completed (block 264). When questions remain, the method may include moving to a next uncompleted question (block 266). The method 250 may include detecting that the user has completed all applicable questions (block 268). The method 250 may include providing the user a summary of questions and answers and associated results to review (block 270). The method 250 may include integrating the user's answers/data into a data store (e.g., the database 108) and/or posting the user's answers/data to another application. For example, when the user provides a particular answer (e.g., via a dropdown or free form input), the method 250 may include performing one or more programmatic actions (e.g., sending an email,) (block 272).

It will be appreciated by those of ordinary skill in the art that the method 250 and/or 200 may include interpolating or evaluating scope variables while evaluating the flow. For example, the node may include a variable such as $current_time that is displayed each time the user accesses the node. Many other such scope variables are envisioned. Further, the task flow object may be nested. Entities within the task flow object may include reusable assets that can be shared between packages (e.g., the module "is the patient sick" may be used by many different packages). Further, at the end of the flow, the parent module may see all provided values (e.g., a list of all answered questions may be displayed). Scope values (e.g., user decisions) may be propagated between nodes.

FIG. 3A illustrates an example visual programming GUI 300, according to some aspects. The GUI 300 may correspond to the GUI application 164 of FIG. 1, in some aspects. The GUI 300 may be displayed in a browsers 302, and may include a pane 304, one or more auto-expandable nodes 306 and a control panel 308. When the user selects one of the controls, and clicks on one of the nodes 306, an event may be generated by the GUI 164 that is received by the visual programming application 140. This signal may include an identification of the signal type (e.g., unlink) and an identification of the node (e.g., a UUID of the task flow object and an identifier of the node within the task flow object).

The pane 304 may correspond to a task flow object operated by the visual programming module 140 of FIG. 1, in some aspects. The task flow object of FIG. 3A may correspond to a customer project work flow, for example. Thus, in this example, the nodes 306 may include a request node 306A that requests information, a receive node 306B that receives the requested information, and a confirmation node 306C that validates the information. The nodes 306 may include an information missing node 306D that links back to the request node 306A when the requested information is not received. The nodes 306 may include a scan node 306E that requests that the user scan information and a process node 306F that processes the scanned information. The nodes 306 may include a review node 306G and a client review node 306H. For example, the user may configure the review node to pause execution of the task flow until the user has reviewed the information at the block 306G. The nodes 306 may include a final review node 306I, when the client review is positive. The nodes 306 may include a final review node 306J that is executed when the client review is negative.

The task flow object of the GUI 300 is simplified for explanatory purposes. The task flow object may be analyzed by the interactive content model as described above. For example, the nodes 306 may be passed to the interactive content model and a new set of nodes may be output by the interactive content model. In that case, the node 306J may be removed as part of a deduplication process, wherein the client review node 306H is instead linked to the node 306D. In this way, the model advantageously reduced the amount of computational resources required to store the task flow object by removing superfluous nodes. Deduplication and other interactive content modification operations that may be performed using the one or more interactive content models are discussed below with respect to FIG. 4A, FIG. 4B and FIG. 5A. In some aspects, the interactive content models of FIGS. 4A, 4B and 5A may correspond to decision trees or other interactive content object types.

The controls 308 depict controls for adding node, deleting nodes, and connecting nodes; and for adding, deleting and connecting sub-interactive contents. In some aspects, the controls 308 may include additional controls, enabling the addition of hybrid content types to the GUI pane 304, such as particular document types (e.g., images, videos, etc.). These content types may be added to the nodes 306, for example. Each task flow object component (e.g., nodes, subtrees, etc.) may be addressed using a deep linking schema. Adding a sub-tree is discussed below.

Figure 3B:
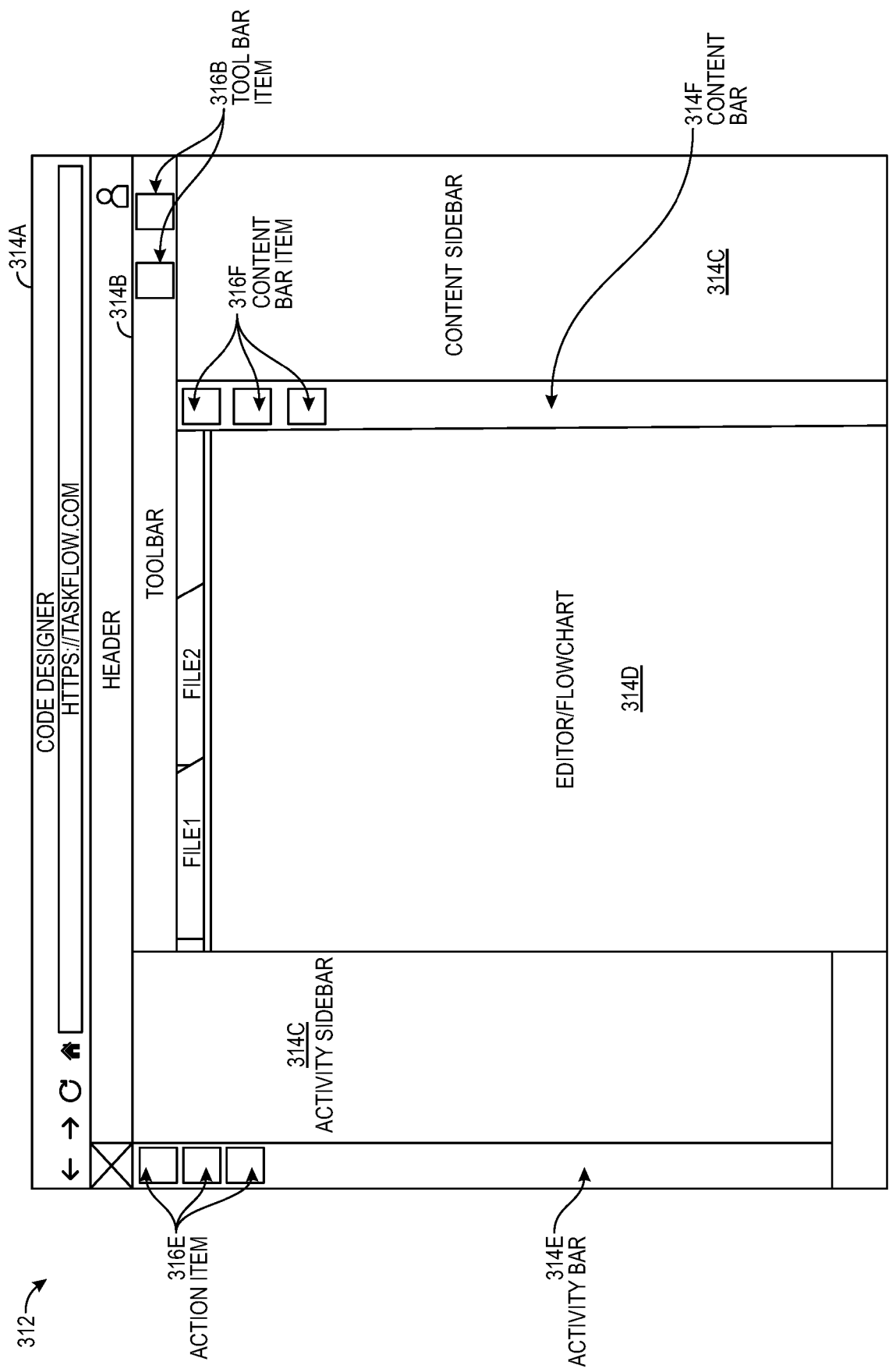
FIG. 3B illustrates another example visual programming GUI, according to some aspects.

FIG. 3B illustrates another example visual programming GUI 312, according to some aspects. The GUI 312 may include a window 314-A that includes a toolbar pane 314-B, an activity sidebar pane 314-C, a tabbed flowchart editor pane 314-D, an activity bar pane 314-E and a content bar pane 314-F. The toolbar 314-B may include one or more toolbar items 316-B. FIG. 3A may be implemented using FIG. 3B in some aspects. For example, the control panel elements 308 of FIG. 3A may be added to the toolbar item 314-B as individual toolbar items 316-B. The content bar 314-F may include one or more content bar items 316-F, that may also in some aspects correspond to the elements 308 of FIG. 3A. The activity bar 314-E may include one or more action items 316-E.

Exemplary Branding, Customization & Localization

Figure 3C:
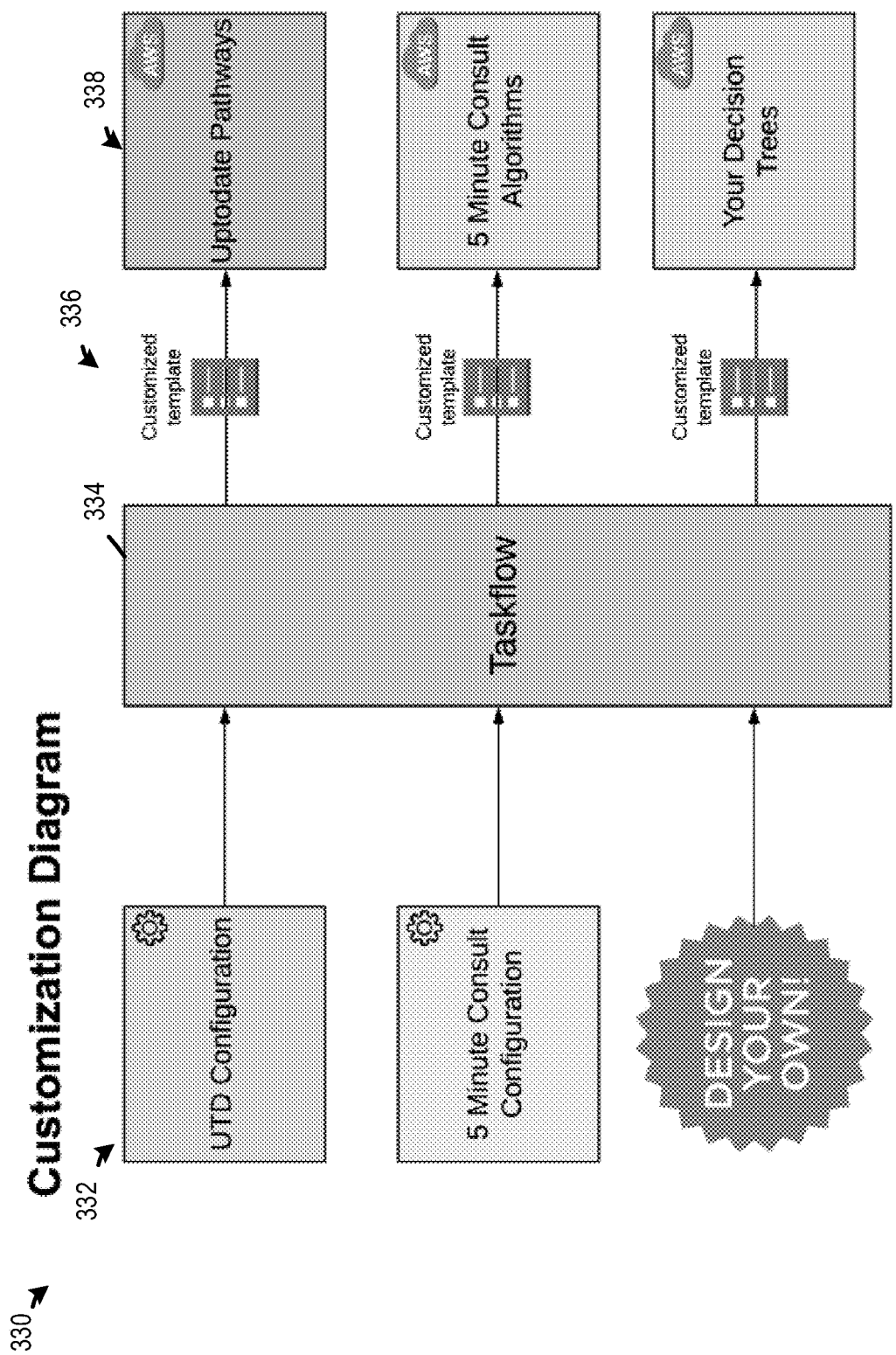
FIG. 3C depicts an exemplary user experience branding, customization and localization block diagram, according to some aspects.

FIG. 3C depicts an exemplary user experience branding, customization and localization block diagram 330, according to some aspects. The diagram 330 includes configuration, consultation and design-your-own inputs whereby a customer may be allowed to configure parameters of the task flow editor, including selecting supported language and other features (block 332). The diagram 330 includes a task flow module that may accept the parameters of block 332 (block 334). The task flow module may generate customized templates (block 336) that are executed in one or more cloud instances (block 338). Thus, the present techniques enable different users to configure differently-branded instances of the task flow editor of FIG. 3B, for example, and to deploy the differently-branded instances in the cloud, to provide a customized experience for different sets of users. One or more brand may be established that includes brand-specific override styles. A hierarchy of files and folders may be used to provide overrides, using a web framework such as Angular (for example).

Further, the present techniques include a feature toggling feature that enables different tiers to services to disable/enable certain features based on tenant or brand configuration. Feature flags may be defined in different places. For example, a client computing application (the GUI application 164) may include a local storage API that includes one or more feature toggle entries that control the appearance of the GUI application 164. E.g., code may be used to enable text difference functionality (localStorage.setItem('tfFeatureToggle', JSON.stringify(["textDiff"]))). Features may be toggled on the client or server side, affecting the user experience in the GUI application 164.

Figure 3D:
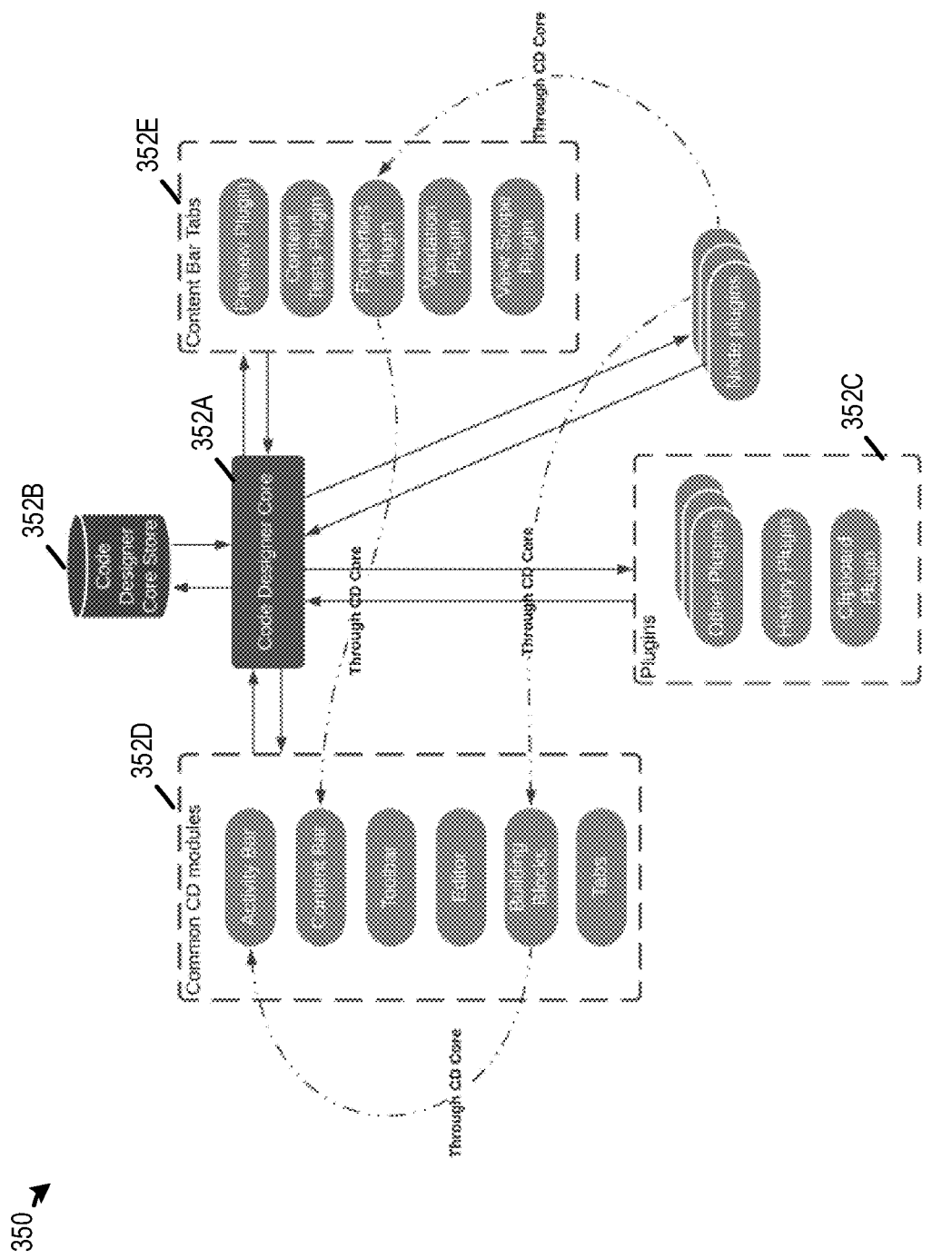
FIG. 3D depicts an exemplary code designer data flow diagram environment, according to some aspects.

FIG. 3D depicts an exemplary code designer data flow diagram environment 350, according to some aspects. The environment 350 may be used, in some aspects, to programmatically generate the visual programming GUI 312.

The environment 350 includes a code designer core 352A, a code designer core store 352B, a set of plugins 352C, a set of common modules 352D and a set of content bar tabs 352E. The code designer core 352A may include instructions and services that expose the interface to work with the code designer as a bus between different devices of the code designer environment 350. The code designer core store 352B may be an electronic database that is used by the code designer to store data (e.g., a plugin configuration, an entity, an element, one or more functions, angular components, etc.). The common modules 352D may include one or more common plugins related to components, action, selectors and specific data related to these modules.

For example, the modules 352D may include an activity bar API to work with the activity side bar 314-C of the visual programming GUI 312, and a content bar API that provides functionality for configuring the content sidebar 314-C. The modules 352D may further include toolbar, editor, and tabs APIs that respectively enable the environment 350 to configure the toolbar 314B, editor 314D and tabbed interface of the GUI 312. The modules 352D may also include a building blocks module for creating items within the sidebars and toolbars. The plugins 352C may include instructions for adding blocks to the code designer environment 350. The content bar tabs 352E may include instructions for extending the content bar 314-F and for adding new content to it.

Exemplary Model-Driven Interactive Content Modification

As discussed above, the present techniques enable the non-technical user to build interactive content objects comprising, optionally, different node types and different sub-trees using graphical user interfaces (e.g., the GUI 300 of FIG. 3A.). As further discussed above, the present techniques include modeling components that modify the interactive content objects created by the user, to improve the trees, while maintaining the semantic meaning of the interactive content objects as created by the user. The present techniques also enable the user to easily generate additional sub-trees within a task flow object based on existing interactive content objects within the task flow object.

Figure 4A:
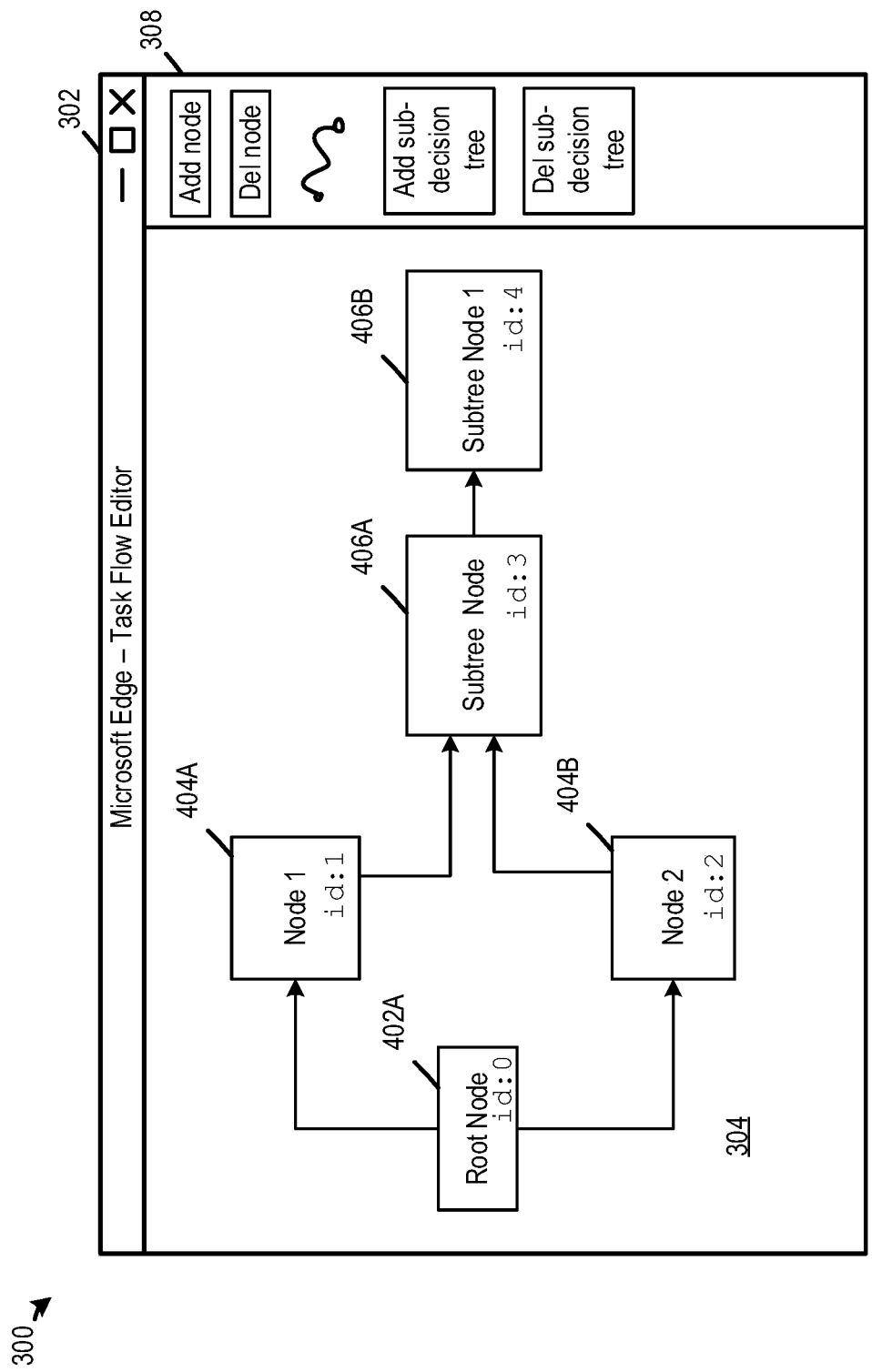
FIG. 4A depicts the visual programming GUI of FIG. 3A, according to one aspect.

For example, FIG. 4A depicts the visual programming GUI 300 of FIG. 3A, according to one aspect. The GUI 300 includes a task flow object having a root node 402A, the root node 402A having two nodes 404A, 404B and the nodes 404A, 404B having two subtree nodes 406A, 406B. Each of the root node 402A, node 404A, node 404B, subtree node 406A and subtree node 406B has a respective node identifier (id). While the respective node identifiers are depicted as being integer-based, the identifiers may use another numbering scheme (e.g., a UUID).

In the example of FIG. 4A, the user may want to clone the subtree node 406A (i.e., to add a copy of the subtree node 406A) to the task flow object. The user may choose to do so accessing the controls 308 and/or via a context menu that may be accessible in response to a command input event of the user (e.g., a right-mouse click event on the subtree node 406A). For example, with respect to FIG. 1, the I/O module 142 may monitor the user's input for such context events, and the modules 140 may include instructions that, when executed, cause the system 102 to clone a particular node or subtree based on an identifier included in the detected context event. For example, continuing the above example with respect to FIG. 4A, when the user indicates that the user wants to clone a particular element (e.g., the subtree node 406A) the interactive content module 146 may generate a cloned subtree node and add the cloned subtree node to the task flow object, as depicted in FIG. 4B.

As discussed above, conventional technique for modifying task flow objects are inefficient and cause inconsistency issues. Specifically, having separate subtree data in different states in conventional systems requires data to be synced on every function call. Undo-redo operations require subtree data to be re-calculated and refreshed on every undo-redo operation, and unlinking/deleting operations requires interactive content nodes/objects to be available, requiring the entire tree to be fetched on every function call. Further converting operations require recalculation of all child nodes, and switching between subtrees requires all data to be reloaded. The present techniques advantageously avoid such inefficiencies. Specifically, in some aspects, the structure of the task flow objects is internally stored not based on a tree data structure, but rather, as a graph, wherein each node of the graph may have multiple parents.

Figure 4B:
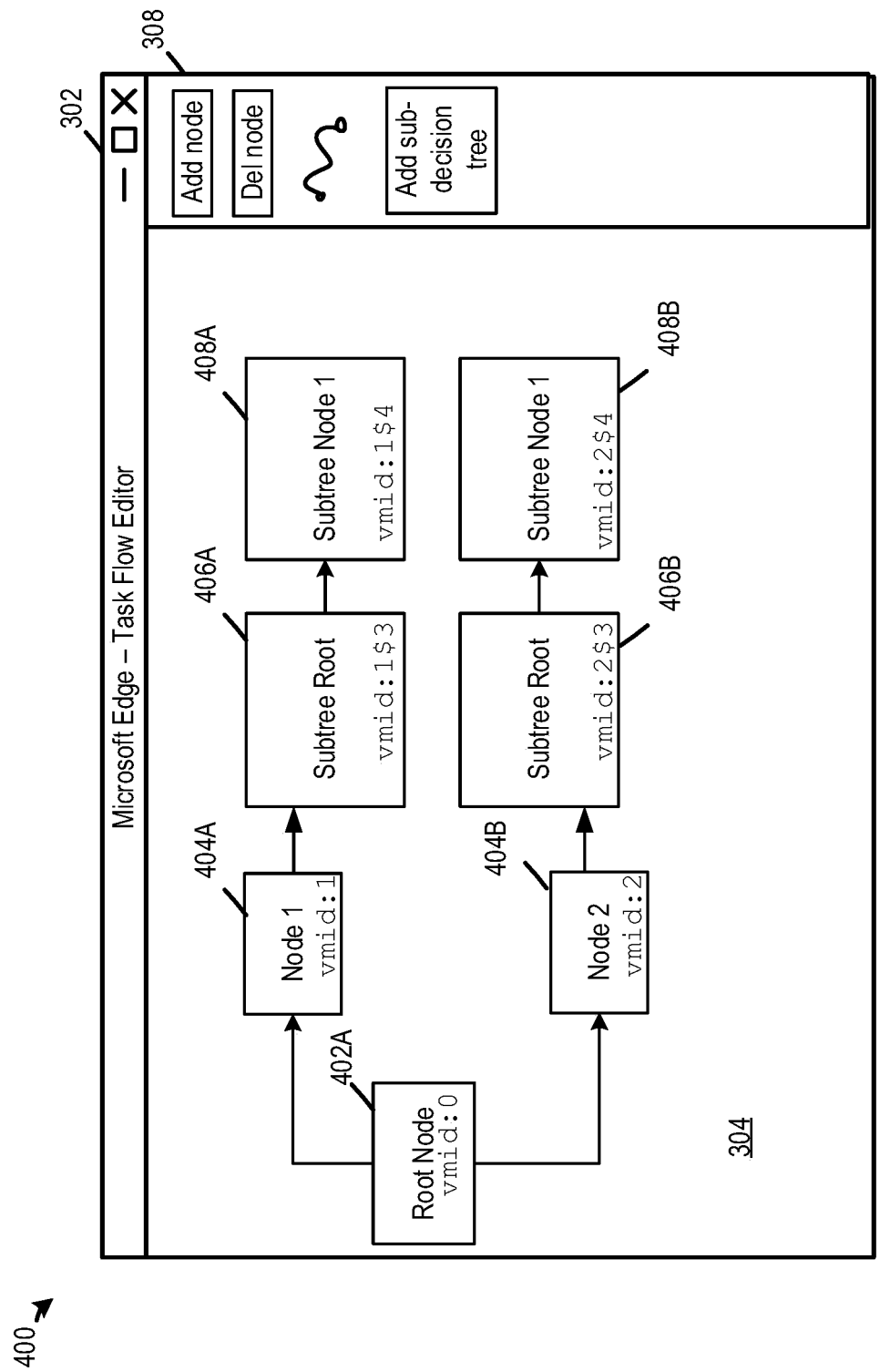
FIG. 4B depicts the visual programming GUI of FIG. 3A and FIG. 4A, wherein cloned subtree nodes have been added, according to one aspect.

FIG. 4B depicts the visual programming GUI 300 of FIG. 3A and FIG. 4A, wherein cloned subtree nodes have been added, according to one aspect. Specifically, the subtree node 406A (id:3) has been cloned as two new subtree nodes 406A, 406B having a respective virtual identifier (i.e., vmid:1$3 and vmid:2$3). Each of the cloned subtree nodes 406A, 406B have a respective subtree node (i.e., subtree nodes 408A and 408B) each having a respective virtual identifier (i.e., vmid:1$4 and vmid 2$4).

Figure 5A:
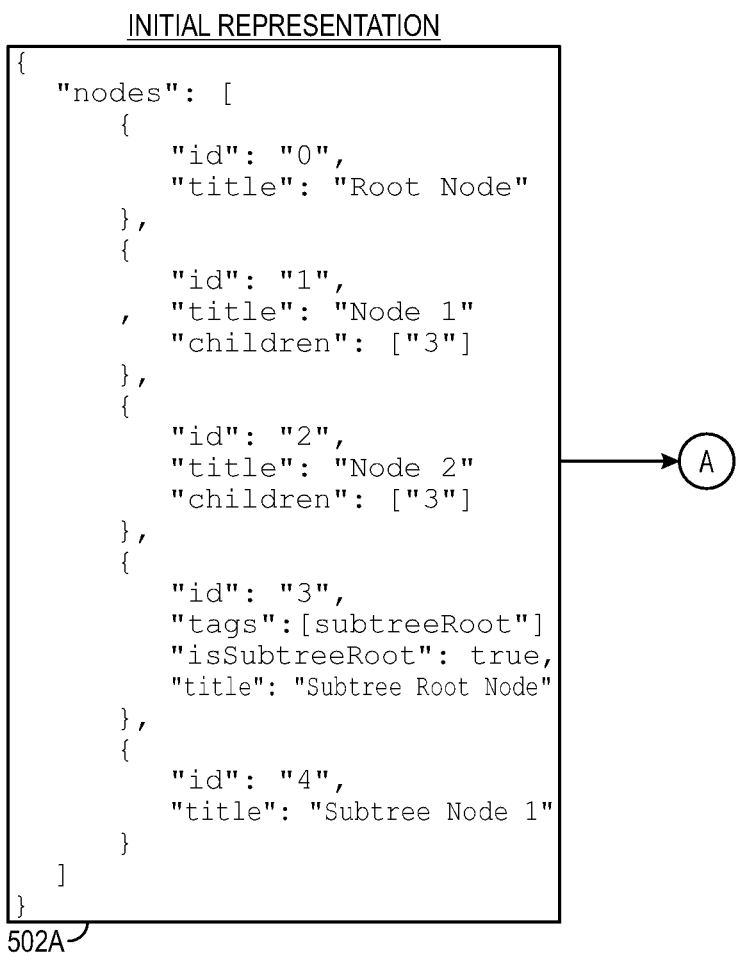
FIG. 5A illustrates a flow diagram depicting the transformation of an initial task flow representation via a decision tree model to an intermediate storage representation, and to a virtual representation, according to some aspects.
Figure 5A:
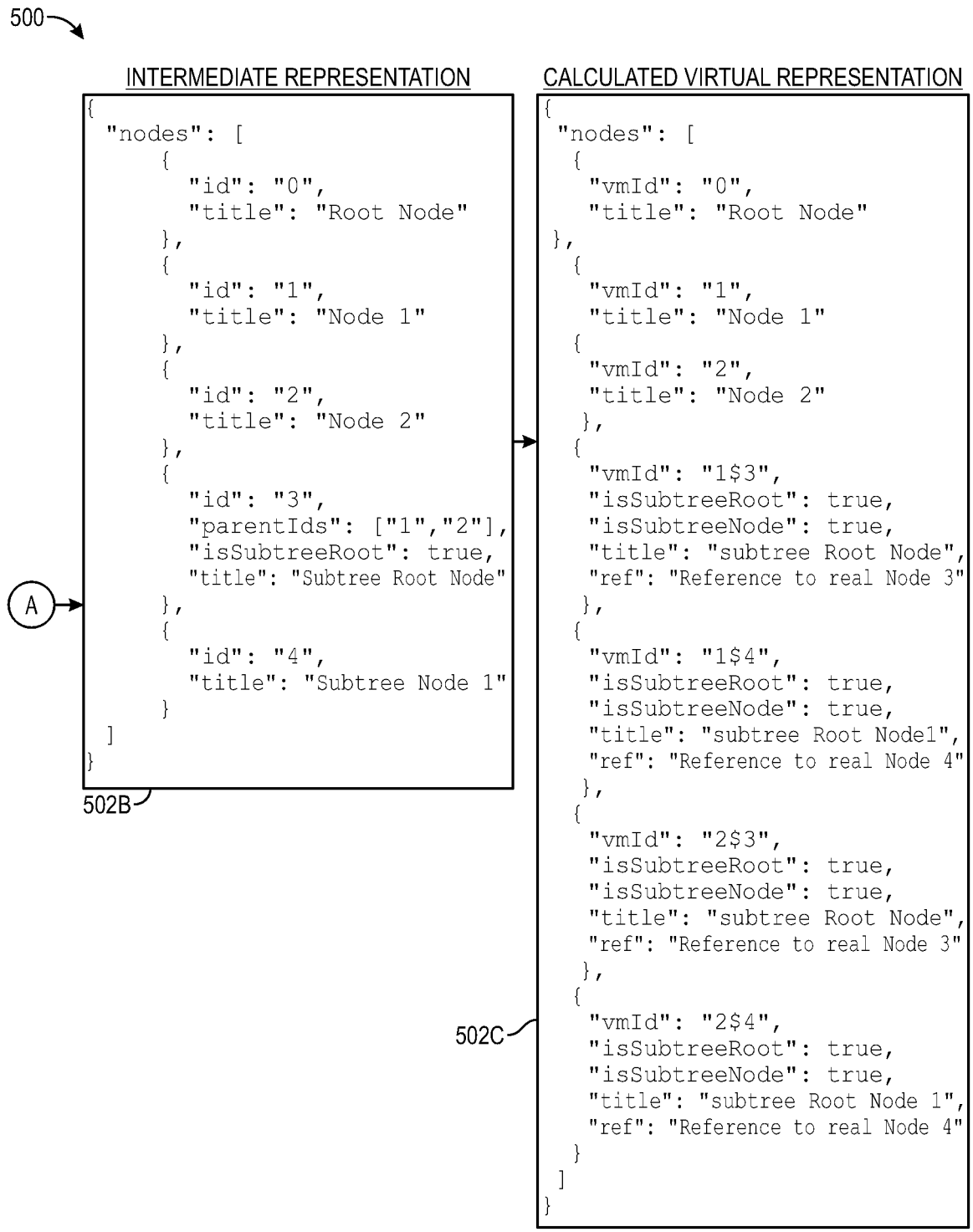

FIG. 5A illustrates a flow diagram 500 depicting the transformation of an initial task flow representation 502A via an interactive content model to an intermediate storage representation 502B, and to a virtual representation 502C, according to some aspects of the present technique. In operation, the transformation may be performed by the modules 140 (e.g., via one or more model). The GUI 300 may transmit the initial representation 502A to the server 102 for processing, or, in some aspects, may include instructions for processing the initial representation 502A locally, e.g., in the GUI application 164 of the client computing devices 104A, 104B.

In some aspects, the initial task flow representation corresponds to the task flow object depicted in FIG. 4A, and the virtual representation 502C corresponds to the task flow object depicted in FIG. 4B. The model may traverse the representation of the task flow object of FIG. 4A and, when a particular node is a subtree root node, the model may push the node identifier into a tags array, as shown in initial task flow representation 502A with respect to the subtree node 406A (id:3). The interactive content model may internally assign an array of parent identifiers to each node as shown in the intermediate storage representation 502B (e.g., the subtree node 406A of FIG. 4A has parent identifiers 1, 2 corresponding to the nodes 404A, 404B of FIG. 4A). The interactive content model may further add a boolean value indicating that the node is a subtree root to the intermediate storage representation 502B.

The GUI 300 may receive the intermediate representation 502B from the model and further process the intermediate representation 502B to create the calculated virtual representation. Thus is seen one of the advantages of the present techniques, namely, that by processing the intermediate representation on the client side, the server 102 processing resources are saved, improving the overall computing environment by distributing the load. A further advantage is that subtree information is never duplicated on the server 102 but is rather calculated by the GUI 300. In this way, the nodes stored on the server 102 always have their real identifiers and virtual identifiers are not need to be stored, saving significant storage, especially for large task flow objects.

The GUI 300 may include dedicated selectors that perform subtree-related data computation required for proper sub-tree rendering. The selectors may be subroutines of the GUI application 164, for example. The selectors create the virtual identifiers for the nodes of the calculated virtual representation 502C, including the virtual identifiers of the subtree root nodes (e.g., the subtree 406A and the subtree 406B) as shown in FIG. 4B. Yet further advantages and improvements brought about by the present techniques include an overall simplified edge computing paradigm, wherein only a few lines of code are required to render the task flow objects because there is a balanced division of computation between the server 102 and the client computing devices 104A, 104B, in some aspects. This enables the reactive programming paradigm, wherein no data is duplicated in the server storage, and there is no longer a need to synchronize and/or re-calculate subtree data. Further, the virtual addressing scheme inherently treats subtree nodes and non-subtree nodes as fungible data types, simplifying other operations (e.g., redo/undo, side-by-side difference comparisons, etc.).

The interactive content objects of FIG. 4A and/or FIG. 4B may be implemented in the GUI 312 of FIG. 3B. For example, one tab of the GUI 312 may depict the tree of FIG. 4A while a second tab depicts the tree of FIG. 4B including a calculated virtual representation. It will be appreciated by those of ordinary skill in the art that the identifiers depicted as part of nodes in FIG. 4A and FIG. 4B (e.g., vmid:0 of node 402A) are for illustrative purposes and may not be displayed, in some aspects.

Exemplary Data Models

As discussed, operations affecting task flow objects may include managing lists of sub interactive content objects, creating/inserting sub interactive content objects, creating content within sub interactive content objects, deep-linking sub trees (e.g., where a given sub tree has multiple parents and, optionally a unique path), and generating one or more indications of sub interactive content objects for display in a GUI.

Figure 5B:
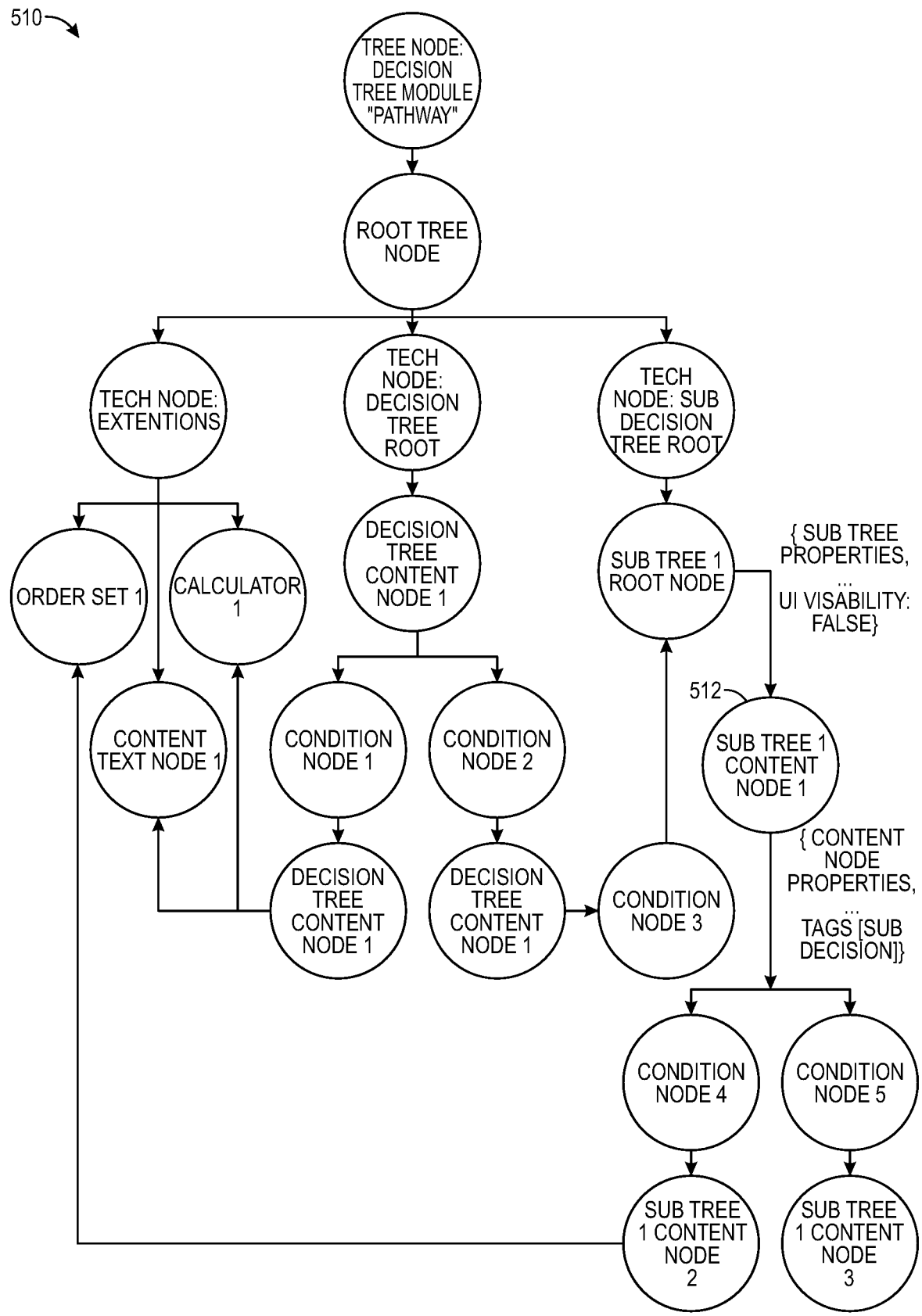
FIG. 5B illustrates a task flow data model, according to an aspect.

FIG. 5B depicts a task flow data model 510, according to an aspect. The task flow data model 510 includes an interactive content objects module pathway having a root node associated with a plurality of child nodes. In the data model 510, a sub interactive content object 512 is stored under one or more technical node (i.e., one or more sub interactive content root nodes). The sub interactive content object 512 may have a root node, wherein information about sub interactive content object (e.g., node title) is stored. A visibility property may be set on the sub tree, such that the node is not displayed during rendering by the GUI. Special link nodes may be used to link the main tree and one or more sub trees.

Figure 5C:
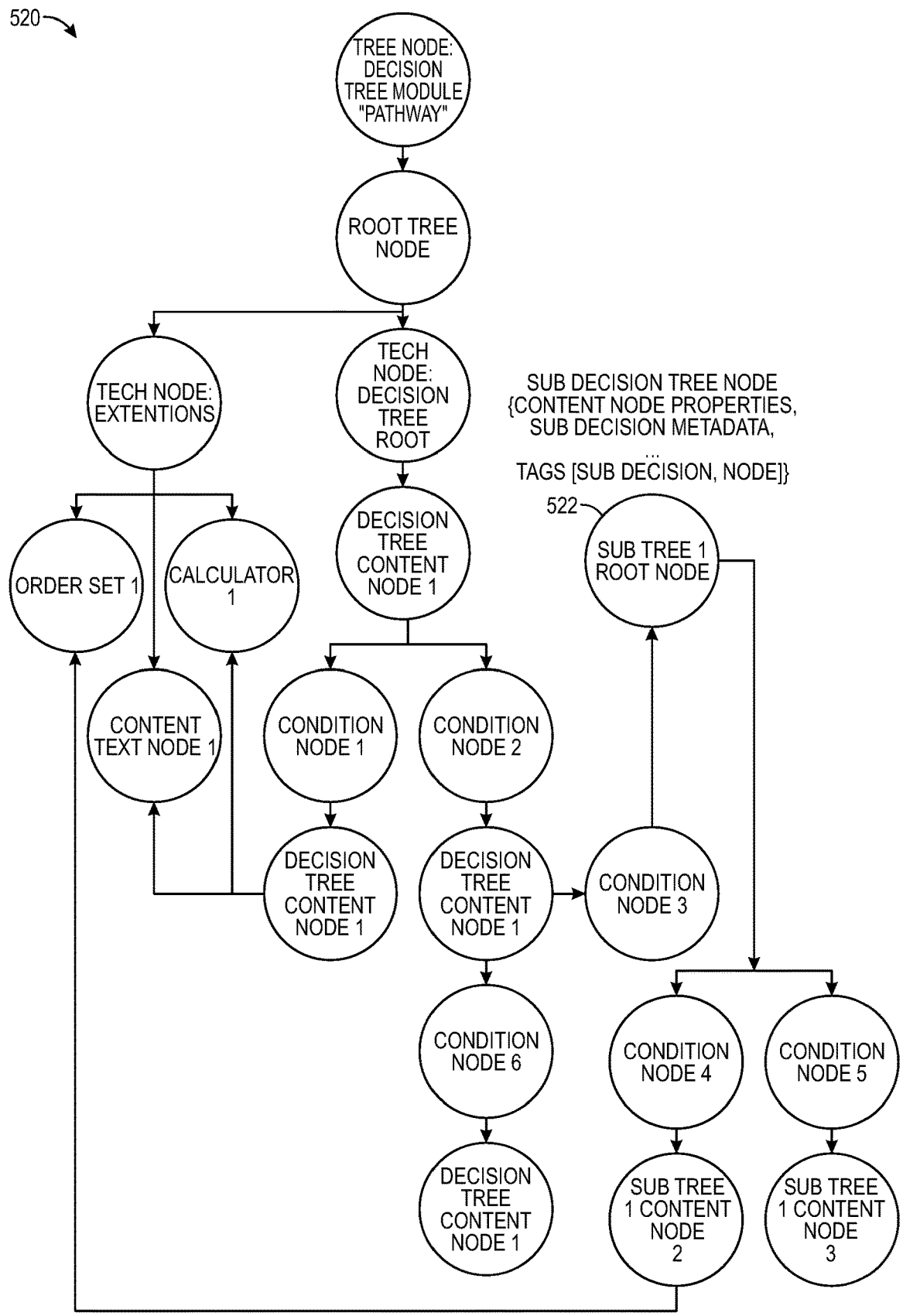
FIG. 5C illustrates another task flow data model, according to an aspect.
Figure 5D:
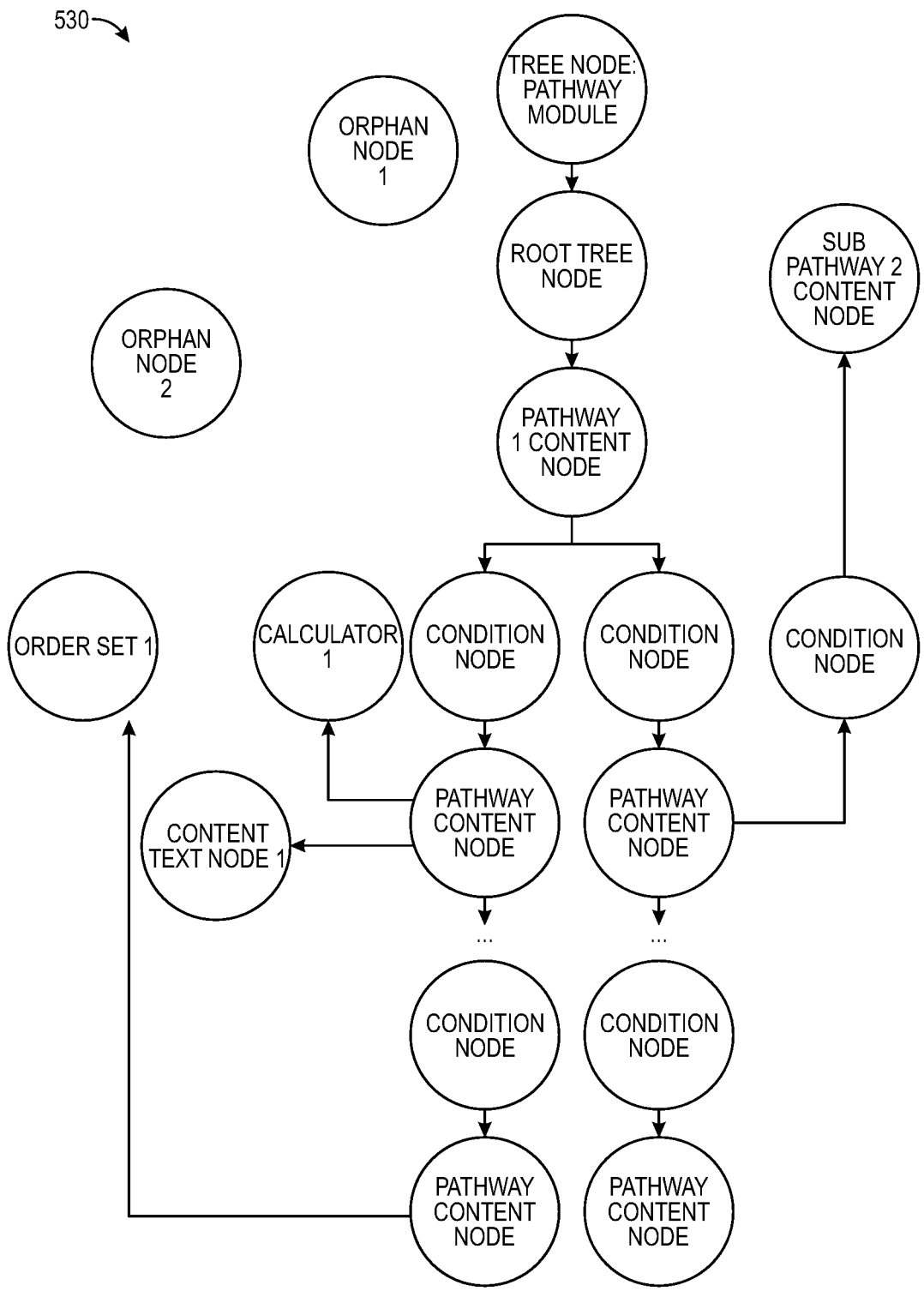
FIG. 5D depicts an example pathways data model, according to some aspects.

FIG. 5C depicts another task flow data model 520, according to an aspects. The task flow data model 520 includes an interactive content module pathway having a root node associated with a plurality of child nodes. In the data model 520, a sub interactive content object 522 is not stored under a technical node. Rather, the technical node on the root level is removed and sub decision nodes are addressed via a tag (e.g., tags[subDecision, Node]). Content nodes in the task flow data model 520 are converted to sub decision nodes using tags. Sub decision nodes can extend existing nodes (e.g., content nodes) with sub decision metadata and additional tag(s). Sub interactive content metadata may be stored in content nodes. Task flow operations such create operations may link nodes and content nodes with sub decision tags. Converting or reverting operations may include adding or removing sub decision tags. The techniques depicted in FIG. 5C advantageously enable avoiding technical nodes, and enable get-by-tag operations that can be used, for example, to retrieve a list of all sub decision nodes. FIG. 5D depicts an example pathways data model 530, according to some aspects. Conventional storage of pathways may not be suitable, given usage and requirements. Different interactive models (e.g., different decision trees) may store calculators and pathways within the interactive content. Thus, calculators can be included in specific pathways, in multiple places, and this creates a maintenance overhead. The present techniques may store each pathway module in a separate interactive model, as shown. Herein, a technical node groups sub-content (e.g., sub-decision trees), as shown in FIGS. 5B and 5C. FIG. 5D depicts a different data model, that does not use technical nodes. In some aspects, this alternative data model enables faster object traversal and/or retrieval.

Exemplary Package and Manifest Aspects

Figure 6A:
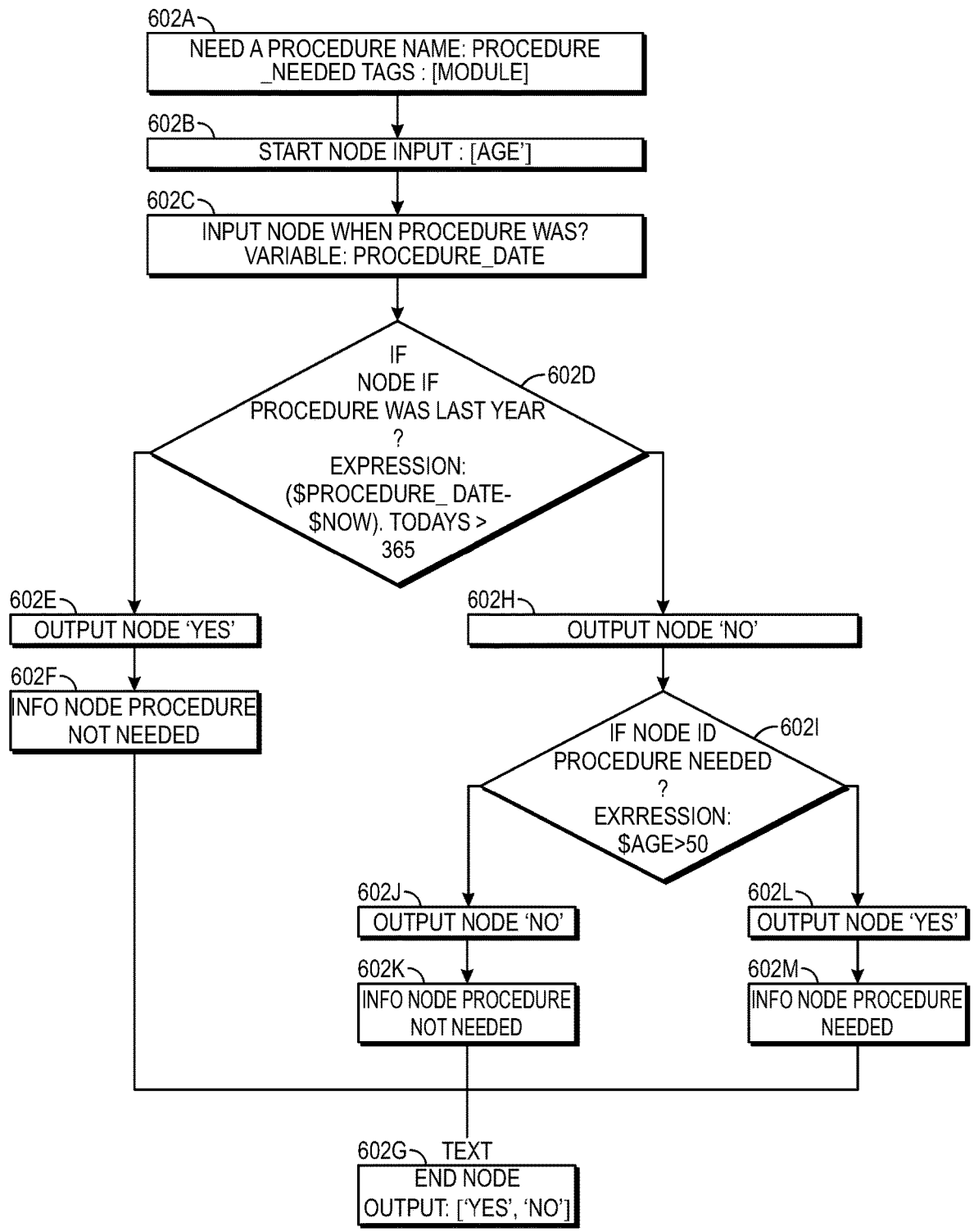
FIG. 6A depicts an exemplary authoring flow diagram for performing a health procedure screening, according to some aspects of the present techniques.

FIG. 6A depicts an exemplary authoring flow diagram of a computer-implemented method 600 for performing a health screening procedure (e.g., a mammogram screening), according to some aspects of the present techniques. The method 600 includes receiving a procedure name (block 602A) and collecting one or more input nodes (602B).

The method 600 may include receiving a procedure date (block 602C) and checking whether the procedure date is more than a year old (block 602D). When the procedure is more than one year old (block 602E) the method 600 may include determining that further procedure information is not needed (block 602F) and the method 600 may terminate (block 602G). When the procedure date is less than one year old (block 602H) the method 600 may include determining whether a procedure is needed according to an age parameter (block 602I). For example, the age parameter may be a number range corresponding to a patient's age, such as >50 years. When the patient does not satisfy the range parameter (block 602J) the method 600 may determine that the procedure is not needed (block 602K) and the method 600 may terminate (block 602G). When the patient satisfies the range parameter (block 602L) the method 600 may determine that the procedure is needed (block 602M) before the method 600 terminates (block 602G). The method 600 illustrates different block node types that may comprise the task flow object (e.g., branching nodes, answer nodes, output nodes, info nodes, end nodes, input nodes, start nodes, etc.).

Figure 6B:
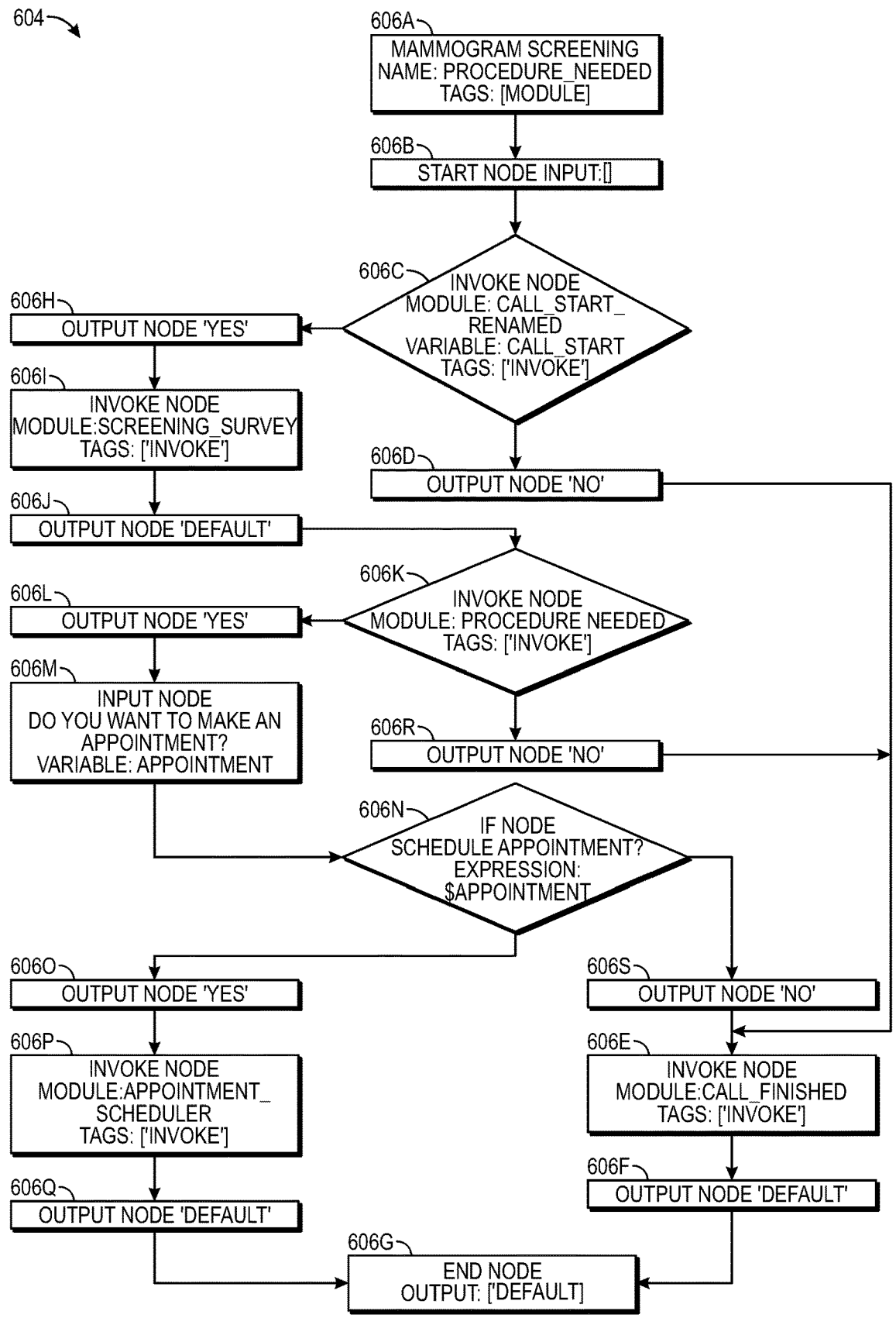
FIG. 6B depicts an exemplary authoring flow diagram of a computer-implemented method for performing a health screening procedure, according to some aspects.

FIG. 6B depicts an exemplary authoring flow diagram of a computer-implemented method 604 for performing a health screening procedure, according to some aspects. The method 604 may include receiving a screening name (block 606A).

The method 604 may include starting the procedure (block 606B). The method 604 may include activating an invoke node (block 606C). Invoke nodes may be nodes used for reference and may have a module property, defining a module to call. When the node is not invoked (block 606D), the method 604 may include calling another invoke node (block 606E) and activating an output node (606F), and terminating the method 604 (block 606G). When the invoke node 606C is invoked (block 606H) the method 604 may include invoking a screening survey invoke node (block 606I) and outputting a default value (block 606J). The method 604 may further include activating a screening procedure invoke node (block 606K) and when a screening procedure is needed (block 606L) the method 604 may include collecting an appointment variable from the user in response to a GUI prompt (block 606M). The method 604 may include determining whether the user wants an appointment (block 606N).

When the user wants an appointment (block 606O), the method 604 may include invoking an appointment schedule invoke node (606P) that generates a default output (block 606Q) and terminating the method (block 606G). When the procedure is not needed, the method 604 may include visiting a negative output node (block 606R). When a schedule appointment is not needed, the method may include visiting a negative node (606S) prior to accessing the invoke node 606E.

Figure 6C:
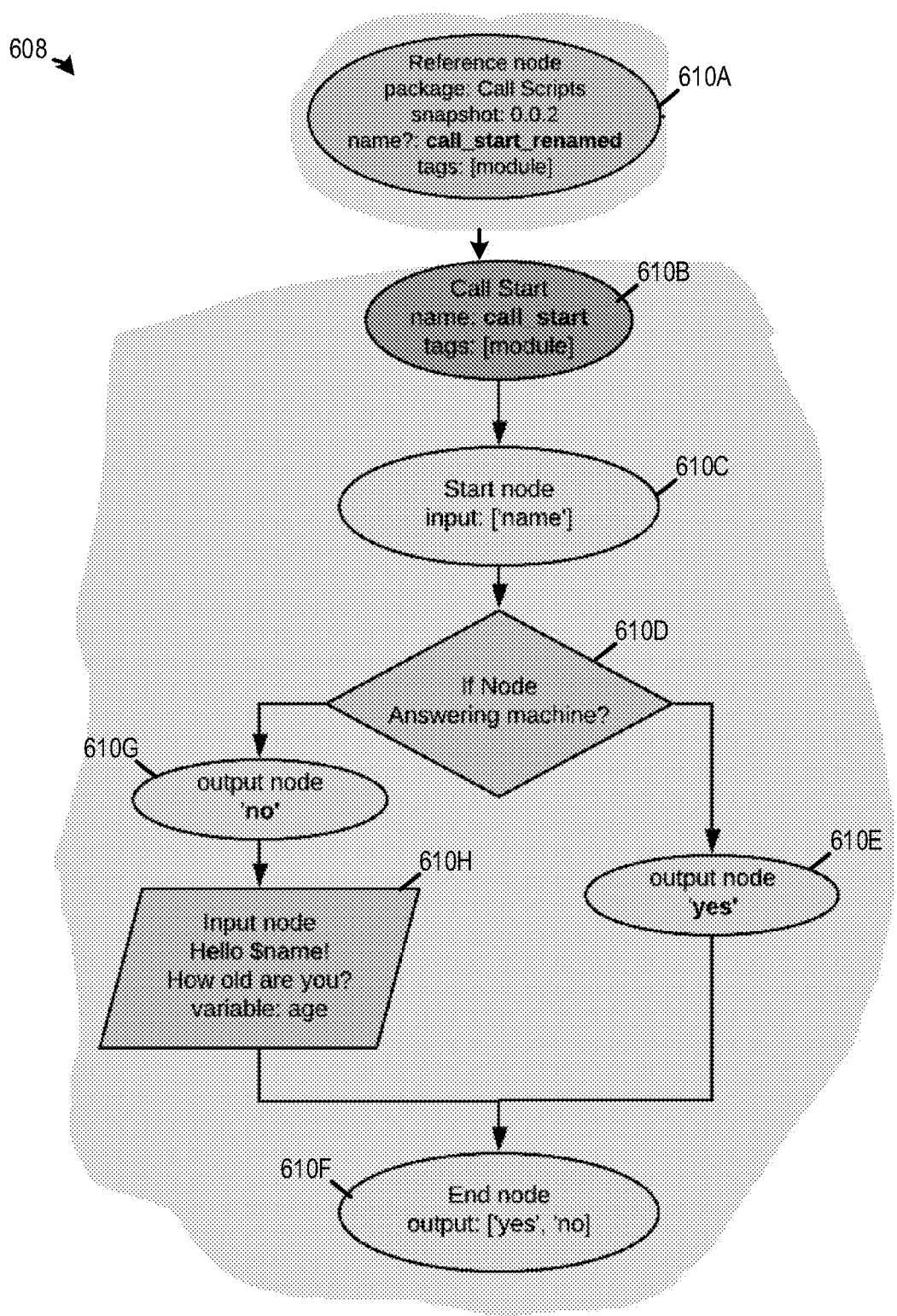
FIG. 6C depicts an exemplary authoring flow diagram of a computer-implemented method for performing a telephone call action, according to some aspects.

FIG. 6C depicts an exemplary authoring flow diagram of a computer-implemented method 608 for performing a telephone call action, according to some aspects. The method 608 may include receiving a call configuration package (block 610A). The method 608 may include receiving a call start instruction (block 610B) and visiting a start node (block 610C). The method 608 may include determining whether the visited node is an answering machine node (block 610D). When the node is an answering machine node (block 610E), the method 608 may terminate (block 610F. When the node is not an answering machine (block 610G), the method may include prompting the user using an interpolated name parameter to provide an age variable, and storing the age variable in a named parameter (block 610H).

Figure 6D:
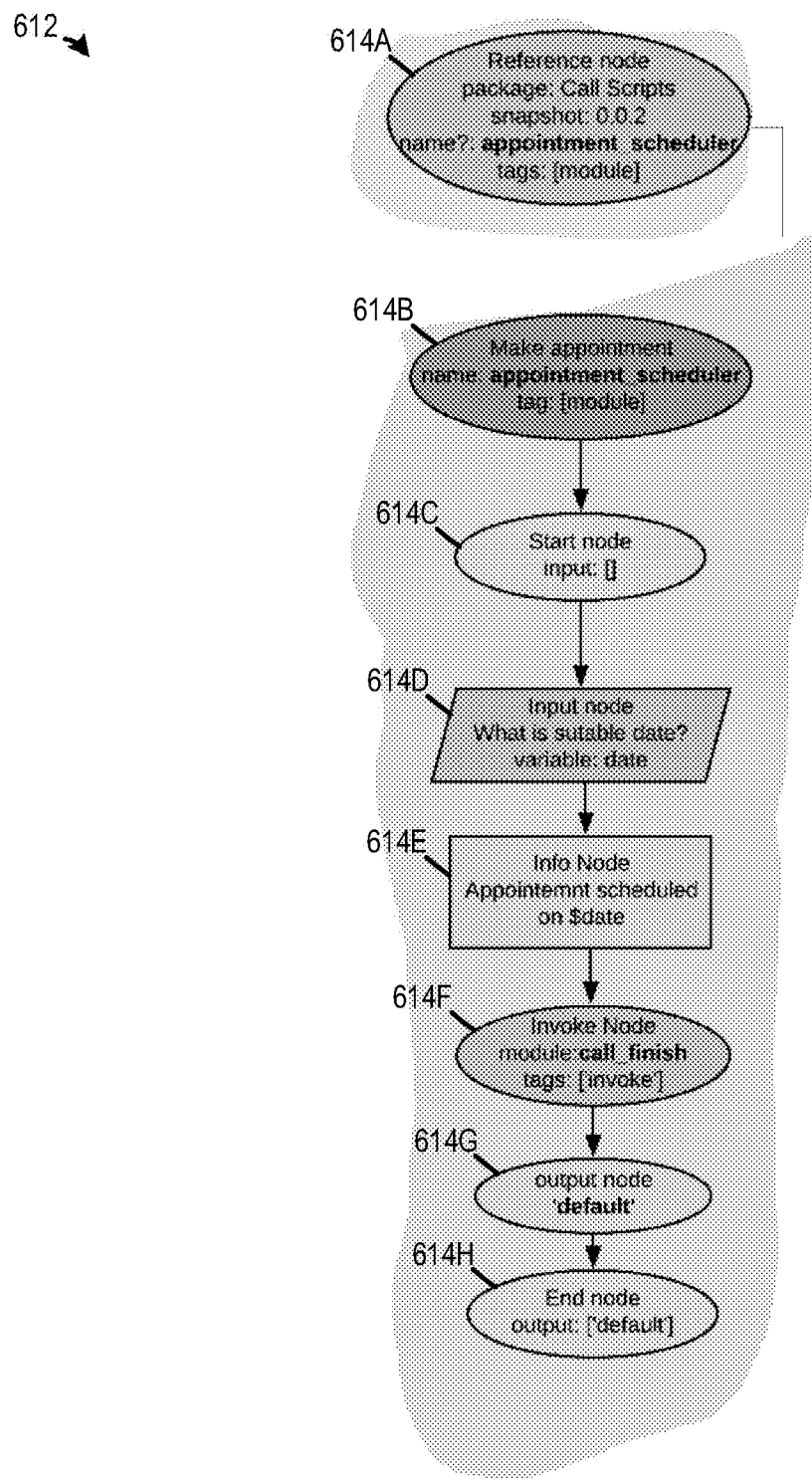
FIG. 6D depicts an exemplary authoring flow diagram of a computer-implemented method for performing a telephone appointment scheduler action, according to some aspects.
Figure 6E:
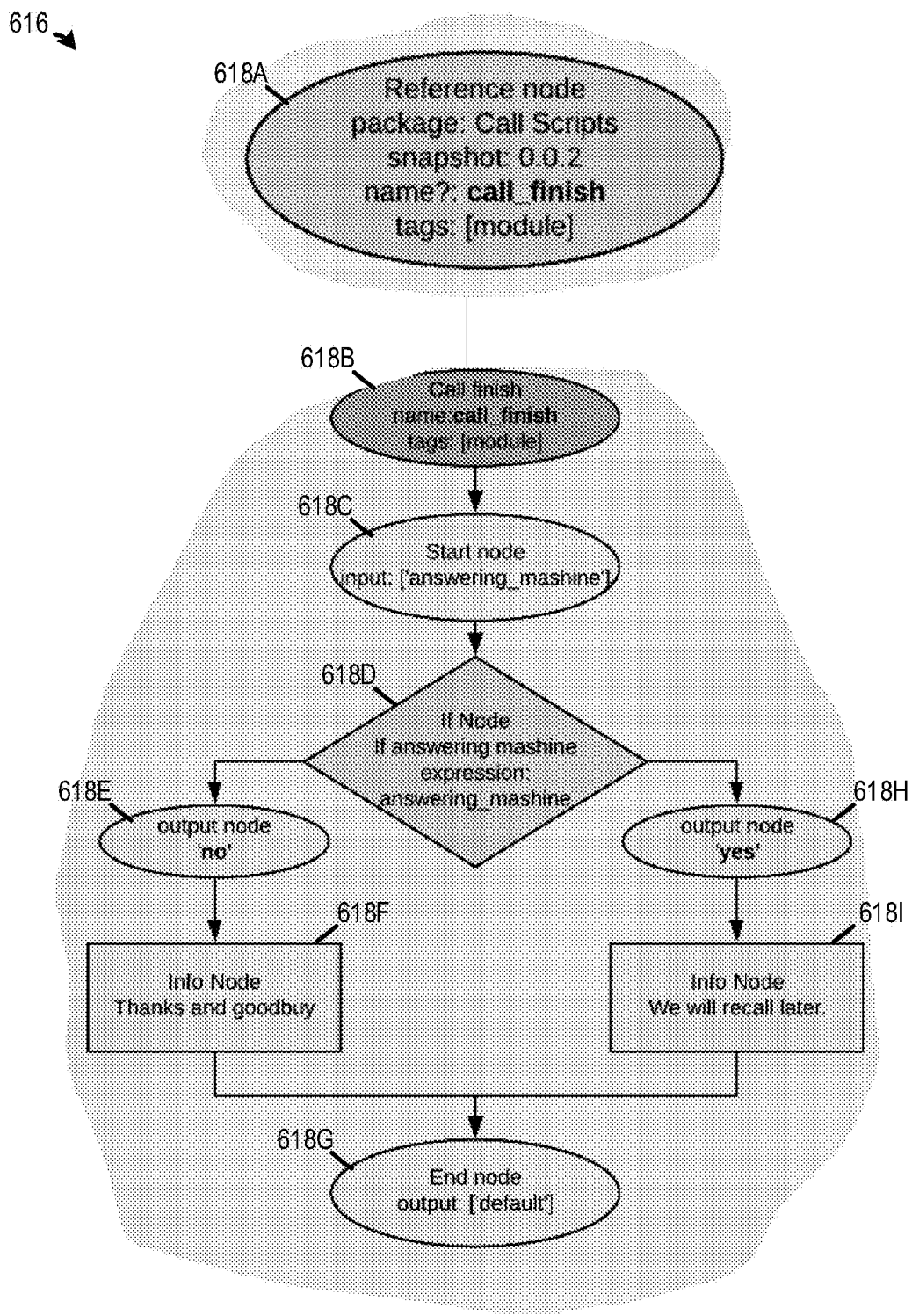
FIG. 6E depicts a computer-implemented variation on the methods depicted in FIG. 6A-6D.

FIG. 6D depicts an exemplary authoring flow diagram of a computer-implemented method 612 for performing a telephone appointment scheduler action, according to some aspects. The method 612 includes receiving a call configuration package (block 614A). The method 612 may include receiving a make appointment tag (block 614B) and starting the method 612 (block 614C). The method 612 may include prompting the user for a suitable date and collecting a date variable (block 614D). The method 612 may include generating an information node including an appointment scheduled message, interpolating the date variable (block 614E). The method 612 may include visiting an invoke node including a call finish instruction (block 614F), that generates an output node (block 614G) and terminating the method (block 614H). FIG. 6E depicts a computer-implemented variation of FIG. 6A-6D.

The nodes and interactive contents represented in FIGS. 6A-6D may be implemented as packages that have a predetermined structure, namely that each interactive content object includes certain attributes (e.g., id, snapshot, metadata, type, default permission, dependencies, root node id, etc.). The nodes may include certain attributes (e.g., id, metadata, tags, children, etc.). The packages may be versioned, and accessed via manifests as discussed below.

Figure 7A:
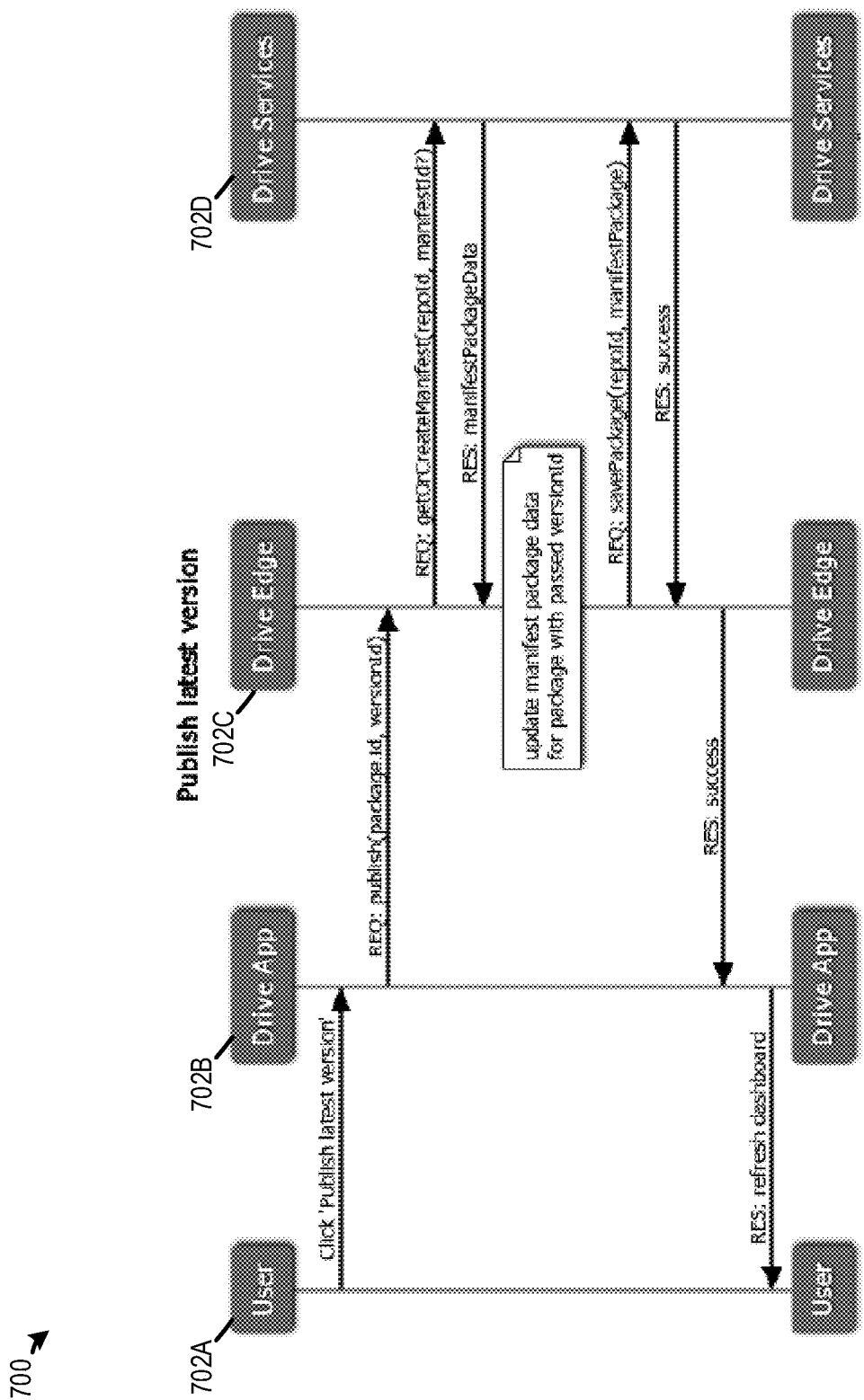
FIG. 7A depicts a sequence diagram schematically illustrating publication of a task flow object, according to an aspect.

FIG. 7A depicts a sequence diagram 700 schematically illustrating publication of a package, according to an aspect. The sequence diagram 700 includes a user 702A choosing to publish a latest version of a package, and a drive application 702B receiving the latest version. For example, the user 702A may access the client computing device 104A of FIG. 1A to access a drive application located in the server 102 or in another remote computing device. Next, the sequence diagram 700 may include causing the drive application 702B publishing a request object to a drive edge 702C, that further causes a request to be invoked against a drive services 702D. The sequence diagram 700 depicts a response from the drive services 702D to the drive edge 702C (both of which may be located in the server 102 of FIG. 1, in some aspects) that enables the drive edge 702C to update manifest package data for the package included in the response manifest package data. The update may include the drive edge submitting a request to save the package, the request including a repository identifier and copy of or reference to the package update. The drive services 702D may issue a success response that may be propagated by the drive edge 702C and/or the drive app 702B to the user 702A, whereupon the GU may be refreshed.

Figure 7B:
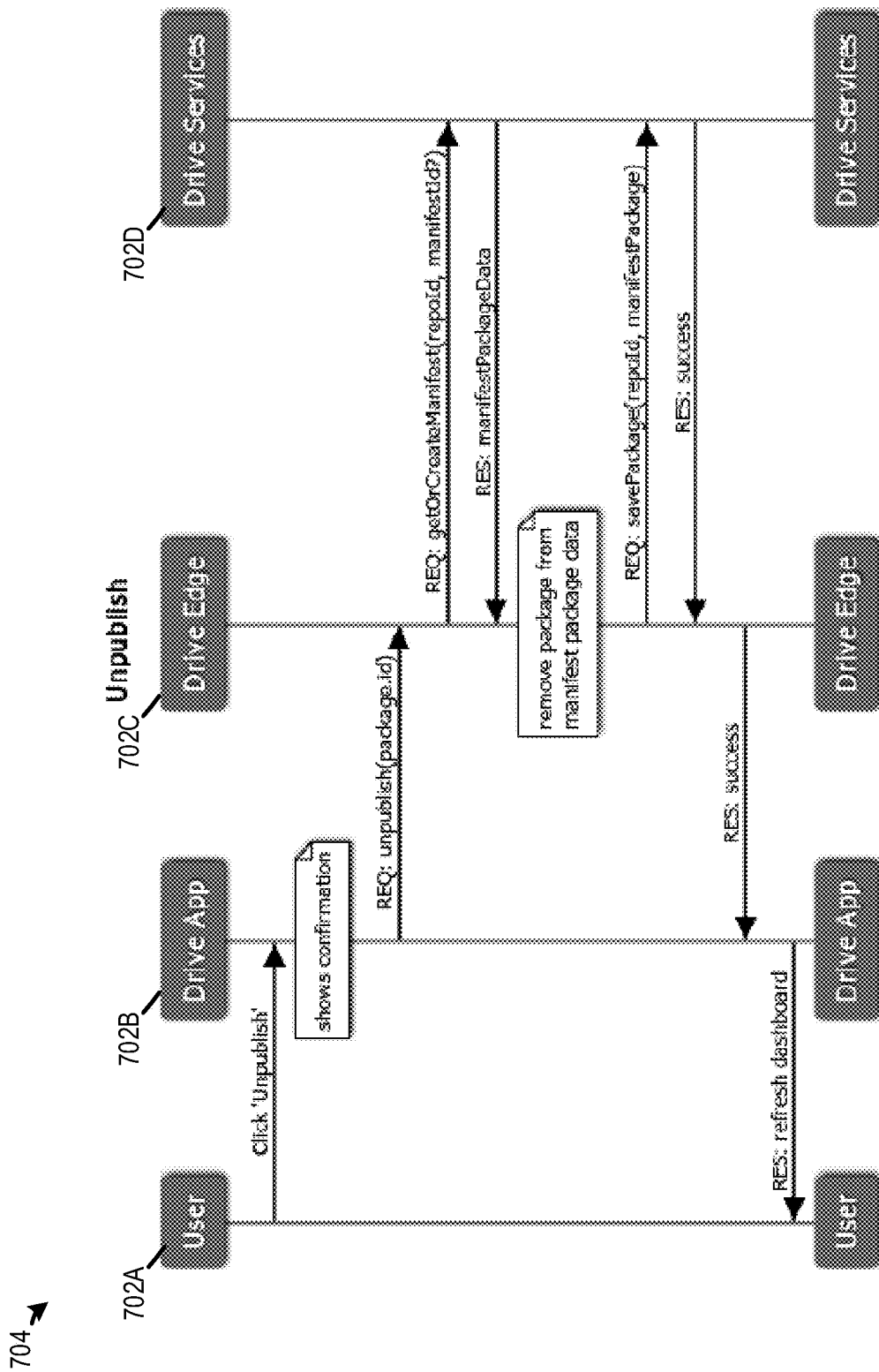
FIG. 7B depicts a sequence diagram schematically illustrating un-publication of a task flow object, according to an aspect.

The sequence diagram 700 may operate, in some aspects, to publish or revert a specific package version or to un-publish a package, as shown in FIG. 7B.

FIG. 7A depicts a sequence diagram 704 schematically illustrating un-publication of a package, according to an aspect. The sequence diagram 704 includes the user 702A, drive app 702B, drive edge 702C and drive services 702D depicted in FIG. 7A. The process begins when the user 702A chooses to un-publish a package. The drive app 702B may cause a confirmation to be confirmed by the user, and then submit a request to un-publish including parameters (e.g., a package id) to the drive edge 702C, that may in turn case a request to be generated to retrieve a manifest by parameters (e.g., a repository id and/or manifest id) to the drive services 702D. The drive services 702D may response with a manifest package matching the provided parameters. The drive edge 702C may cause the matching package to be removed from the manifest package data by saving the package by parameters to the drive services 702D. The sequence diagram 700 may include propagating messages from the drive services 702D to the user 702A, and refreshing the GUI of the user 702A client device.

Figure 8A:
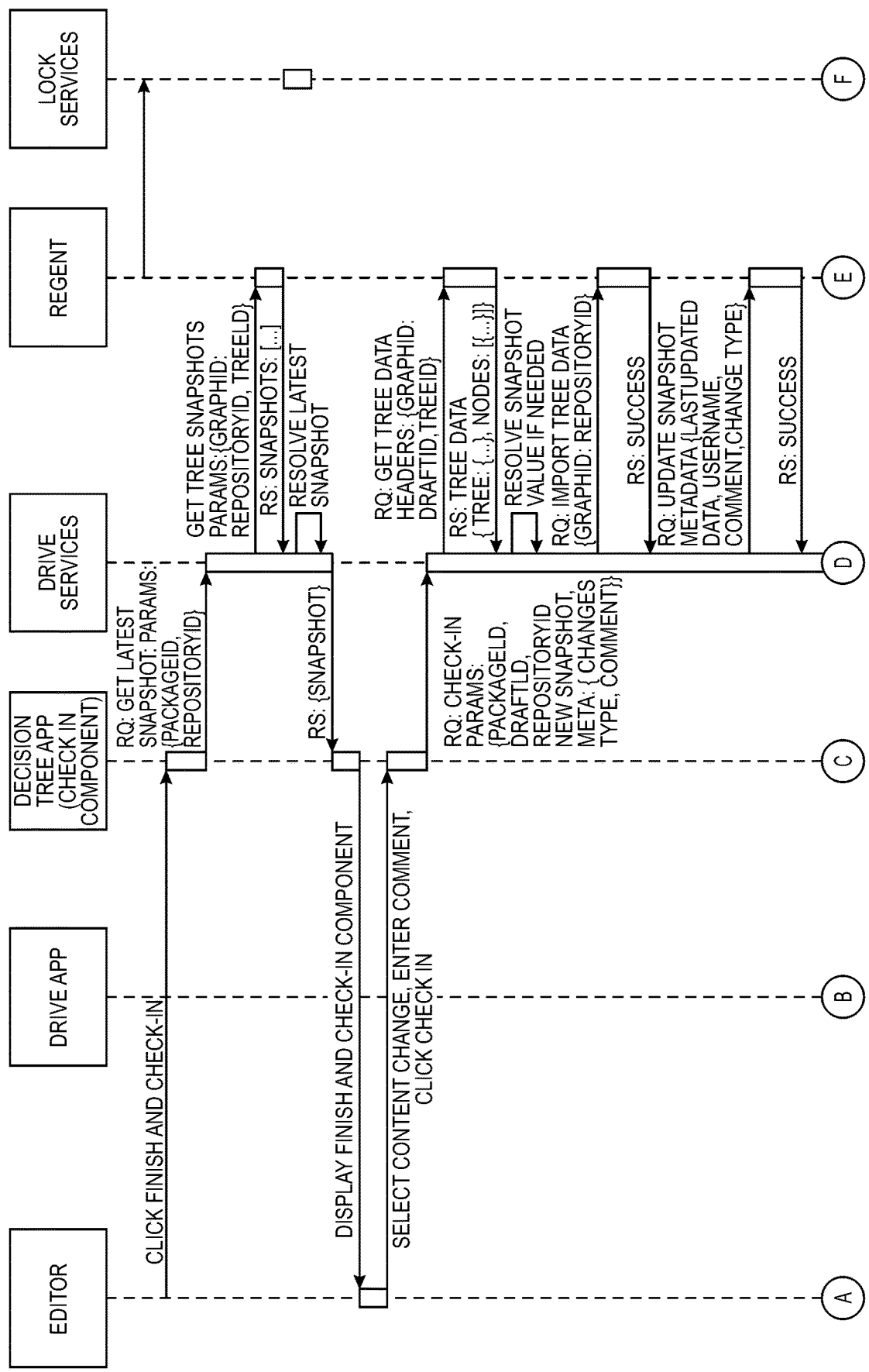
FIG. 8A depicts a sequence diagram schematically illustrating package snapshots, according to an aspect.
Figure 8A:
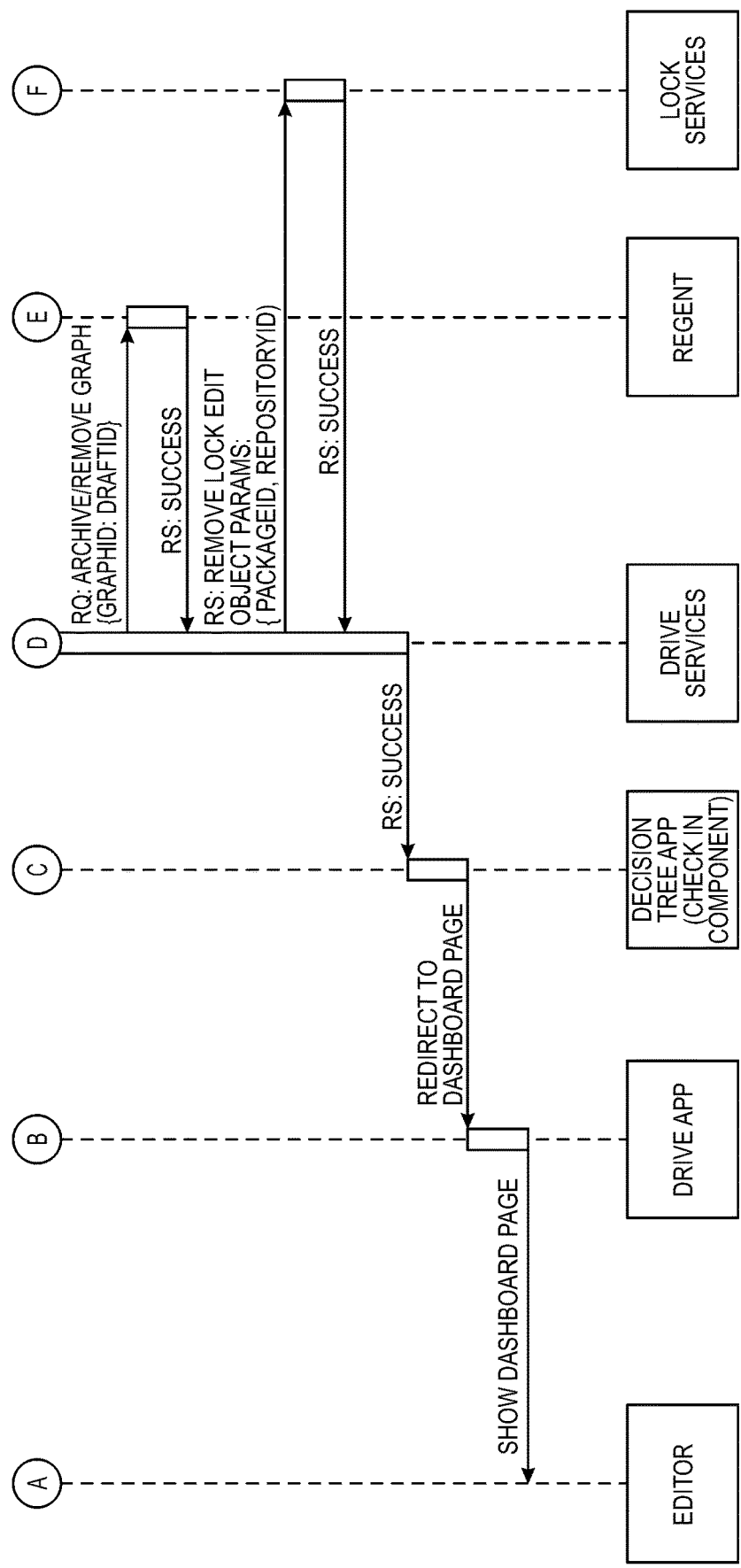
Figure 8B:
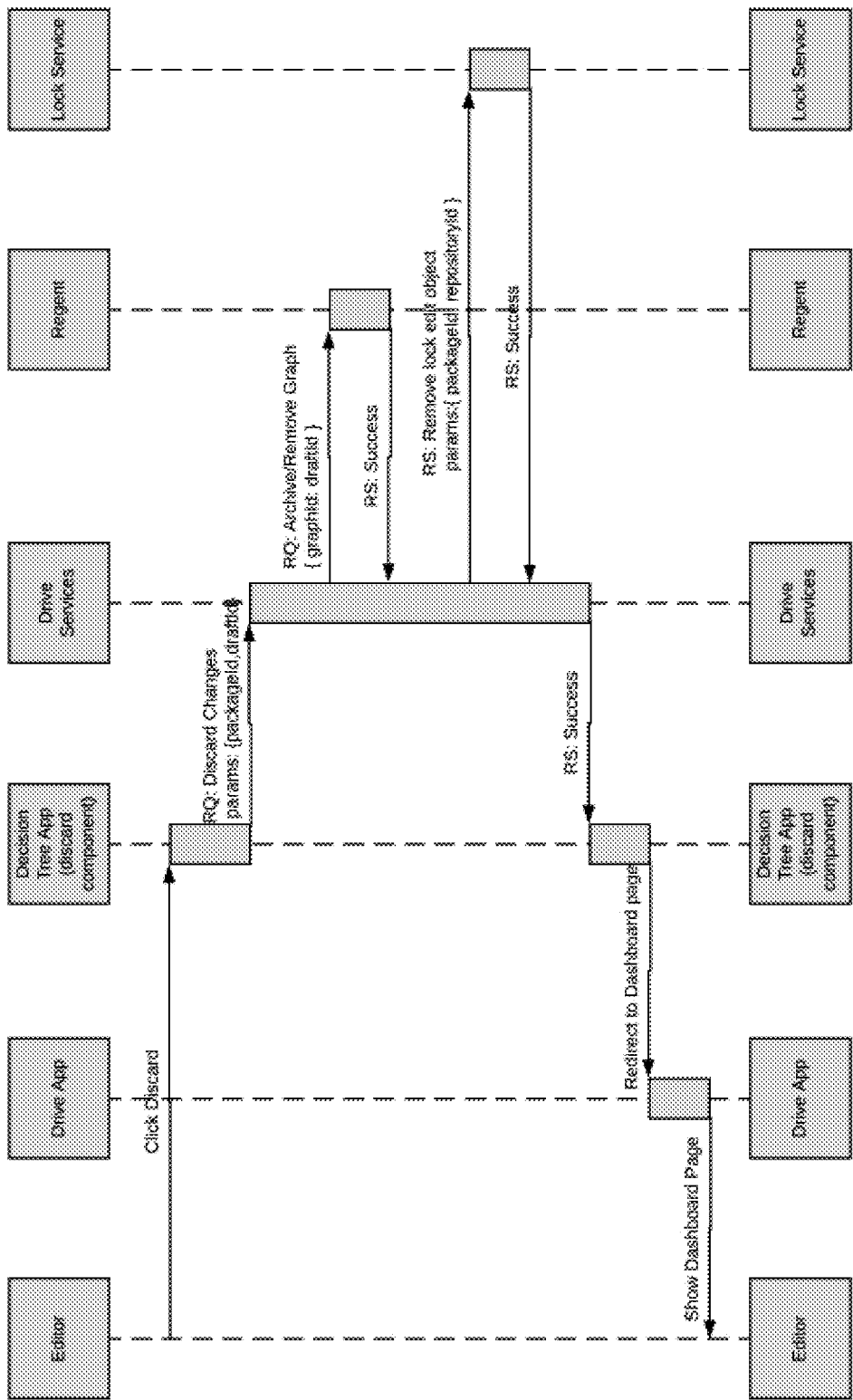
FIG. 8B depicts another sequence diagram schematically illustrating package snapshots, according to an aspect.

FIG. 8A and FIG. 8B are further sequence diagrams depicting package snapshots, enabling users (e.g., editors) to save new versions (e.g., major, minor, patch, etc.) of packages. The sequence diagrams may include saving drafts, automatic saving, and version control. Automatic saving advantageously prevents an editor from losing work, for example if the editor accidentally clicks on a node without saving, and in case of power failures, or system crashes. Automatic saving may be based on GUI events, such as user interaction events.

Figure 8C:
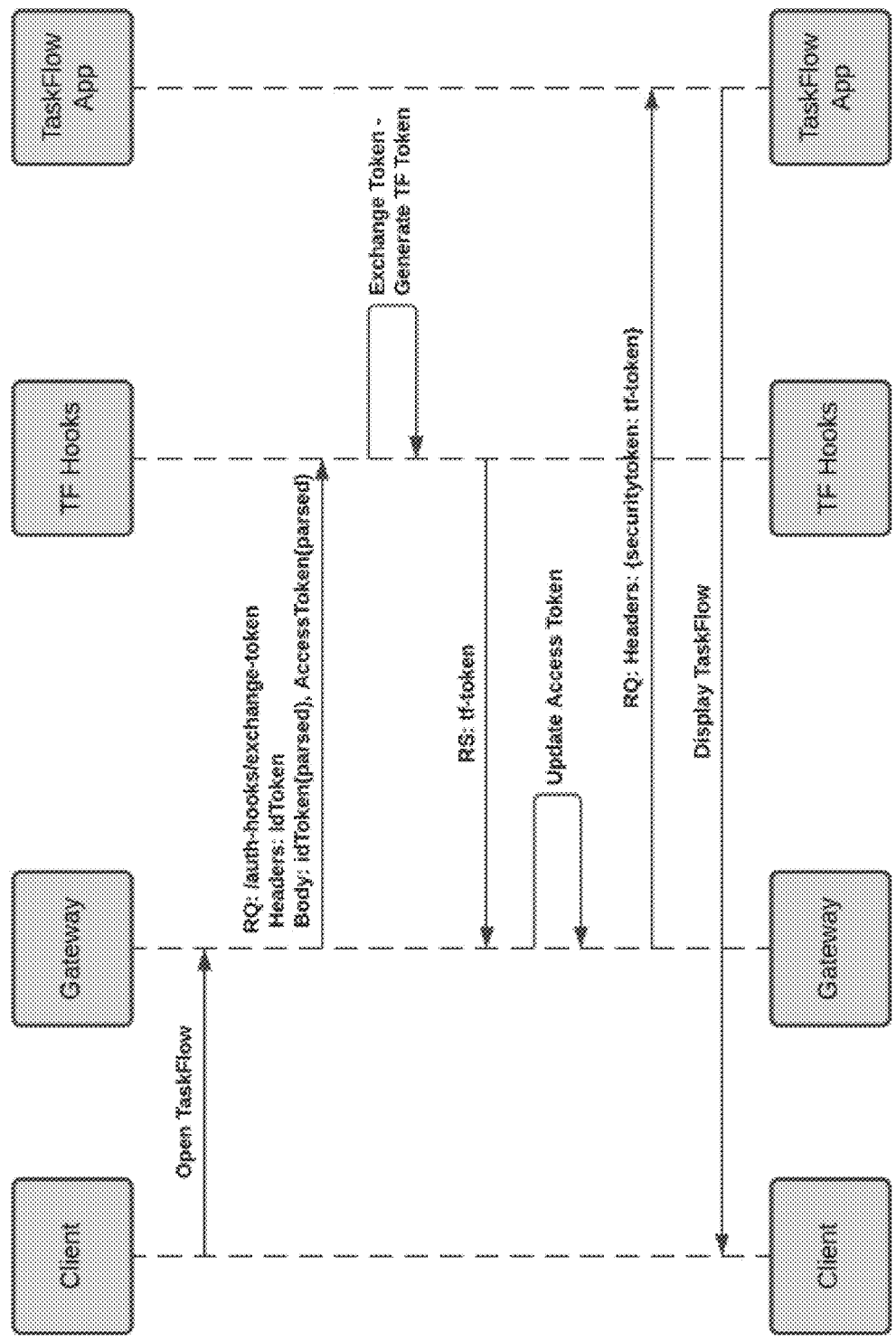
FIG. 8C is a further sequence diagram depicting use of a single task flow token for enabling communications to external services, according to an aspect.
Figure 8D:
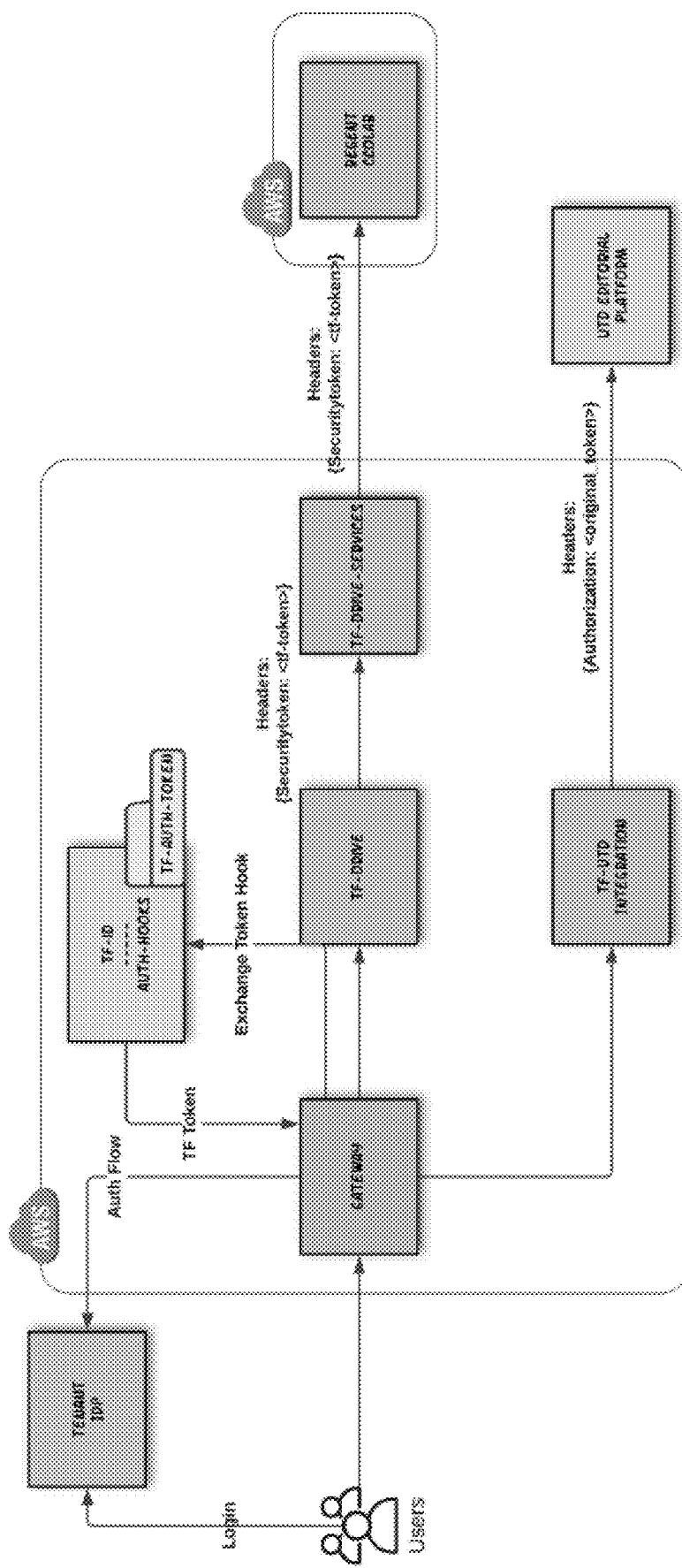
FIG. 8D is a token exchange flow block diagram that corresponds to the sequence diagram of FIG. 8C.

FIG. 8C is a further sequence diagram depicting use of a single task flow token for enabling communications to external services, according to an aspect. The task flow architecture supports a growing amount of different identity providers (IDPs). When there are few IDPs, authentication scales well. But with a large number, security risks can occur because each new IDP needs to be introduced in all external task flow services. Thus, a single token flow is used in FIG. 8C to exchange all incoming IDP tokens to task flow token using gateway token hooks. FIG. 8D is a token exchange flow block diagram that corresponds to the sequence diagram of FIG. 8C. The task flow token may include the following attributes:

sub: string; //'${tenant}!${sub}'–tenant+sub value from IDP
username: string; // full name used to display on UI
email: string; // user email,
role: Role, // user role for tenant for current token tenant: string, // current tenant for which token was issued
iss: string; // issuer "https://tf-prod", "https://tf-dev", "https://tf-local"
nbf: number; // not before claim
exp: number; // expiration time claim
original?: string; // original token—used to sent to external customer systems—UTD EP as example. This is optional field used for idps where we need to have original tokens in some requests to external systems
aud?: : string; // The "aud" (audience) claim identifies the recipients that the JWT is intended for.
Getting from original if exists
account?::string; // HostedDomain of Google IDP and tenantId of MS IDP—used to identify IDP authorizationto TF tenant
pkgs?: string[ ]; // list of the packages that user has access to
reviewId?: string; // review Id of Reviewer user.

Figure 8E:
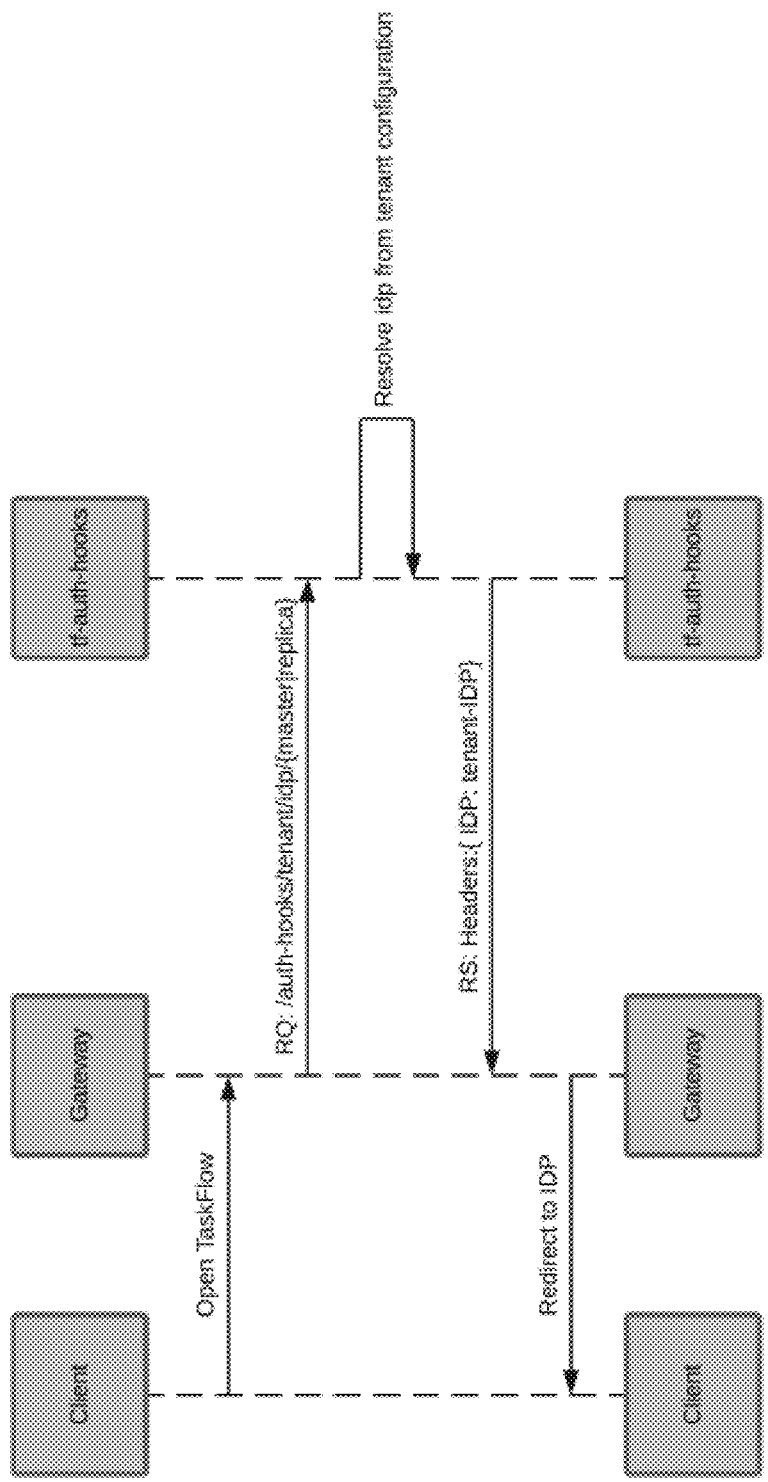
FIG. 8E depicts using a gateway IDP hook to retrieve IDP from the tenant configuration and redirecting to that IDP.
Figure 8F:
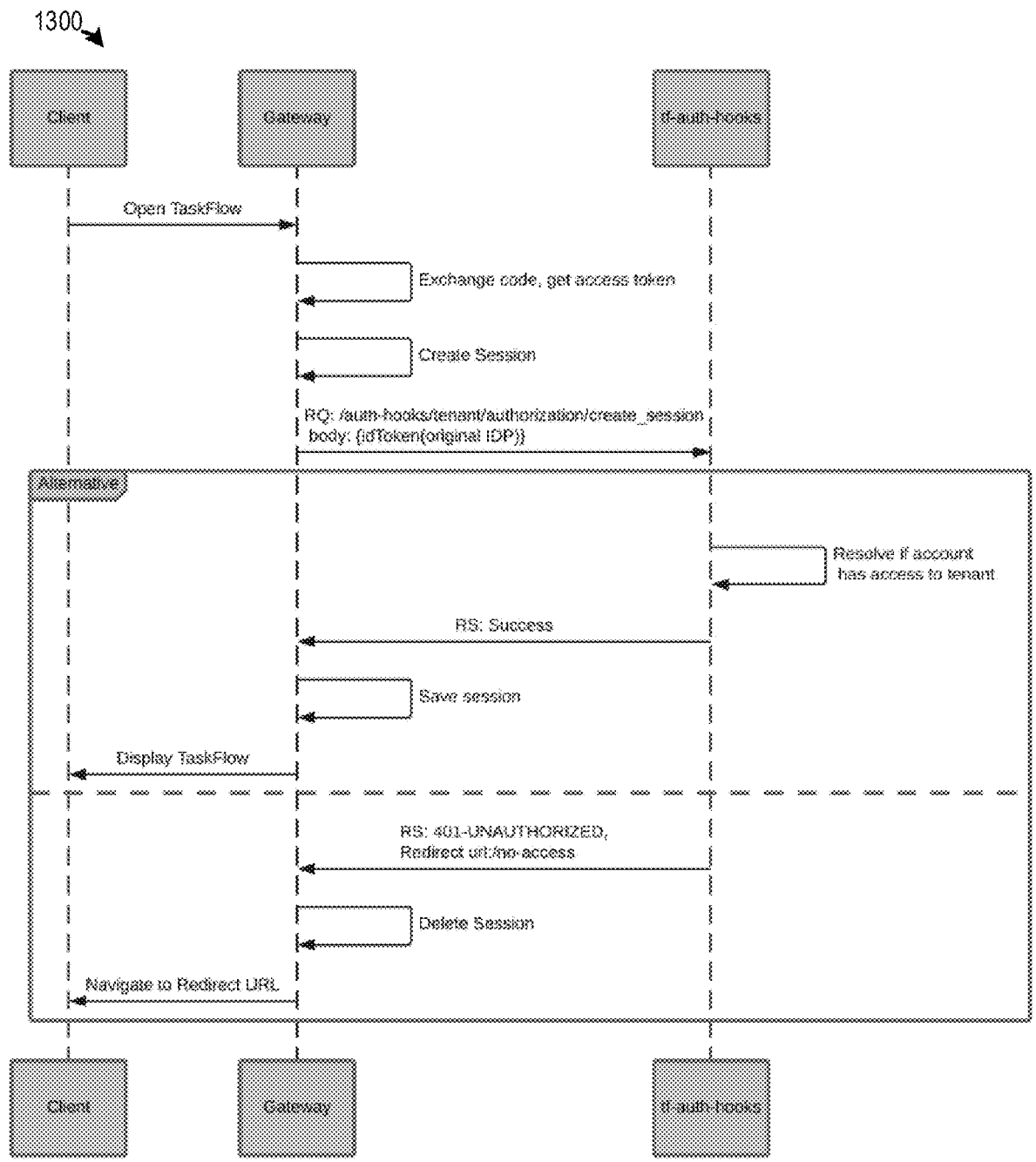
FIG. 8F depicts an access validation on create session hook, according to some aspects.
Figure 8G:
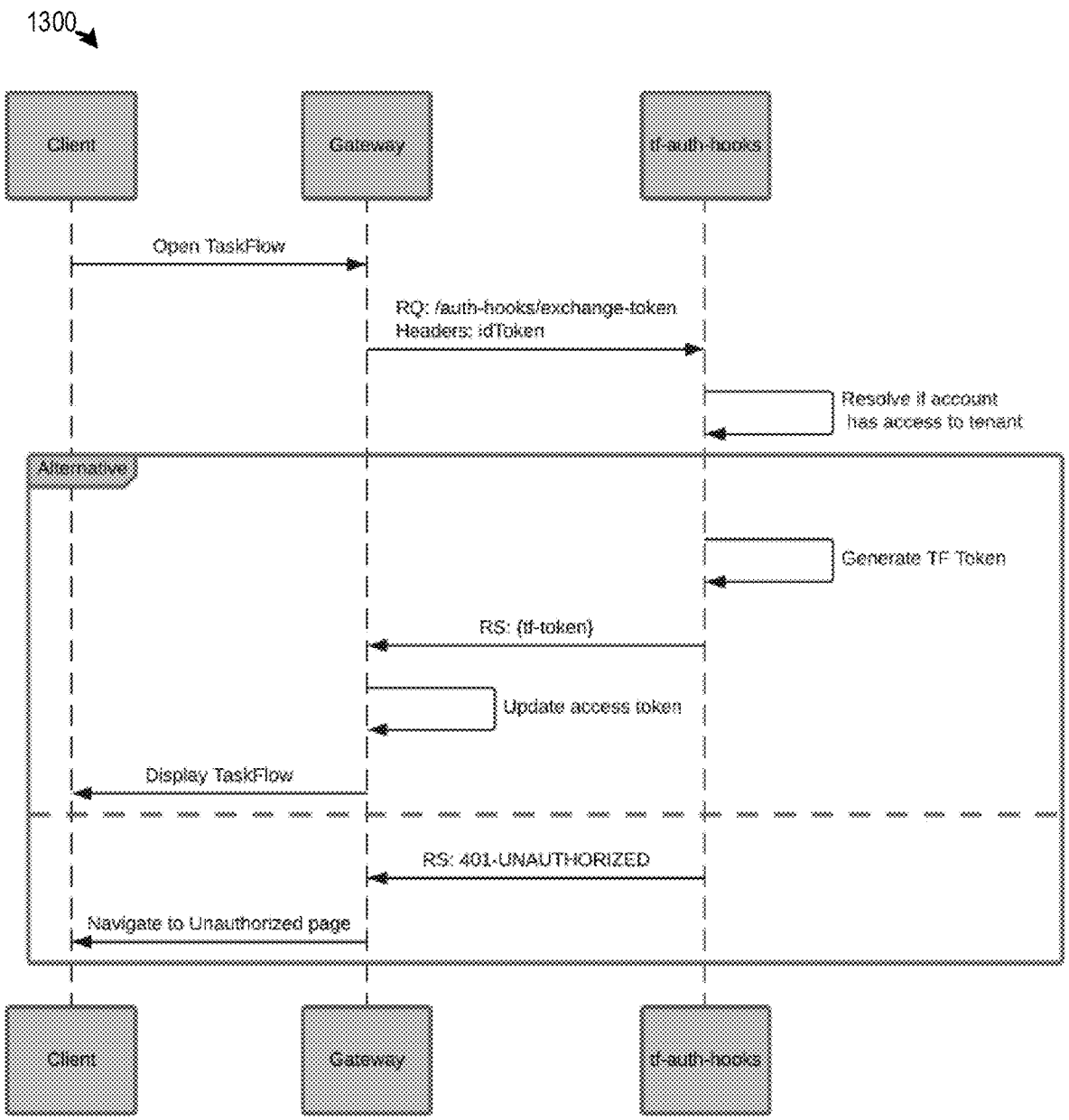
FIG. 8G depicts a sequence flow diagram of a token exchange hook, according to some aspects.

In many cases, business users with third party cloud accounts (e.g., Google or Office 365) cannot be authenticated and authorized in the task flow environment. This problem can prevent task flow from being used with a much bigger audience of users. FIGS. 8E-8G depicts sequence diagrams for advantageously overcoming this problem. FIG. 8E depicts using a gateway IDP hook to retrieve IDP from the tenant configuration and redirecting to that IDP. FIG. 8F depicts an access validation on create session hook, wherein a gateway makes a request to a task flow service to validate whether users are authorized to a tenant or now. When the user is not authorized, the sequence flow diagram depicts redirecting the user to a URL provided in location header in a task flow response. FIG. 8G depicts a sequence flow diagram of a token exchange hook, wherein using a token exchange hook, an external token is exchange to a task flow internal token and a session is created based on the newly generated token. The task flow token is then used in all communication between the task flow containers and external services.

Figure 8H:
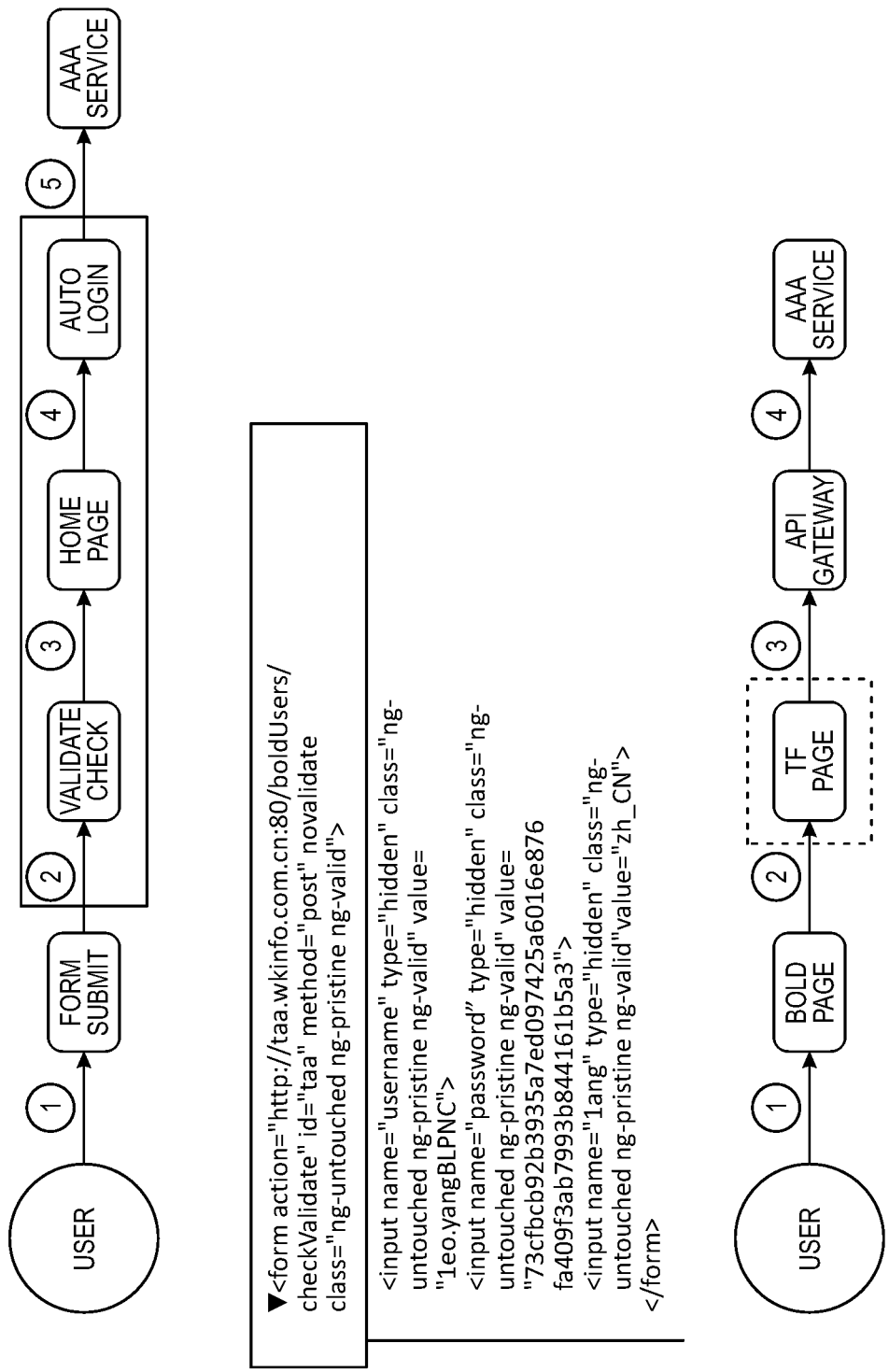
FIG. 8H depicts a block diagram authentication between different modules, according to an aspect.

FIG. 8H depicts a block diagram authentication between different modules, according to an aspect. A web framework (e.g., NodeJS) may be used to decouple a web front end and back end. Each module may include its own authentication. To achieve seamless log in when switching to different modules, following mechanism is implemented. Task flow integrates authentication, authorization and account (AAA) services implemented by the client. First, a user may log onto a home page and a user name and a password (encrypted) are stored into a form. When a user wants to access another module, the user clicks its link from a menu and submits the user name in a html form and password to validate check which is a page in another module. Validate check gets username and password and stores into session. Home page of another module is invoked and then call its API 'autologin' to perform user authentication. Autologin calls AAA service API and does authentication. This authentication may be integrated into task flow aspects described here. For example, a web page or API in task flow side may be set up, and then whenever the user clicks to link in task flow, a page can pass all required information (user name, password, etc.). Once the task flow page gets the required information, it can pass the information to an API gateway to do authentication.

Exemplary Calculators and Scope

Figure 9A:
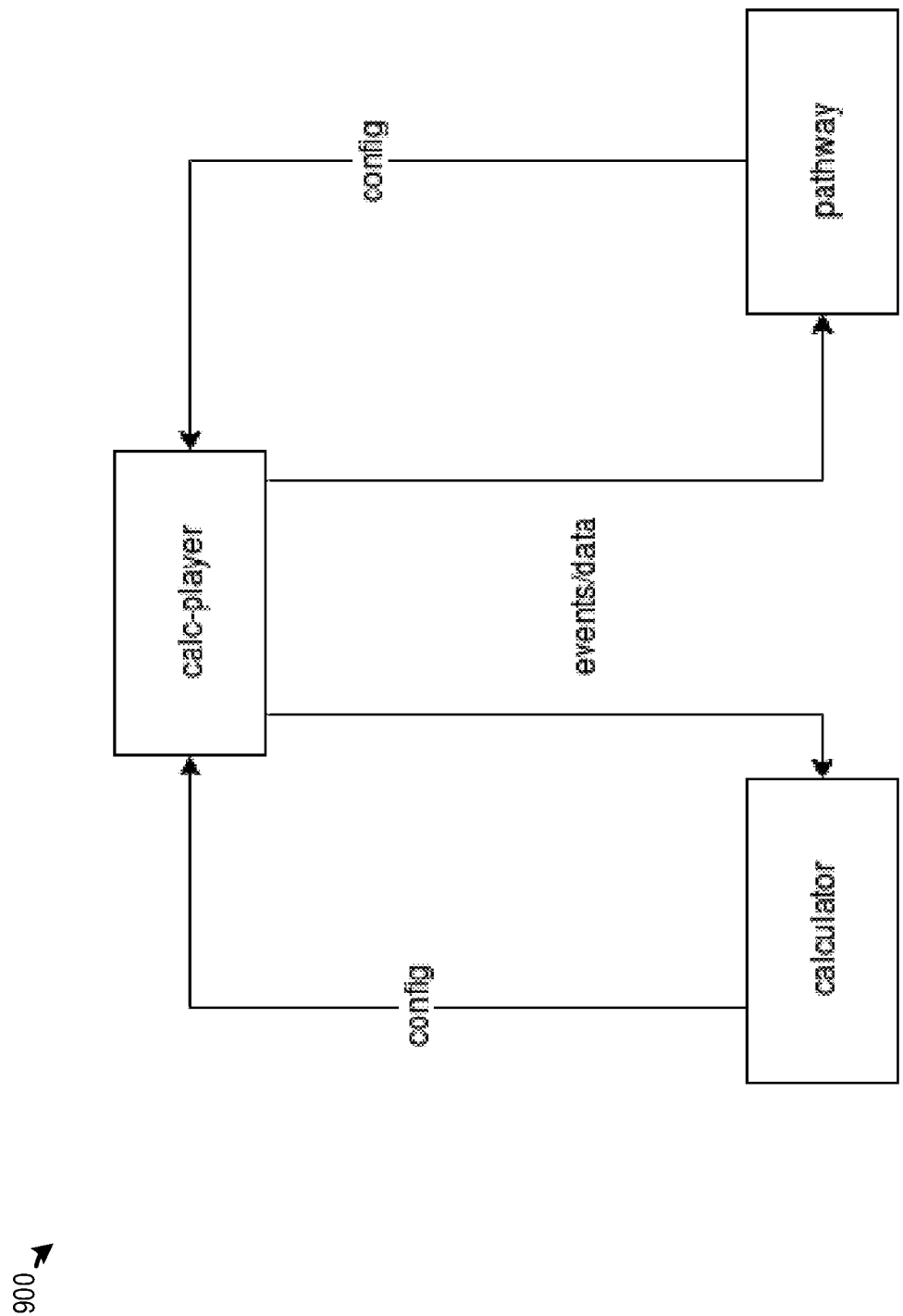
FIG. 9A depicts a schematic view of a calculator, according to an aspect.
Figure 9B:
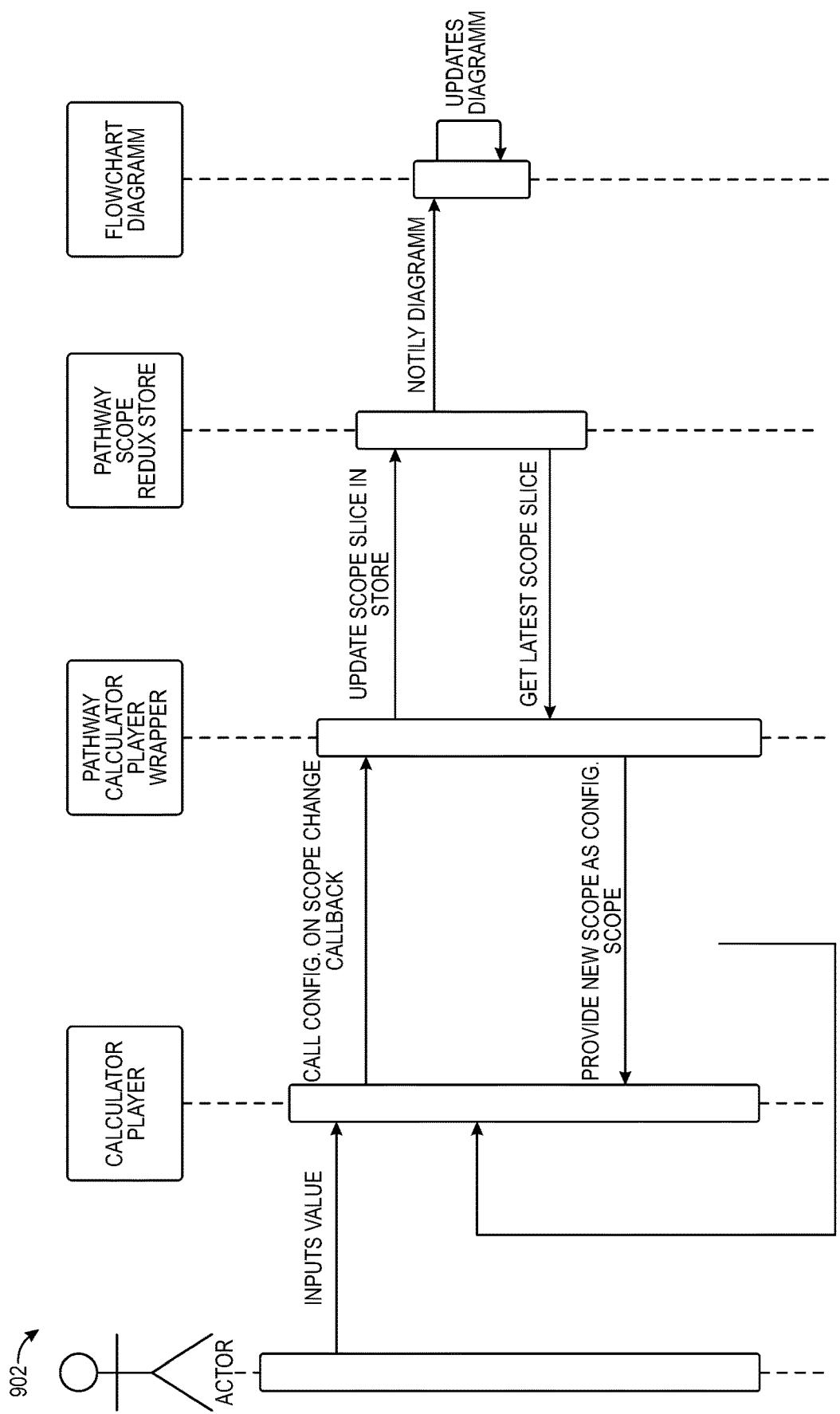
FIG. 9B depicts a process diagram of the calculator, according to some aspects.

FIG. 9A depicts a schematic view of a calculator 900. The calculator may play configurations and call callback functions upon scope change. When the user chooses something the calc-player calls the callback from the config into which variables are passed to update the scope. FIG. 9B depicts a process diagram 902 of the calculator schematically illustrating a user, a calculator player, a pathway calculator player/wrapper, pathway scope and flowchart diagram. The calculator of FIG. 9B may manipulate the scope object (e.g., add/delete properties, update scope with variables from the calc-player) and validate the calculator state. The pathway may manipulate the scope object by updating the scope with variables from the calc-player.

Figure 9C:
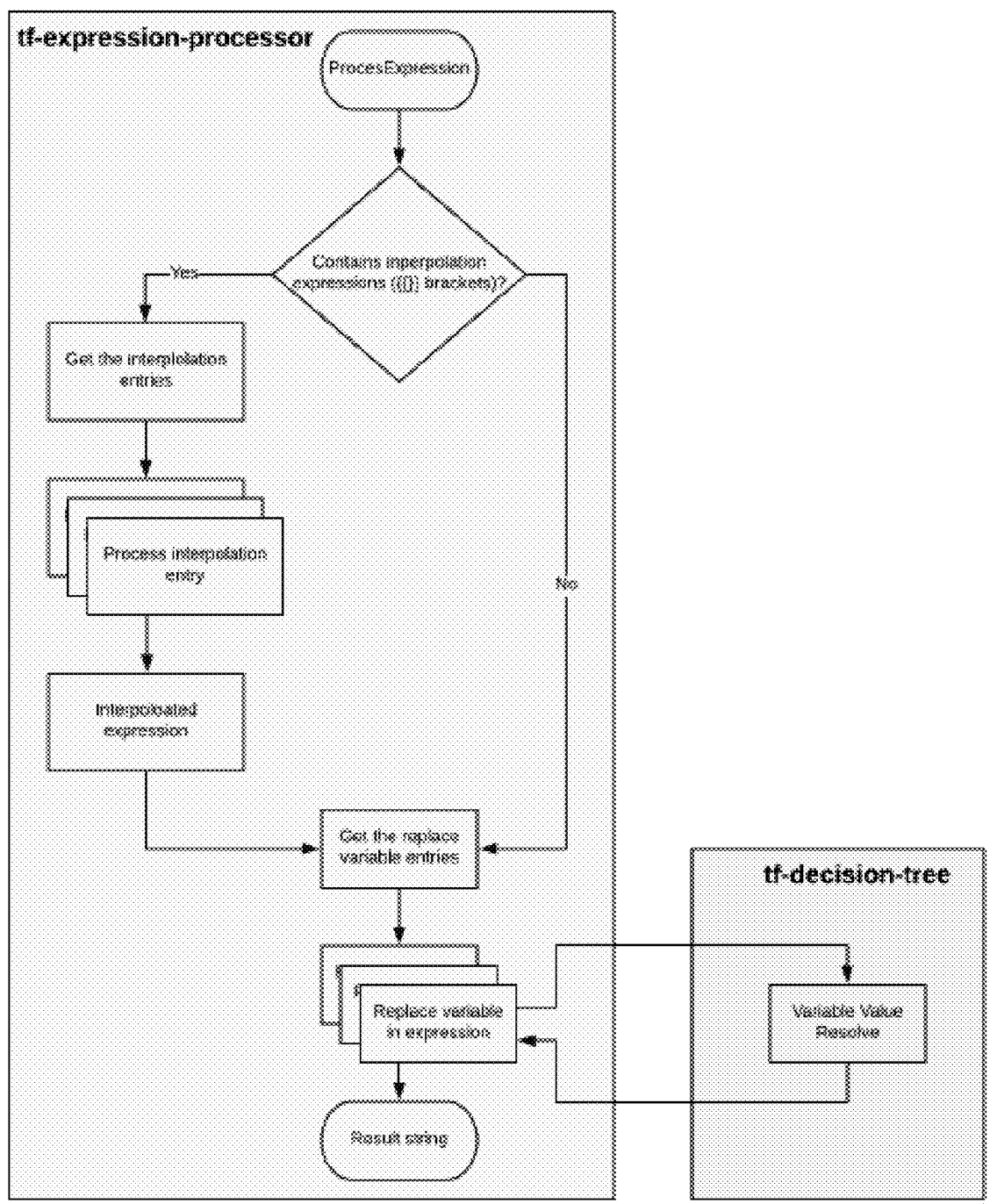
FIG. 9C depicts a block flow diagram of a tf-expression-processor package, according to some aspects.

FIG. 9C depicts a block flow diagram of a tf-expression-processor package 906, according to some aspects. The package 906 may enable interpolation support for task flow objects. For example, the package 906 may enable the user to create a node with an expression ($score or "not available") that will render as "not available" unless the scope is available.

Exemplary Undo-Redo Aspects

Figure 9D:
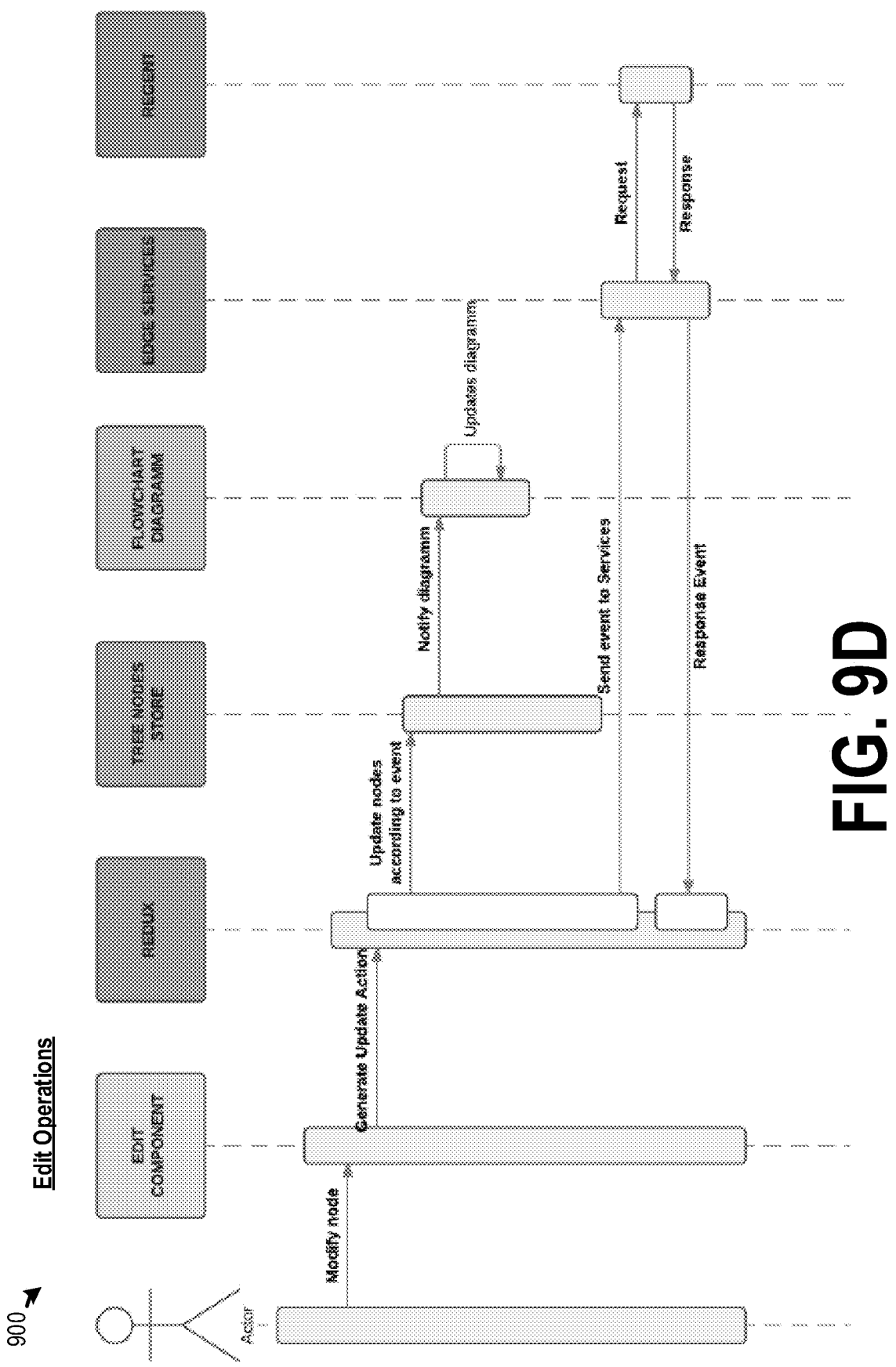
FIG. 9D depicts an exemplary undo-redo sequence diagram, according to some aspects.
Figure 9E:
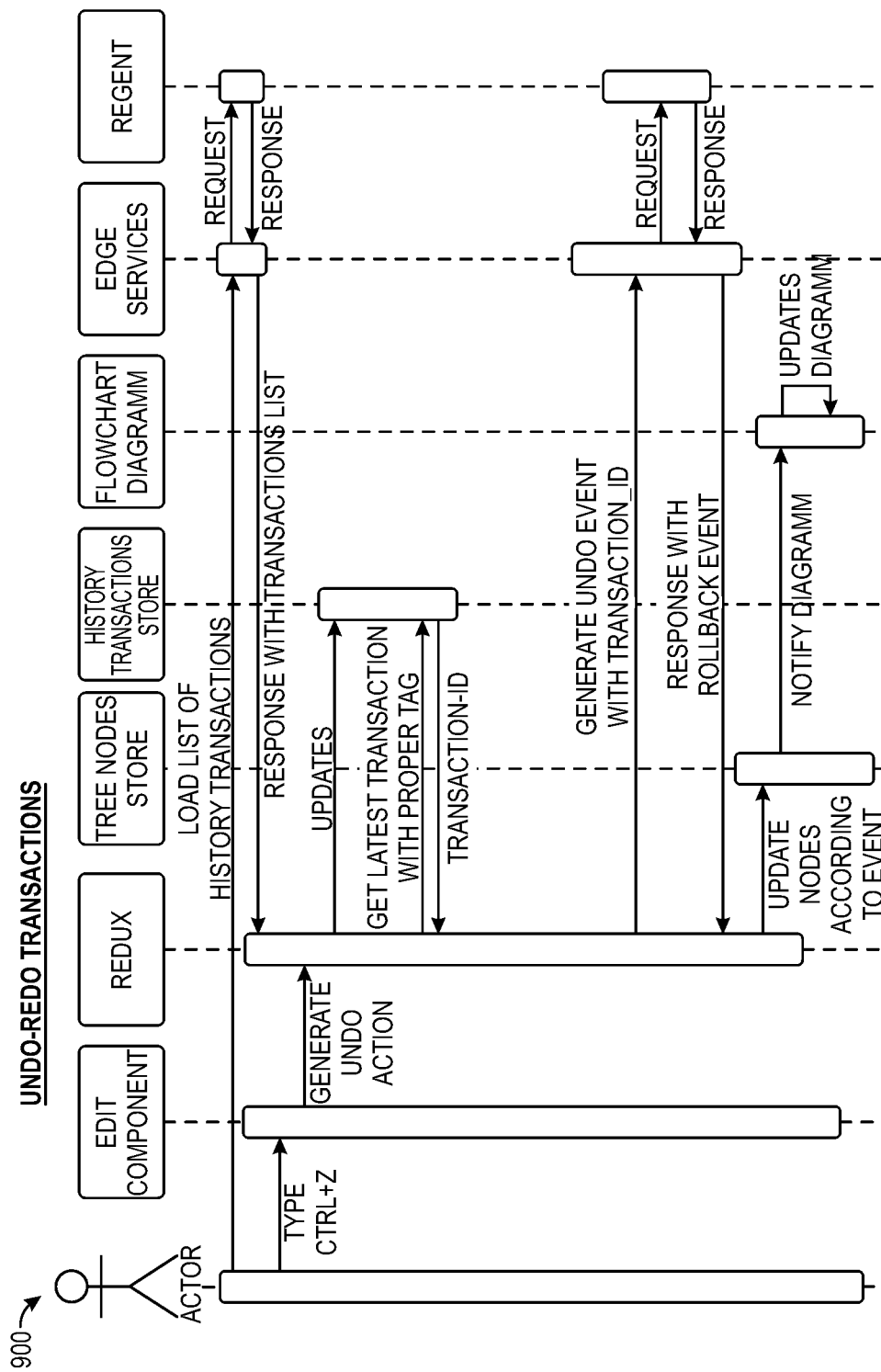
FIG. 9E depicts an exemplary undo-redo sequence diagram for performing undo-redo transactions, according to some aspects.
Figure 9F:
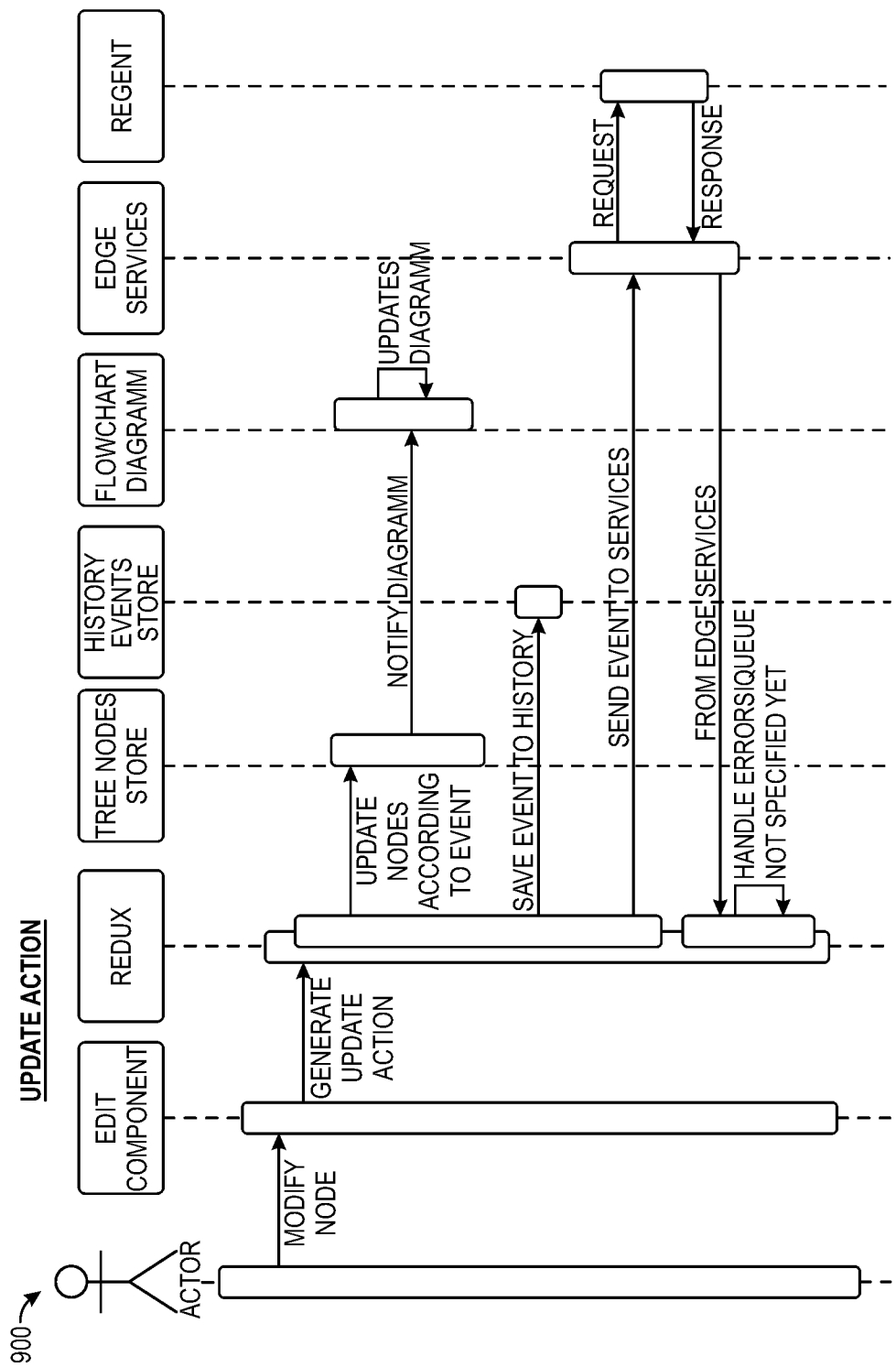
FIG. 9F depicts an update action sequence diagram, according to some aspects.
Figure 9G:
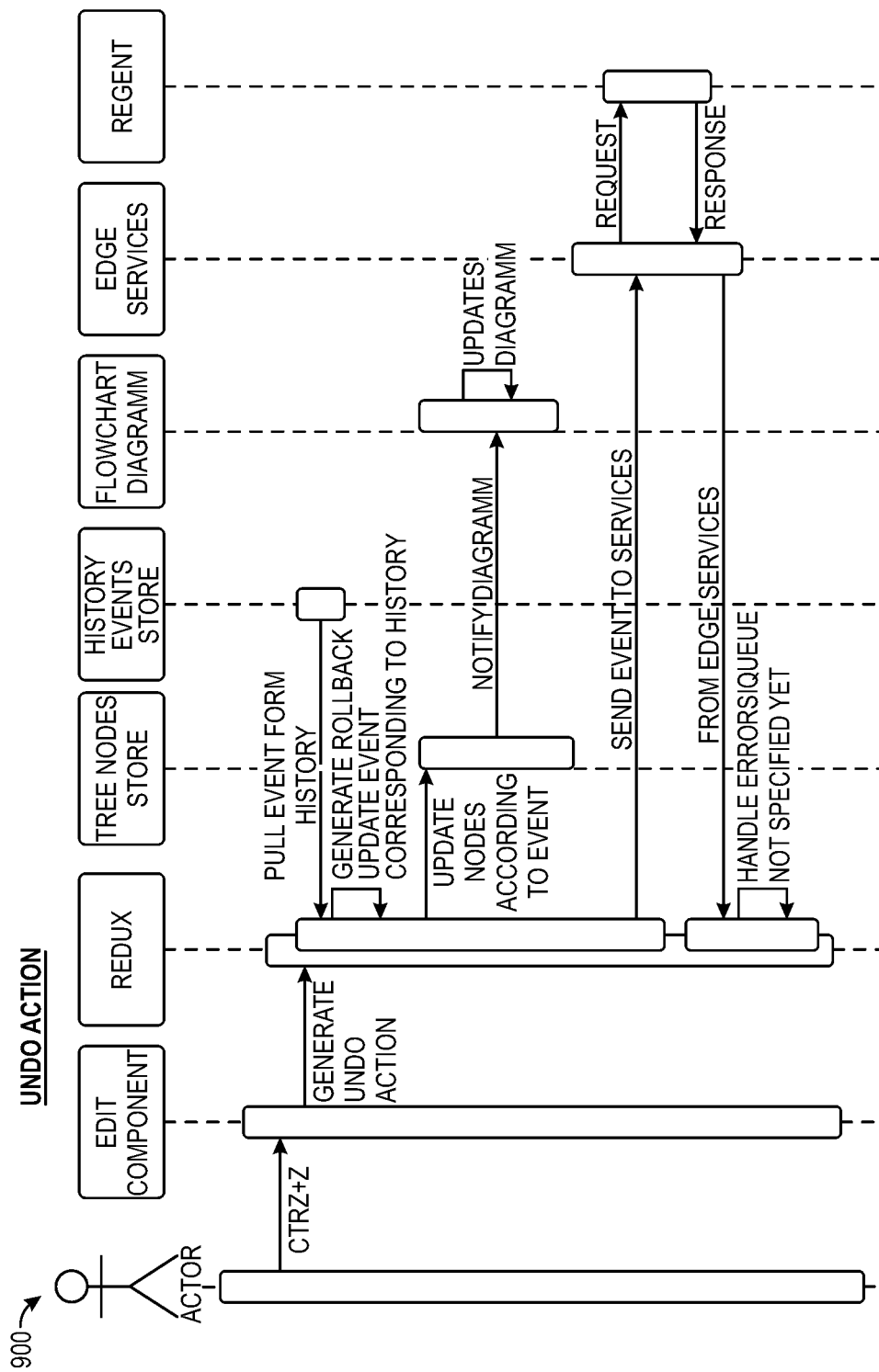
FIG. 9G depicts an undo action sequence diagram, according to some aspects.

FIG. 9D depicts an exemplary undo-redo sequence diagram, according to some aspects. The undo-redo sequence diagram may be a server-side implementation that supports history persistence across different browsers/computers. FIG. 9E depicts an exemplary undo-redo sequence diagram for performing undo-redo transactions, according to some aspects. The undo-redo sequence diagram for performing undo-redo transactions enables distinguishing between changes made in different parts of a task flow application (e.g., in an extension as opposed to a pathway). In some aspects, each user interface-related transaction may be tagged, in some cases, by an interactive content model as described herein. FIG. 9F depicts an update action sequence diagram, according to some aspects. FIG. 9G depicts an undo action sequence diagram, according to some aspects.

Exemplary Side-by-Side Difference Aspects

Figure 10A:
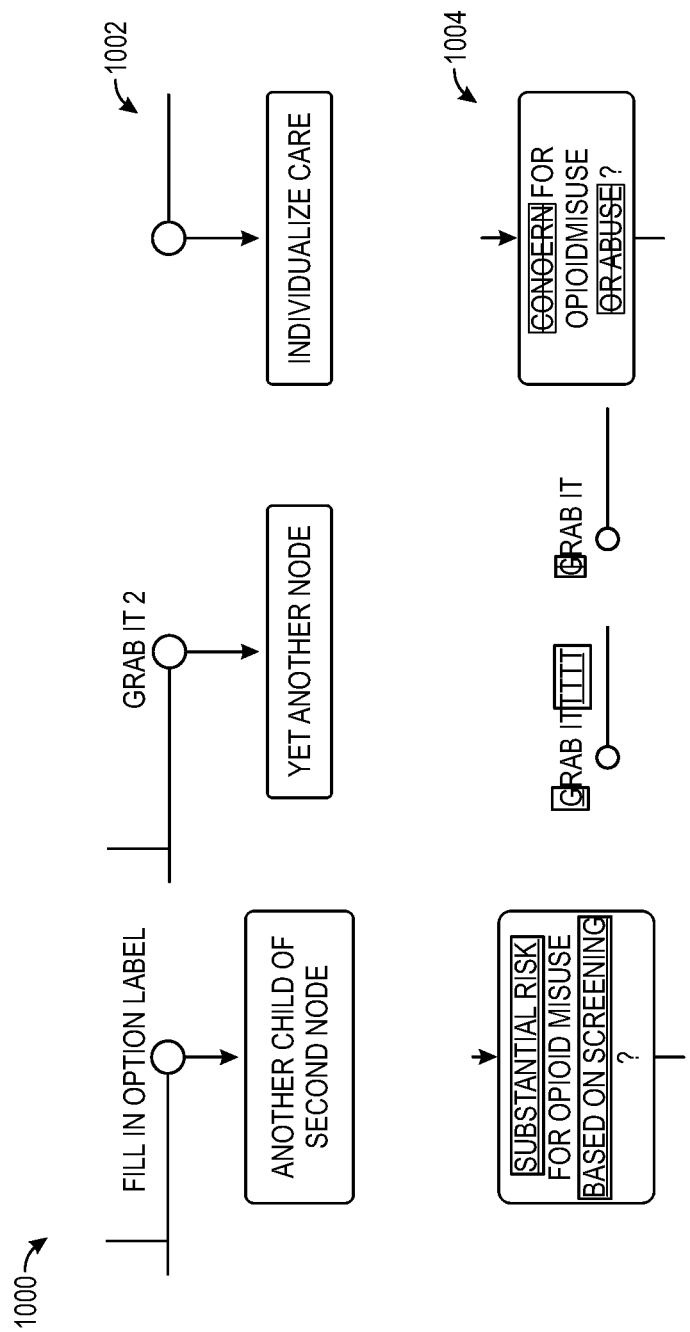
FIG. 10A depicts differences between nodes, according to some aspects.

The present techniques enable the comparison of nodes in a side-by-side difference. FIG. 10A depicts differences between nodes, wherein a first pattern indicates added content, a second pattern indicates deleted content, and a third pattern indicates updated content. A third-party library (e.g., diff_match_patch) may be used in some aspects to calculate differences in text and HTML strings. The differences are presented in a human-readable format. In FIG. 10A, added nodes 1002 may be highlighted as may be links to the added node. Deleted nodes 1002 may be highlighted, as may be links to the deleted node. Changed nodes 1002 may be highlighted, as may be links to the changed node. Further, changed text nodes 1004 may be highlighted to show whether text was added or deleted, either via pattern, underlining/strikethrough, and/or via color.

Figure 10D:
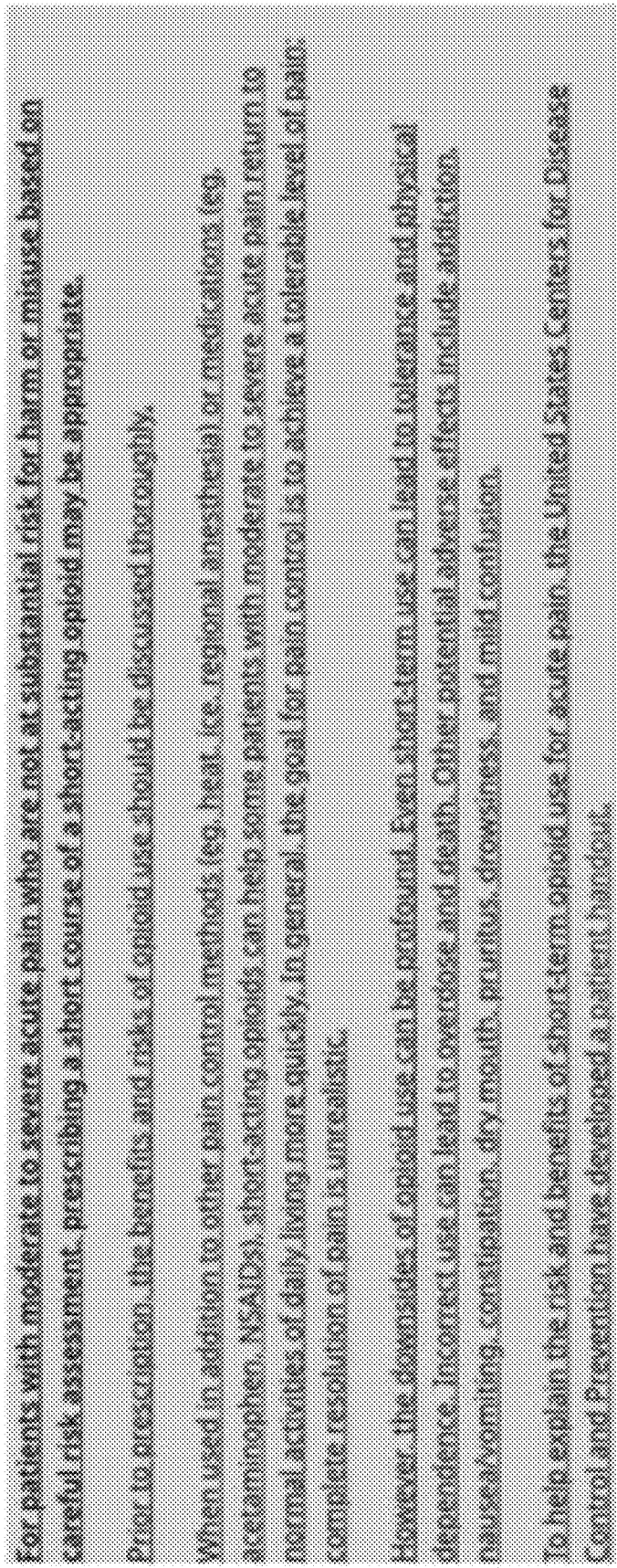
FIG. 10D depicts a side-by-side difference showing text added to an added node, according to some aspects.
Figure 10H:
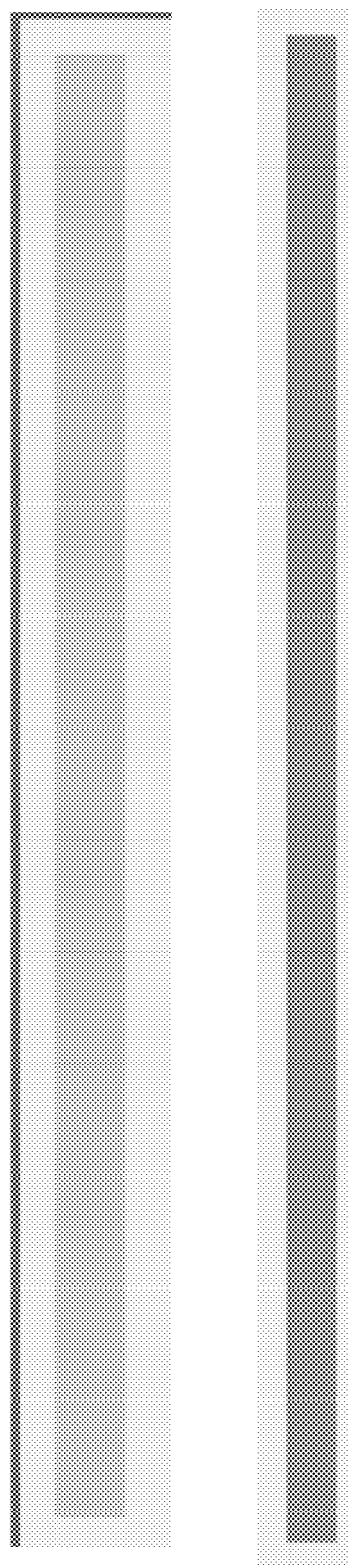
FIG. 10H depicts differences showing additions and deletions to empty text nodes, according to some aspects.

FIG. 10B depicts a side-by-side difference showing text added to a node 1010. FIG. 10C depicts a side-by-side difference showing text deleted from to a node 1010. FIG. 10D depicts a side-by-side difference showing text added to an added node 1030. FIG. 10E depicts a side-by-side difference showing text deleted from a deleted 1040. FIG. 10F depicts a difference showing text added to an added node 1050. FIG. 10G depicts a difference showing a deleted node 1062A, a first modified node 1062B and a second modified node 1062C. FIG. 10H depicts differences showing additions and deletions to empty text nodes, according to some aspects.

Additional Considerations

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

For example, the network may include, but is not limited to, any combination of a LAN, a MAN, a WAN, a mobile, a wired or wireless network, a private network, or a virtual private network. Moreover, it is understood that any number of client computers or display devices are supported and may be in communication with the system 102.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Accordingly, the term hardware should be understood to encompass a tangible entity, which may be one of an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of exemplary functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or functions described herein may be at least partially processor-implemented. For example, at least some of the functions of a method may be performed by one or more processors or processor-implemented hardware modules. The performance of certain of the functions may be distributed among the one or more processors, not only residing within a single machine, but deployed across a number of machines. In some exemplary embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors). These operations are accessible via a network (e.g., the Internet) and via one or more appropriate interfaces (e.g., application program interfaces (APIs)).

The performance of certain operations may be distributed among the one or more processors, not only residing within a single machine, but deployed across a number of machines. In some exemplary embodiments, the one or more processors or processor-implemented modules may be located in a single geographic location (e.g., within a home environment, an office environment, or a server farm). In other exemplary embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or an "algorithm" or a "routine" is a self-consistent sequence of operations or similar processing leading to a desired result. In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for efficiently performing the disclosed methods and systems through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

1. A low-code/no-code task flow authoring computer system comprising: one or more processors; and a memory storing computer-readable instructions that, when executed by the one or more processors, cause the computing system to: cause an interactive graphical user interface (GUI) to be displayed, the GUI comprising at least one pane, the pane comprising one or more selectable auto-expandable nodes each representing a respective action in a primary interactive content object; an interface for selecting and interconnecting the one or more auto-expandable nodes; and one or more controls for linking one or more sub-interactive content objects to the primary interactive content object; generate, by inputting a portion of the primary interactive content object into an interactive content object model, an interactive content object output corresponding to the portion of the primary interactive content object; and replace the portion of the primary interactive content object with the interactive content object output.

2. The system of aspect 1, wherein the memory stores further instructions that, when executed by the one or more processors, cause the computing system to: one or both of (i) compress at least one sub-tree of the input portion of the primary interactive content object; or (ii) tag the input portion of the primary decision tee to identify one or more respective sub-interactive content objects.

3. The system of any of aspects 1-2, wherein the memory stores further instructions that, when executed by the one or more processors, cause the computing system to: compress the at least one sub-tree of the input portion of the primary interactive content object in response to receiving a GUI node signal.

4. The system of aspect 1, wherein the memory stores further instructions that, when executed by the one or more processors, cause the computing system to: receive a user element selection indication corresponding to at least one of the one or more selectable auto-expandable nodes; receive a user connection selection; and generate a connection from the at least one of the one or more selectable auto-expandable nodes to a second one of the one or more selectable auto-expandable nodes.

5. The system of aspect 1, wherein the one or more selectable auto-expandable nodes each corresponds to a respective node type selected from the group consisting of (i) a decision node; (ii) an execution block node; or (iii) a terminal node; and wherein the memory stores further instructions that, when executed by the one or more processors, cause the computing system to: generate the interactive content object output by analyzing each respective node type of the selectable auto-expandable nodes.

6. The system of aspect 1, wherein the memory stores further instructions that, when executed by the one or more processors, cause the computing system to: create the one or more sub-interactive content objects by cloning at least a portion of the primary interactive content object.

7. The system of aspect 1, wherein the memory stores further instructions that, when executed by the one or more processors, cause the computing system to: receive an initial representation of at least a portion of the primary interactive content object; generate, via the interactive content object model, an intermediate representation corresponding to the at least the portion of the primary interactive content object; and cause the GUI to generate a calculated virtual representation corresponding to the at least the portion of the primary interactive content object by analyzing the intermediate representation using one or more selectors.

8. A computer-implemented method for low-code/no-code task flow authoring, comprising: causing an interactive graphical user interface (GUI) to be displayed, the GUI comprising (i) at least one pane, the pane comprising one or more selectable auto-expandable nodes each representing a respective action in a primary interactive content object; (ii) an interface for selecting and interconnecting the one or more auto-expandable nodes; and (iii) one or more controls for linking one or more sub-interactive content objects to the primary interactive content object; generating, by inputting a portion of the primary interactive content object into an interactive content object model, an interactive content object output corresponding to the portion of the primary interactive content object; and replacing the portion of the primary interactive content object with the interactive content object output.

9. The computer-implemented method of aspect 8, wherein generating, by inputting the portion of the primary interactive content object into the interactive content object model, the interactive content object output corresponding to the portion of the primary interactive content object includes one or both of (i) compressing at least one sub-tree of the input portion of the primary interactive content object; or (ii) tagging the input portion of the primary decision tee to identify one or more respective sub-interactive content objects.

10. The computer-implemented method of any of aspects 1-9, wherein generating, by inputting the portion of the primary interactive content object into the interactive content object model, the interactive content object output corresponding to the portion of the primary interactive content object includes compressing the at least one sub-tree of the input portion of the primary interactive content object in response to receiving a GUI node signal.

11. The computer-implemented method of aspect 8, further comprising:
receiving a user element selection indication corresponding to at least one of the one or more selectable auto-expandable nodes; receiving a user connection selection; and generating a connection from the at least one of the one or more selectable auto-expandable nodes to a second one of the one or more selectable auto-expandable nodes.

12. The computer-implemented method of aspect 8, wherein the one or more selectable auto-expandable nodes each corresponds to a respective node type selected from the group consisting of (i) a decision node; (ii) an execution block node; or (iii) a terminal node; and wherein generating, by inputting the portion of the primary interactive content object into the interactive content object model, the interactive content object output corresponding to the portion of the primary interactive content object includes generating the interactive content object output by analyzing each respective node type of the selectable auto-expandable nodes.

13. The computer-implemented method of aspect 8, further comprising:
creating the one or more sub-interactive content objects by cloning at least a portion of the primary interactive content object.

14. The computer-implemented method of aspect 8, further comprising: receiving an initial representation of at least a portion of the primary interactive content object; generating, via the interactive content object model, an intermediate representation corresponding to the at least the portion of the primary interactive content object; and causing the GUI to generate a calculated virtual representation corresponding to the at least the portion of the primary interactive content object by analyzing the intermediate representation using one or more selectors.

15. A non-transitory computer readable medium containing program instructions that when executed, cause a computer to: cause an interactive graphical user interface (GUI) to be displayed, the GUI comprising at least one pane, the pane comprising one or more selectable auto-expandable nodes each representing a respective action in a primary interactive content object; an interface for selecting and interconnecting the one or more auto-expandable nodes; and one or more controls for linking one or more sub-interactive content objects to the primary interactive content object; generate, by inputting a portion of the primary interactive content object into an interactive content object model, an interactive content object output corresponding to the portion of the primary interactive content object; and replace the portion of the primary interactive content object with the interactive content object output.

16. The non-transitory computer readable medium of aspect 15 containing further program instructions that, when executed, cause the computer to: one or both of (i) compress at least one sub-tree of the input portion of the primary interactive content object; or (ii) tag the input portion of the primary decision tee to identify one or more respective sub-interactive content objects.

17. The non-transitory computer readable medium of aspect 15 containing further program instructions that, when executed, cause the computer to: receive a user element selection indication corresponding to at least one of the one or more selectable auto-expandable nodes; receive a user connection selection; and generate a connection from the at least one of the one or more selectable auto-expandable nodes to a second one of the one or more selectable auto-expandable nodes.

18. The non-transitory computer readable medium of aspect 15 containing further program instructions that, when executed, cause the computer to: generate the interactive content object output by analyzing each respective node type of the selectable auto-expandable nodes.

19. The non-transitory computer readable medium of aspect 15 containing further program instructions that, when executed, cause the computer to: create the one or more sub-interactive content objects by cloning at least a portion of the primary interactive content object.

20. The non-transitory computer readable medium of aspect 15 containing further program instructions that, when executed, cause the computer to: receive an initial representation of at least a portion of the primary interactive content object; generate, via the interactive content object model, an intermediate representation corresponding to the at least the portion of the primary interactive content object; and cause the GUI to generate a calculated virtual representation corresponding to the at least the portion of the primary interactive content object by analyzing the intermediate representation using one or more selectors.

Thus, many modifications and variations may be made in the techniques, methods, and structures described and illustrated herein without departing from the spirit and scope of the present claims. Accordingly, it should be understood that the methods and apparatus described herein are illustrative only and are not limiting upon the scope of the claims.

What is claimed is:

1. A low-code/no-code task flow authoring computing system comprising:
one or more processors; and
a memory storing computer-readable instructions that, when executed by the one or more processors, cause the computing system to:
cause an interactive graphical user interface (GUI) to be displayed, the GUI comprising
at least one pane, the pane comprising one or more selectable auto-expandable nodes each representing a respective action in a primary interactive content object;
an interface for selecting and interconnecting the one or more auto-expandable nodes; and
one or more controls for linking one or more sub-interactive content objects to the primary interactive content object;
generate, by inputting a portion of the primary interactive content object into an interactive content object model, an interactive content object output corresponding to the portion of the primary interactive content object; and
replace the portion of the primary interactive content object with the interactive content object output.

2. The system of claim 1,
wherein the memory stores further instructions that, when executed by the one or more processors, cause the computing system to:
one or both of (i) compress at least one sub-tree of the input portion of the primary interactive content object; or (ii) tag the input portion of the primary interactive content object to identify one or more respective sub-interactive content objects.

3. The system of claim 2,
wherein the memory stores further instructions that, when executed by the one or more processors, cause the computing system to:
compress the at least one sub-tree of the input portion of the primary interactive content object in response to receiving a GUI node signal.

4. The system of claim 1,
wherein the memory stores further instructions that, when executed by the one or more processors, cause the computing system to:
receive a user element selection indication corresponding to at least one of the one or more selectable auto-expandable nodes;
receive a user connection selection; and
generate a connection from the at least one of the one or more selectable auto-expandable nodes to a second one of the one or more selectable auto-expandable nodes.

5. The system of claim 1,
wherein the one or more selectable auto-expandable nodes each corresponds to a respective node type selected from the group consisting of (i) a decision node; (ii) an execution block node; or (iii) a terminal node; and
wherein the memory stores further instructions that, when executed by the one or more processors, cause the computing system to:
generate the interactive content object output by analyzing each respective node type of the selectable auto-expandable nodes.

6. The system of claim 1,
wherein the memory stores further instructions that, when executed by the one or more processors, cause the computing system to:
create the one or more sub-interactive content objects by cloning at least a portion of the primary interactive content object.

7. The system of claim 1,
wherein the memory stores further instructions that, when executed by the one or more processors, cause the computing system to:
receive an initial representation of at least a portion of the primary interactive content object;
generate, via the interactive content object model, an intermediate representation corresponding to the at least the portion of the primary interactive content object; and
cause the GUI to generate a calculated virtual representation corresponding to the at least the portion of the primary interactive content object by analyzing the intermediate representation using one or more selectors.

8. A computer-implemented method for low-code/no-code task flow authoring, comprising:
causing an interactive graphical user interface (GUI) to be displayed, the GUI comprising (i) at least one pane, the pane comprising one or more selectable auto-expandable nodes each representing a respective action in a primary interactive content object; (ii) an interface for selecting and interconnecting the one or more auto-expandable nodes; and (iii) one or more controls for linking one or more sub-interactive content objects to the primary interactive content object;
generating, by inputting a portion of the primary interactive content object into an interactive content object model, an interactive content object output corresponding to the portion of the primary interactive content object; and
replacing the portion of the primary interactive content object with the interactive content object output.

9. The computer-implemented method of claim 8, wherein generating, by inputting the portion of the primary interactive content object into the interactive content object model, the interactive content object output corresponding to the portion of the primary interactive content object includes one or both of (i) compressing at least one sub-tree of the input portion of the primary interactive content object; or (ii) tagging the input portion of the primary interactive content object to identify one or more respective sub-interactive content objects.

10. The computer-implemented method of claim 9, wherein generating, by inputting the portion of the primary interactive content object into the interactive content object model, the interactive content object output corresponding to the portion of the primary interactive content object includes compressing the at least one sub-tree of the input portion of the primary interactive content object in response to receiving a GUI node signal.

11. The computer-implemented method of claim 8, further comprising:
receiving a user element selection indication corresponding to at least one of the one or more selectable auto-expandable nodes;
receiving a user connection selection; and
generating a connection from the at least one of the one or more selectable auto-expandable nodes to a second one of the one or more selectable auto-expandable nodes.

12. The computer-implemented method of claim 8, wherein the one or more selectable auto-expandable nodes each corresponds to a respective node type selected from the group consisting of (i) a decision node; (ii) an execution block node; or (iii) a terminal node; and wherein generating, by inputting the portion of the primary interactive content object into the interactive content object model, the interactive content object output corresponding to the portion of the primary interactive content object includes generating the interactive content object output by analyzing each respective node type of the selectable auto-expandable nodes.

13. The computer-implemented method of claim 8, further comprising:
   creating the one or more sub-interactive content objects by cloning at least a portion of the primary interactive content object.

14. The computer-implemented method of claim 8, further comprising:
   receiving an initial representation of at least a portion of the primary interactive content object;
   generating, via the interactive content object model, an intermediate representation corresponding to the at least the portion of the primary interactive content object; and
   causing the GUI to generate a calculated virtual representation corresponding to the at least the portion of the primary interactive content object by analyzing the intermediate representation using one or more selectors.

15. A non-transitory computer readable medium containing program instructions that when executed, cause a computer to:
   cause an interactive graphical user interface (GUI) to be displayed, the GUI comprising
      at least one pane, the pane comprising one or more selectable auto-expandable nodes each representing a respective action in a primary interactive content object;
      an interface for selecting and interconnecting the one or more auto-expandable nodes; and
      one or more controls for linking one or more sub-interactive content objects to the primary interactive content object;
   generate, by inputting a portion of the primary interactive content object into an interactive content object model, an interactive content object output corresponding to the portion of the primary interactive content object; and
   replace the portion of the primary interactive content object with the interactive content object output.

16. The non-transitory computer readable medium of claim 15 containing further program instructions that, when executed, cause the computer to:
   one or both of (i) compress at least one sub-tree of the input portion of the primary interactive content object; or (ii) tag the input portion of the primary interactive content object to identify one or more respective sub-interactive content objects.

17. The non-transitory computer readable medium of claim 15 containing further program instructions that, when executed, cause the computer to:
   receive a user element selection indication corresponding to at least one of the one or more selectable auto-expandable nodes;
   receive a user connection selection; and
   generate a connection from the at least one of the one or more selectable auto-expandable nodes to a second one of the one or more selectable auto-expandable nodes.

18. The non-transitory computer readable medium of claim 15 containing further program instructions that, when executed, cause the computer to:
   generate the interactive content object output by analyzing each respective node type of the selectable auto-expandable nodes.

19. The non-transitory computer readable medium of claim 15 containing further program instructions that, when executed, cause the computer to:
   create the one or more sub-interactive content objects by cloning at least a portion of the primary interactive content object.

20. The non-transitory computer readable medium of claim 15 containing further program instructions that, when executed, cause the computer to:
   receive an initial representation of at least a portion of the primary interactive content object;
   generate, via the interactive content object model, an intermediate representation corresponding to the at least the portion of the primary interactive content object; and cause the GUI to generate a calculated virtual representation corresponding to the at least the portion of the primary interactive content object by analyzing the intermediate representation using one or more selectors.

* * * * *